United States Patent
Hyde et al.

(10) Patent No.: US 9,691,507 B2
(45) Date of Patent: Jun. 27, 2017

(54) METHOD AND SYSTEM FOR THE THERMOELECTRIC CONVERSION OF NUCLEAR REACTOR GENERATED HEAT

(75) Inventors: Roderick A. Hyde, Redmond, WA (US); Muriel Y. Ishikawa, Livermore, CA (US); Nathan P. Myhrvold, Medina, WA (US); Joshua C. Walter, Kirkland, WA (US); Thomas Allan Weaver, San Mateo, CA (US); Lowell L. Wood, Jr., Bellevue, WA (US); Victoria Y. H. Wood, Livermore, CA (US)

(73) Assignee: TerraPower, LLC, Bellevue, WA (US)

( * ) Notice: Subject to any disclaimer, the term of this patent is extended or adjusted under 35 U.S.C. 154(b) by 1967 days.

(21) Appl. No.: 12/386,052

(22) Filed: Apr. 13, 2009

(65) Prior Publication Data
US 2010/0260303 A1    Oct. 14, 2010

(51) Int. Cl.
*G21C 9/00* (2006.01)
*G21D 1/02* (2006.01)
*G21D 7/04* (2006.01)

(52) U.S. Cl.
CPC .............. *G21D 1/02* (2013.01); *G21D 7/04* (2013.01); *Y02E 30/40* (2013.01)

(58) Field of Classification Search
USPC ........ 376/207, 215, 241, 317, 320, 321, 322
See application file for complete search history.

(56) References Cited

U.S. PATENT DOCUMENTS

| | | | |
|---|---|---|---|
| 2,748,710 A | | 6/1956 | Vandenberg |
| 2,902,423 A | | 9/1959 | Luebke et al. |
| 3,093,569 A | | 6/1963 | Post |
| 3,276,914 A | | 10/1966 | Shoupp |
| 3,277,321 A | * | 10/1966 | Weill et al. ................... 376/321 |
| 3,430,079 A | * | 2/1969 | McCoy et al. ................ 310/306 |
| 3,537,910 A | | 11/1970 | Zogran et al. |
| 3,547,778 A | | 12/1970 | Flaherty et al. |
| 3,598,652 A | | 8/1971 | Magladry |
| 3,601,887 A | * | 8/1971 | Mitchell et al. ................ 438/55 |
| 3,793,144 A | | 2/1974 | Magladry |
| 3,801,284 A | * | 4/1974 | Meckler ........................ 422/199 |
| 4,042,757 A | | 8/1977 | Jones |
| 4,459,428 A | | 7/1984 | Chou |
| 4,508,677 A | | 4/1985 | Craig et al. |
| 4,689,194 A | | 8/1987 | Wachholz et al. |

(Continued)

FOREIGN PATENT DOCUMENTS

| | | |
|---|---|---|
| CN | 1086038 A | 4/1994 |
| CN | 1890821 A | 1/2007 |

(Continued)

OTHER PUBLICATIONS

McGraw-Hill Encyclopedia of Science & Technology, 9th Edition, "Nuclear Reactor"; pp. 177-185; published 2002.

(Continued)

*Primary Examiner* — Marshall O'Connor

(57) ABSTRACT

A method and system for the thermoelectric conversion of nuclear reactor generated heat including upon a nuclear reactor system shutdown event, thermoelectrically converting nuclear reactor generated heat to electrical energy and supplying the electrical energy to a mechanical pump of the nuclear reactor system.

32 Claims, 36 Drawing Sheets

(56) References Cited

U.S. PATENT DOCUMENTS

| | | | | |
|---|---|---|---|---|
| 4,699,754 | A * | 10/1987 | French | 376/299 |
| 4,784,824 | A | 11/1988 | Gandrille et al. | |
| 4,818,475 | A | 4/1989 | Gluntz et al. | |
| 4,851,183 | A | 7/1989 | Hampel | |
| 5,039,457 | A | 8/1991 | Terada et al. | |
| 5,124,115 | A | 6/1992 | Dillmann | |
| 5,202,083 | A | 4/1993 | Spinks et al. | |
| 5,255,296 | A | 10/1993 | Schultz | |
| 5,268,942 | A | 12/1993 | Newton et al. | |
| 5,621,776 | A | 4/1997 | Gaubatz | |
| 5,623,109 | A | 4/1997 | Uchida et al. | |
| 5,650,904 | A * | 7/1997 | Gilley et al. | 361/56 |
| 5,817,958 | A | 10/1998 | Uchida et al. | |
| 7,493,974 | B1 * | 2/2009 | Boncodin | 180/2.2 |
| 2003/0072403 | A1 | 4/2003 | Dagard | |
| 2005/0012204 | A1 * | 1/2005 | Strnad | 257/712 |
| 2006/0018420 | A1 | 1/2006 | Tessien | |
| 2006/0117782 | A1 | 6/2006 | Rini et al. | |
| 2006/0251204 | A1 | 11/2006 | Tsang et al. | |
| 2007/0137684 | A1 * | 6/2007 | Gruen | 136/201 |
| 2007/0253520 | A1 | 11/2007 | Sim et al. | |
| 2007/0280400 | A1 | 12/2007 | Keller | |
| 2008/0300660 | A1 * | 12/2008 | John | 607/61 |

FOREIGN PATENT DOCUMENTS

| | | | |
|---|---|---|---|
| CN | 1940254 | A | 4/2007 |
| GB | 894207 | | 4/1962 |

OTHER PUBLICATIONS

U.S. Appl. No. 12/462,203, filed Jul. 30, 2009, Roderick A. Hyde et al.
U.S. Appl. No. 12/462,332, filed Jul. 31, 2009, Roderick A. Hyde et al.
PCT International Search Report; International App. No. PCT/US10/01075; Nov. 23, 2010; pp. 1-2.
PCT International Search Report; International App. No. PCT/US10/01073; Nov. 23, 2010; pp. 1-2.
PCT International Search Report; International App. No. PCT/US10/01074; Nov. 22, 2010; pp. 1-2.
PCT International Search Report; International App. No. PCT/US10/01076; Oct. 14, 2010; pp. 1-3.
Definition from Oxford Dictionary Online; "Mechanical"; Oxford English Dictionary; printed on Apr. 2, 2014; total of 16 pages; located at: http://www.oed.com/view/Entry/115544?redirectedFrom=mechanical&print.
Chinese State Intellectual Property Office, Decision of Non-Final Rejection; App. No. 201080026282.2 (Based on PCT Patent Application No. PCT/US2010/001074; Mar. 4, 2014 (received by our Agent on Mar. 7, 2014); 14 pages.
Chinese State Intellectual property Office First Office Action; App. No. 201080026277.1; Mar. 4, 2014 (received by our agent Mar. 11, 2014); 11 pages.
Definition from Dictionary.com; "Thermoelectric" p. 3, retrieved from dictionary.com Nov. 7, 2016.

* cited by examiner

METHOD AND SYSTEM FOR THE THERMOELECTRIC CONVERSION OF NUCLEAR REACTOR GENERATED HEAT

BACKGROUND

Thermoelectric devices and materials can be utilized to convert heat energy to electric power. Thermoelectric devices are further known to be implemented within a nuclear fission reactor system, so as to convert nuclear fission reactor generated heat to electric power during reactor operation.

SUMMARY

In one aspect, a method includes but is not limited to, upon a nuclear reactor system shutdown event, thermoelectrically converting nuclear reactor generated heat to electrical energy and supplying the electrical energy to at least one mechanical pump of the nuclear reactor system. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a means for, upon a nuclear reactor system shutdown event, thermoelectrically converting nuclear reactor generated heat to electrical energy and a means for supplying the electrical energy to at least one mechanical pump of the nuclear reactor system. In addition to the foregoing, other system aspects are described in the claims, drawings, and text forming a part of the present disclosure.

In one aspect, a system includes but is not limited to at least one thermoelectric device for converting nuclear reactor generated heat to electrical energy upon a nuclear reactor system shutdown event and at least one electrical output of the at least one thermoelectric device electrically coupled to at least one mechanical pump of the nuclear reactor system for supplying the electrical energy to the at least one mechanical pump of the nuclear reactor system. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1A:
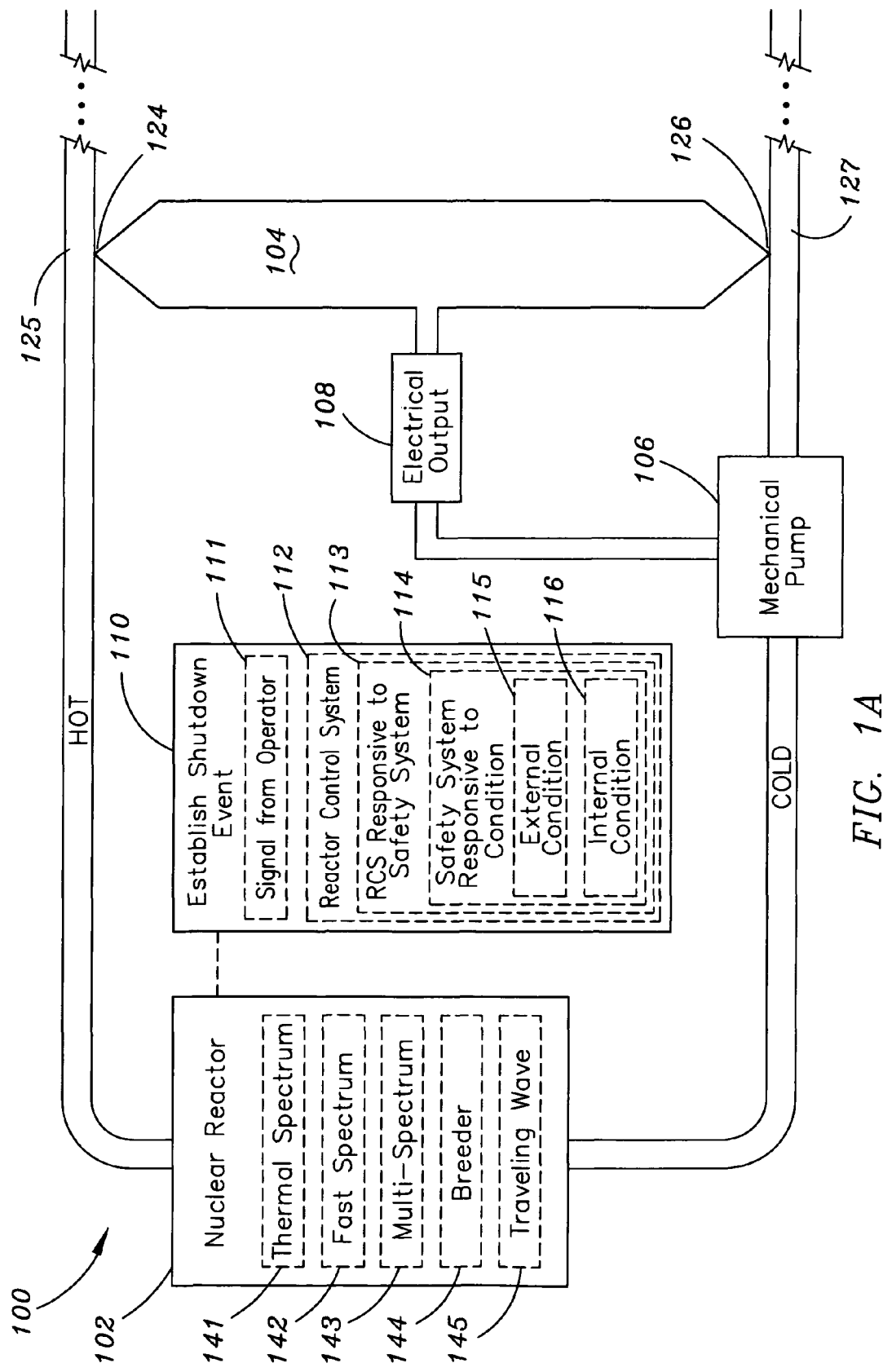
FIGS. 1A through 1G are schematics of a system for the thermoelectric conversion of nuclear reactor generated heat to electrical energy and the supplying of the electrical energy to a mechanical pump of the nuclear reactor system.
Figure 1B:
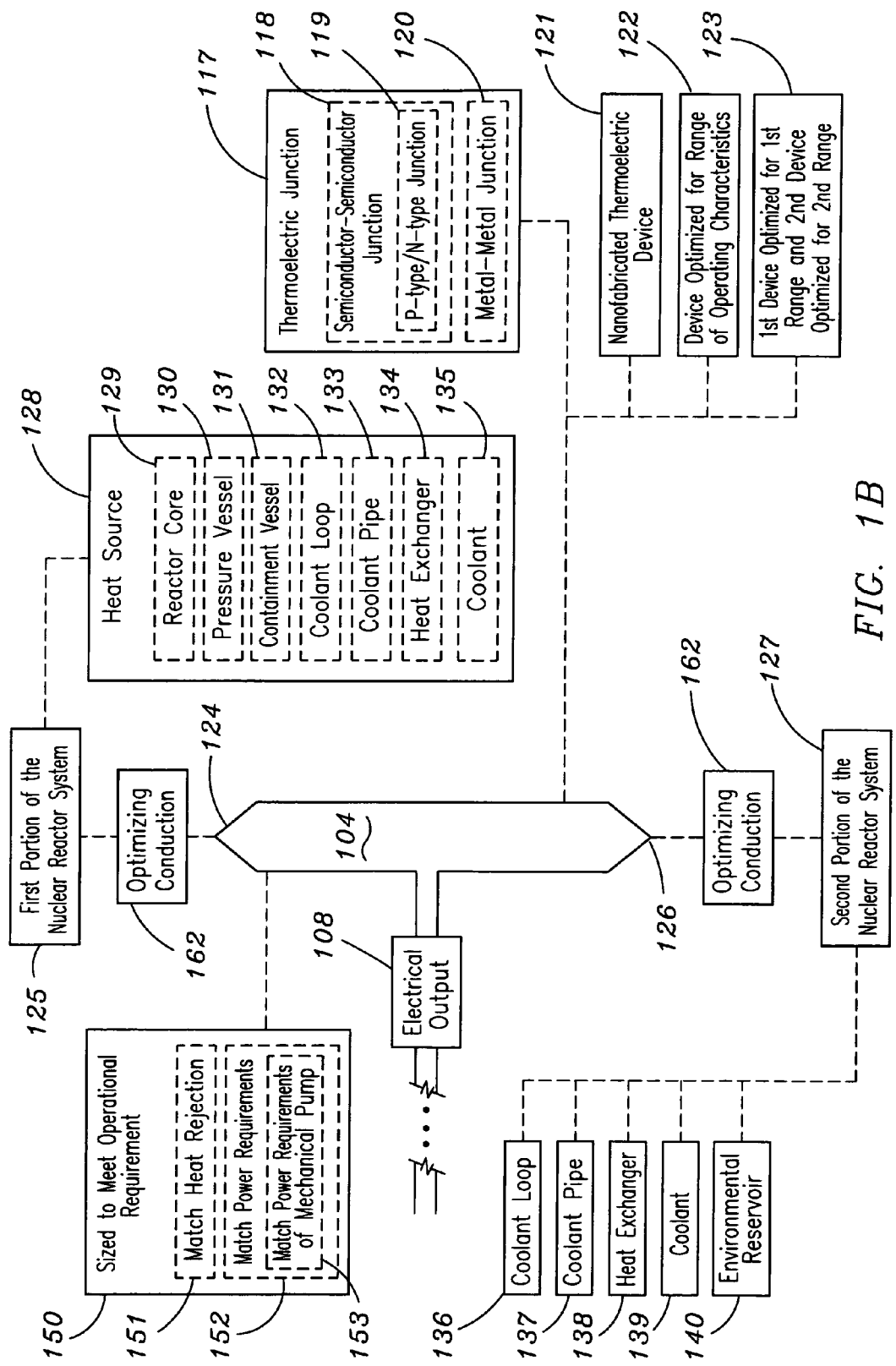
Figure 1C:
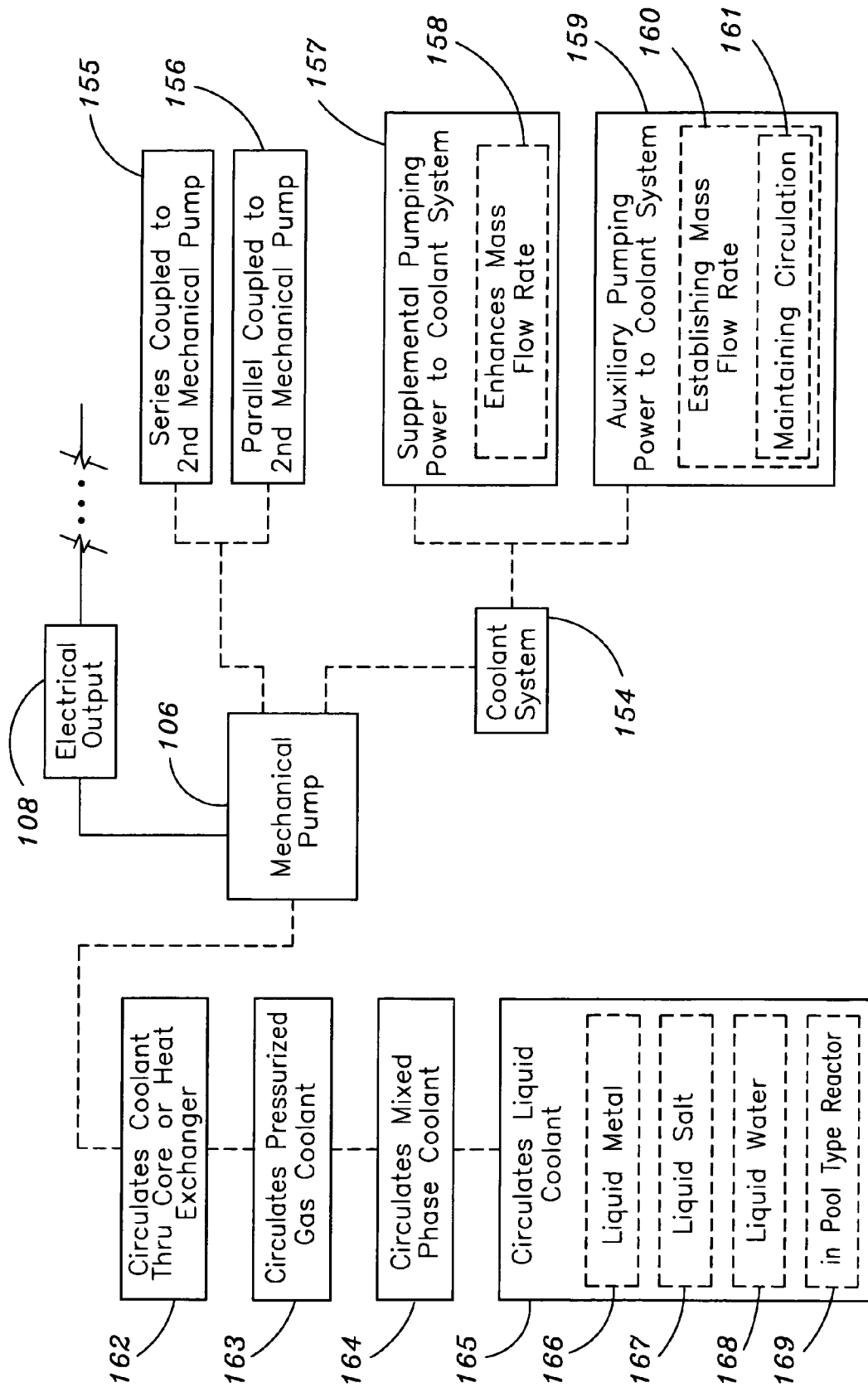
Figure 1D:
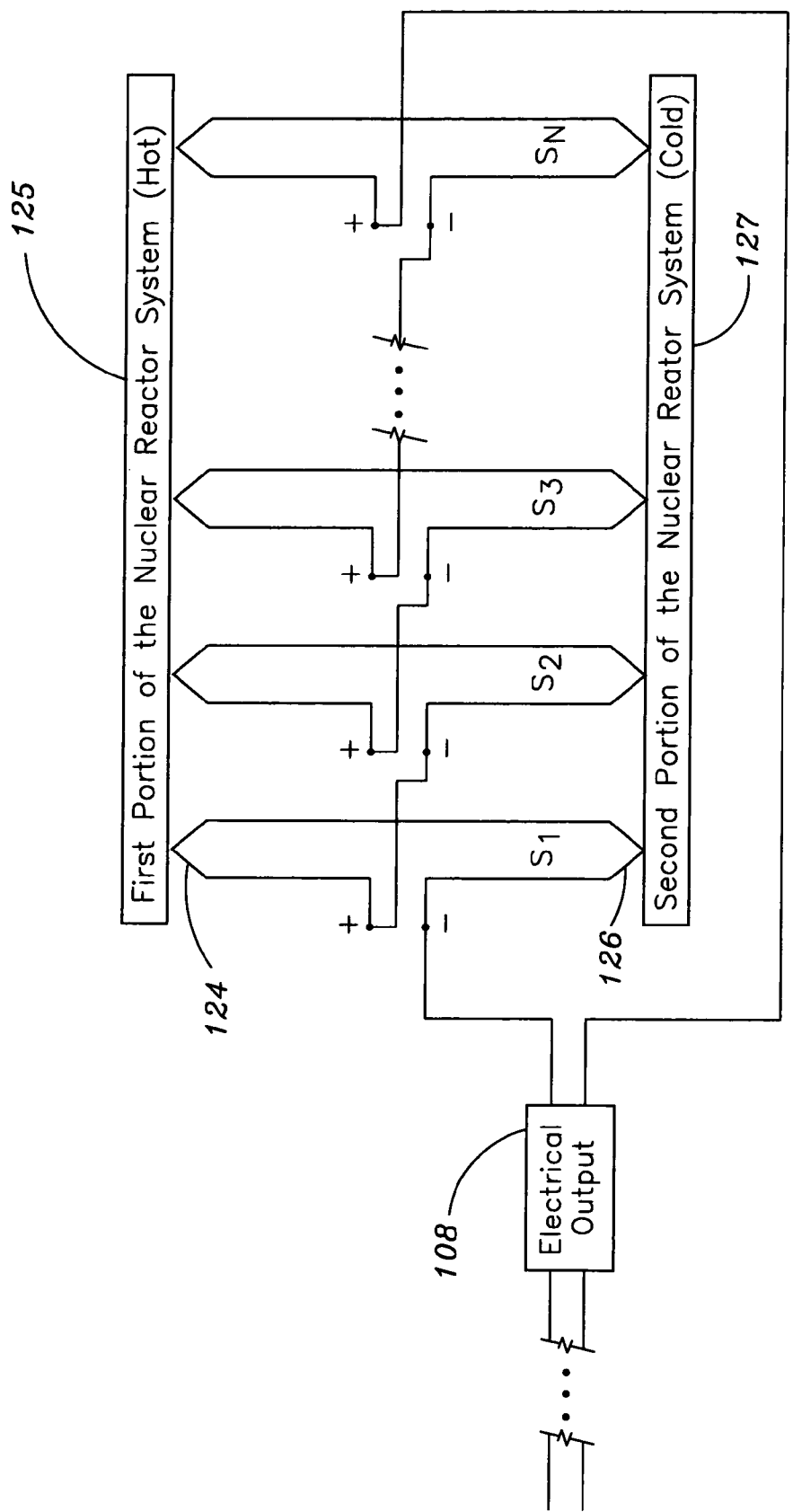
Figure 1E:
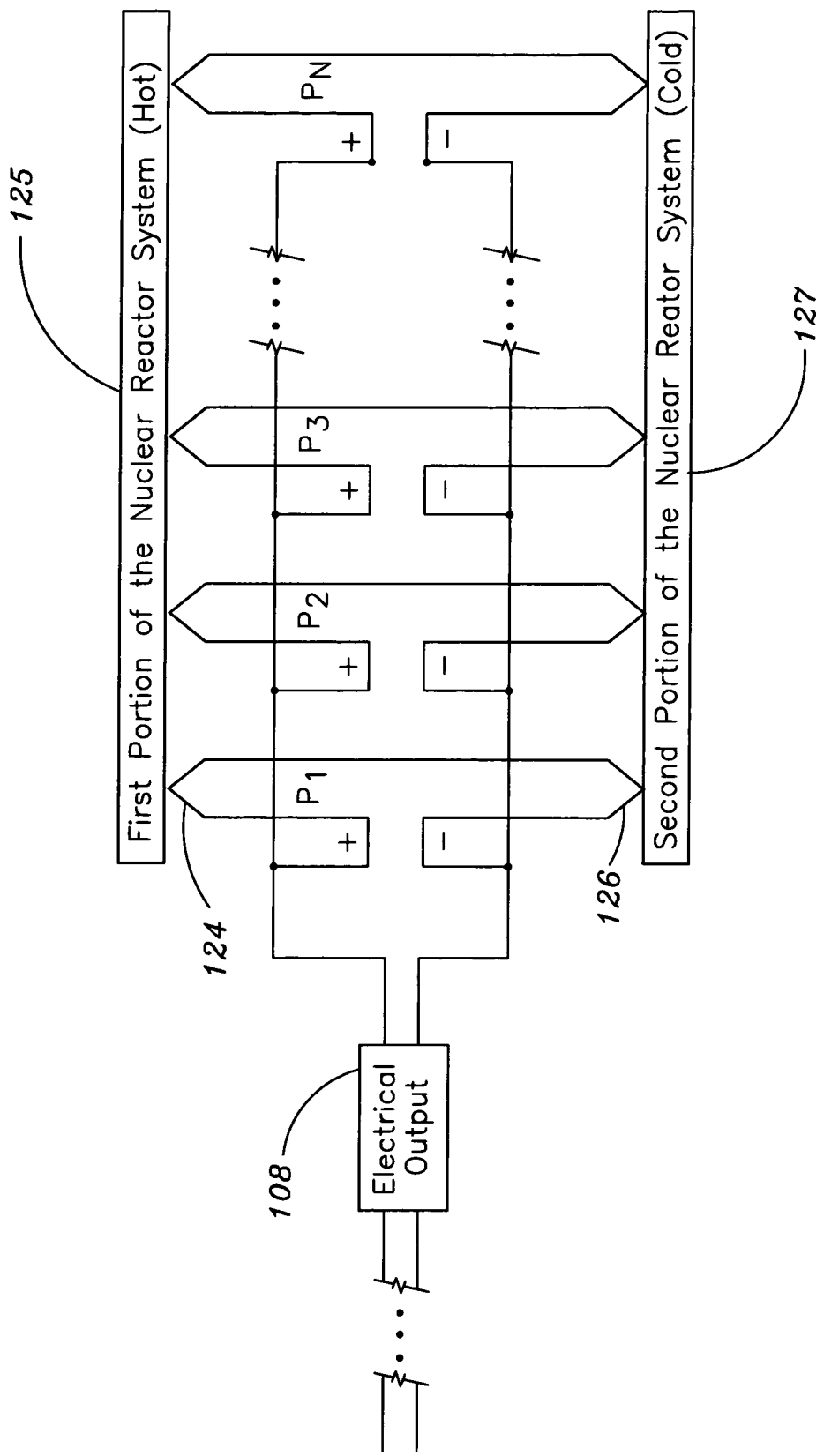
Figure 1F:
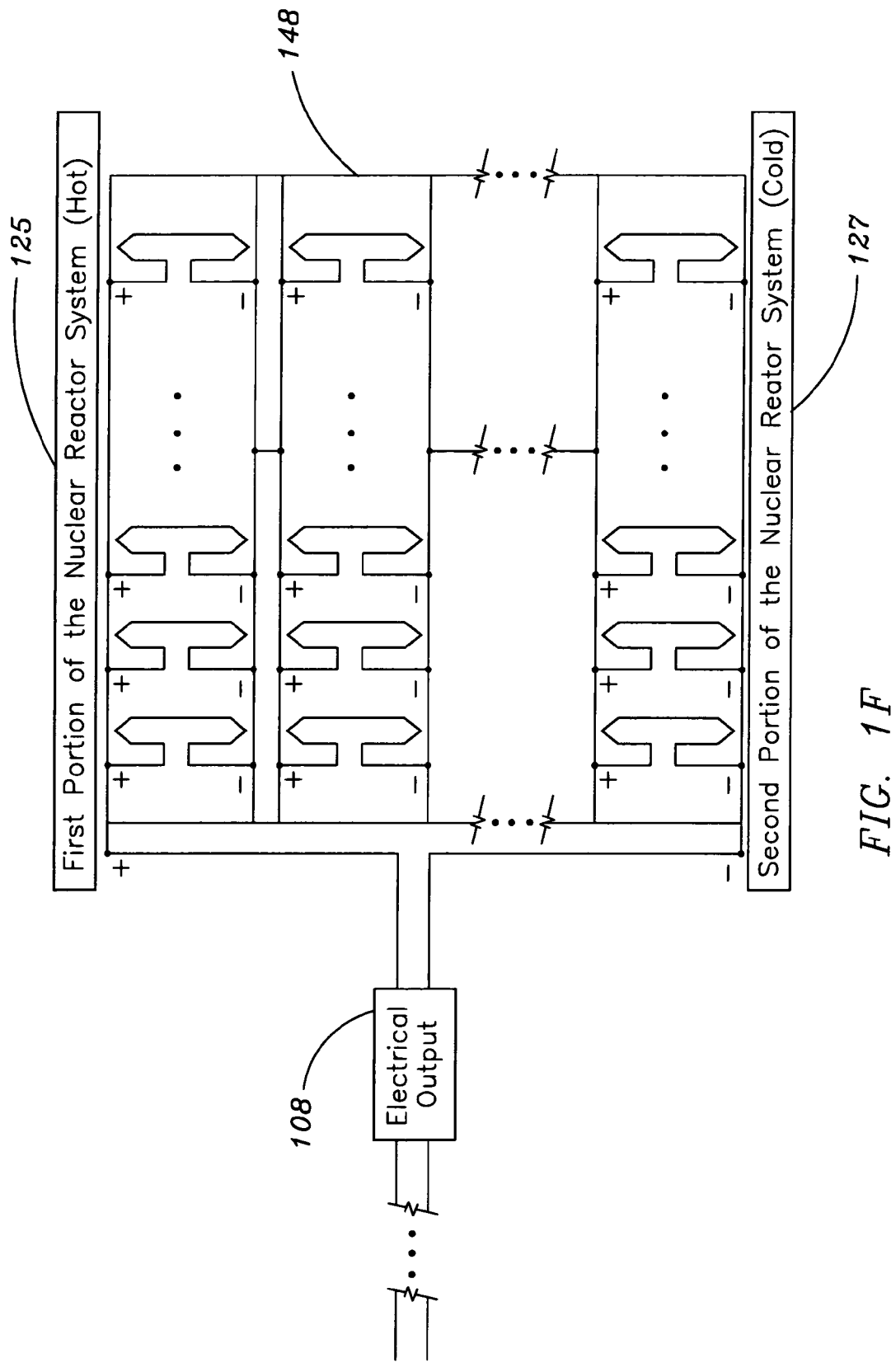
Figure 1G:
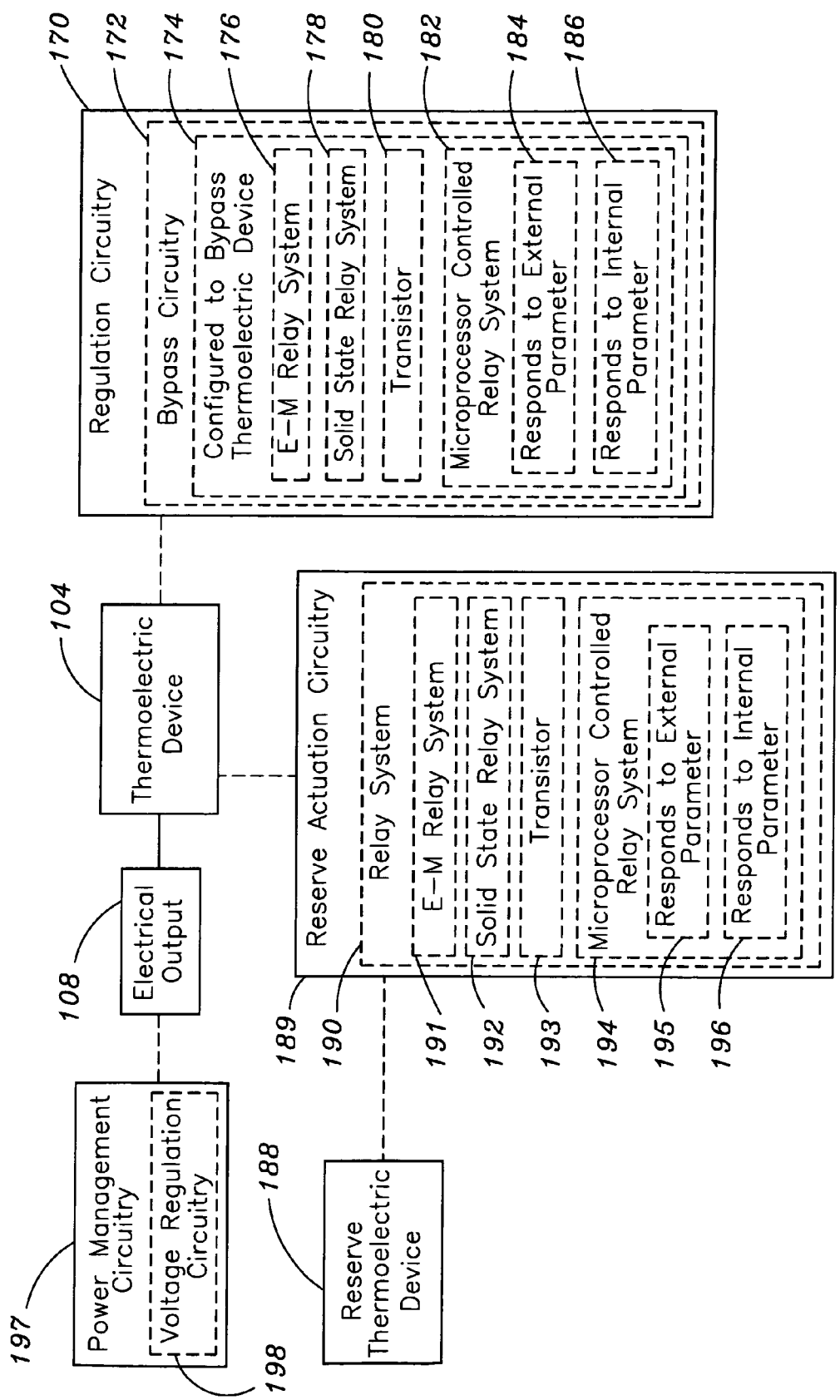

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1A through 1G, a system 100 for the thermoelectric conversion of nuclear reactor generated heat upon a nuclear reactor shutdown event 110 is described in accordance with the present disclosure. Upon a shutdown event 110 (e.g., routine shutdown or emergency shutdown) of a nuclear reactor system 100, a thermoelectric device 104 (e.g., a junction of two materials with different Seebeck coefficients) may convert heat (e.g., operational heat, decay heat, or residual heat) produced by the nuclear reactor 102 of the nuclear reactor system 100 to electrical energy. Then, the electrical output 108 of the thermoelectric device 104 may supply electrical energy to a mechanical pump 106 of the nuclear reactor system 100.

In embodiments, the nuclear reactor 102 of the nuclear reactor system 100 may include, but is not limited to, a thermal spectrum nuclear reactor 141, a fast spectrum nuclear reactor 142, a multi-spectrum nuclear reactor 143, a breeder reactor 144, or a traveling wave reactor 145. For example, the heat produced from a thermal spectrum nuclear reactor 141 may be thermoelectrically converted to electrical energy via one or more than one thermoelectric device 104. Then, the electrical output 108 of the thermoelectric device may be used to supply electrical energy to a mechanical pump 106 of the nuclear reactor system 100. By way of further example, the heat produced from a traveling wave nuclear reactor 145 may be thermoelectrically converted to electrical energy via one or more than one thermoelectric device 104. Then, the electrical output 108 of the thermoelectric device 104 may be used to supply electrical energy to a mechanical pump 106 of the nuclear reactor system 100.

In another embodiment, the nuclear reactor shutdown event 110 may be established by a signal from an operator 111. For example, the nuclear reactor shutdown event may be established by a remote signal, such as a wireline signal (e.g., copper wire signal or fiber optic cable signal) or a wireless signal (e.g., radio frequency signal) from an operator (e.g., human user). Then, upon establishing the nuclear reactor shutdown event 110 via a signal from an operator, the thermoelectric device 104 may convert heat produced by the nuclear reactor system 100 to electrical energy.

In another embodiment, the nuclear reactor shutdown event 110 may be established by a reactor control system 112 (e.g., a system of microprocessors or computers programmed to monitor and respond to specified reactor conditions, such as temperature). For instance, the nuclear reactor shutdown event may be established by a wireline signal (e.g., digital signal from microprocessor) sent from a reactor control system 112. In a further embodiment, the reactor control system 112 may be responsive to one or more signals from a safety system 113 (e.g., thermal monitoring system, radiation monitoring system, pressure monitoring system, or security system). For instance, at a critical temperature a safety system may send a digital signal to the reactor control system 112. In turn, the nuclear reactor shutdown event may be established via a signal from the reactor control system 112. In a further embodiment, the safety system of the nuclear reactor system may be responsive to a sensed condition 114 of the nuclear reactor system 100. For example, the safety system of the nuclear reactor system 100 may be responsive to one or more external conditions 115 (e.g., loss of heat sink, security breach, or loss of external power supply to support systems) or one or more internal conditions 116 (e.g., reactor temperature or core radiation levels). By way of further example, the safety system, upon sensing a loss of heat sink, may send a signal to the reactor control system 112. In turn, the reactor control system 112 may establish the nuclear reactor shutdown event 110. Then, upon establishing the nuclear reactor shutdown event 110 via a signal from a reactor control system 112, the thermoelectric device 104 may convert heat produced by the nuclear reactor system 100 to electrical energy.

In an embodiment, upon a nuclear reactor shutdown event 110, nuclear reactor generated heat may be converted to electrical energy via a thermoelectric device 104 placed in thermal communication (e.g., placed in thermal communication ex-situ or in-situ) with a portion of the nuclear reactor system 100. For example, the thermoelectric device 104 may be placed in thermal communication with a portion of the nuclear reactor system 100 during the construction of the nuclear reactor system 100. By way of further example, the nuclear reactor system 100 may be retrofitted such that a thermoelectric device 104 may be placed in thermal communication with a portion of the nuclear reactor system 100. Further, the thermoelectric device 104 may be placed in thermal communication with a portion of the nuclear reactor system 100 during operation of the nuclear reactor system 100 via a means of actuation (e.g., thermal expansion, electromechanical actuation, piezoelectric actuation, mechanical actuation). Then, a thermoelectric device 104 in thermal communication with a portion of the nuclear reactor system 100 may convert nuclear reactor generated heat to electrical energy.

In another embodiment, upon a nuclear reactor shutdown event 110, nuclear reactor generated heat may be converted to electrical energy via a thermoelectric device 104 having a first portion 124 in thermal communication with a first portion 125 of the nuclear reactor system 100 and a second portion 126 in thermal communication with a second portion 127 of the nuclear reactor system 100. For example, the first portion 124 of the thermoelectric device 104 may be in thermal communication with a heat source 128 of the nuclear reactor system. By way of further example, the heat source 128 may include, but is not limited to, a nuclear reactor core 129, a pressure vessel 130, a containment vessel 131, a coolant loop 132, a coolant pipe 133, a heat exchanger 134, or a coolant 135 of the coolant system 154 of the nuclear reactor system 100.

In another embodiment, the second portion 127 of the nuclear reactor system may be at a temperature lower than the first portion 125 of the nuclear reactor system 100. For example, the first portion 125 of the nuclear reactor system 100 may comprise a portion of the primary coolant system (e.g., at a temperature above 300° C.) of the nuclear reactor system 100 and the second portion 127 of the nuclear reactor system 100 may comprise a portion of a condensing loop (e.g., at a temperature below 75° C.) of the nuclear reactor system 100. By way of further example, the second portion 127 of the nuclear reactor system 100 may include, but is not limited to, a coolant loop 136, a coolant pipe 137, a heat exchanger 138, a coolant 139 of a coolant system 154, or an environmental reservoir 140 (e.g., a lake, a river, or a subterranean structure). For instance, a first portion 124 of a thermoelectric device 104 may be in thermal communication with a heat exchanger 134 of the nuclear reactor system 100 and the second portion 126 of the thermoelectric device 104 may be in thermal communication with an environmental reservoir 140, such as a lake.

In another embodiment, the thermoelectric device 104 and a portion of the nuclear reactor system 100 may both be in thermal communication with a means for optimizing thermal conduction 162 (e.g., thermal paste, thermal glue, thermal cement, or other highly thermally conductive materials) between the thermoelectric device 104 and the portion of the nuclear reactor system 100. For example, the first portion 124 of the thermoelectric device 104 may be contacted to the first portion 125 of the nuclear reactor system 100 using thermal cement.

In an embodiment, the thermoelectric device 104 used to convert nuclear reactor generated heat to electrical energy may comprise at least one thermoelectric junction 117 (e.g., a thermocouple or other device formed from a junction of more than one material each with different Seebeck coefficients). For example, the thermoelectric junction 117 may include, but is not limited to, a semiconductor-semiconductor junction 118 (e.g., p-type/p-type junction or n-type/n-type junction) or a metal-metal junction 120 (e.g., copper-constantan). By further example, the semiconductor-semiconductor junction may include a p-type/n-type semiconductor junction (e.g., p-doped bismuth telluride/n-doped bismuth telluride junction, p-doped lead telluride/n-doped lead telluride junction, or p-doped silicon germanium/n-doped silicon germanium junction).

In another embodiment, the thermoelectric device 104 used to convert nuclear reactor generated heat to electrical energy may comprise at least one nanofabricated thermoelectric device 121 (i.e., a device wherein the thermoelectric effect is enhanced due to nanoscale manipulation of its constituent materials). For example, the nanofabricated device may include, but is not limited to, a device constructed in part from a quantum dot material (e.g., PbSeTe), a nanowire material (e.g., Si), or a superlattice material (e.g., $Bi_2Te_3/Sb_2Te_3$).

In another embodiment, the thermoelectric device 104 used to convert nuclear reactor generated heat to electrical energy may comprise a thermoelectric device optimized for a specified range of operating characteristics 122. For example, the thermoelectric device optimized for a specified range of operating characteristics 122 may include, but is not limited to, a thermoelectric device having an output efficiency optimized for a specified range of temperature. For instance, the thermoelectric device 104 may include a thermoelectric device with a maximum efficiency between approximately 200° C. and 500° C., such as a thermoelectric device comprised of thallium doped lead telluride. It will be appreciated in light of the description provided herein, that a nuclear reactor system 100 incorporating a thermoelectric device 104 may incorporate a thermoelectric device having a maximum output efficiency within the operating temperature range of the nuclear reactor system 100.

In another embodiment, the heat generated by the nuclear reactor 102 may be converted to electrical energy using a first thermoelectric device optimized for a first range of operating characteristics and a second thermoelectric device optimized for a second range of operating characteristics 123. For example, the output efficiency of a first thermoelectric device may be optimized for a first range in temperature and the output efficiency of a second thermoelectric device may be optimized for a second range in temperature. For instance, the nuclear reactor generated heat may be converted to electrical energy using a first thermoelectric device having a maximum efficiency between approximately 500° and 600° C. and a second thermoelectric device having a maximum efficiency between approximately 400° and 500° C. In a further embodiment, the heat generated by the nuclear reactor 102 may be converted to electrical energy using a first thermoelectric device optimized for a first range of operating characteristics, a second thermoelectric device optimized for a second range of operating characteristics, and up to and including a Nth device optimized for a Nth range of operating characteristics. For instance, the nuclear reactor generated heat may be converted to electrical energy using a first thermoelectric device with a maximum efficiency between approximately 200° and 300° C., a second thermoelectric device with a maximum efficiency between approximately 400° and 500° C., and a third thermoelectric device with a maximum efficiency between approximately 500° and 600° C.

In another embodiment, the heat generated by the nuclear reactor 102 may be converted to electrical energy using two or more series coupled thermoelectric devices 104. For example, the heat generated by the nuclear reactor 102 may be converted to electrical energy using a first thermoelectric device $S_1$ and a second thermoelectric device $S_2$, where the first thermoelectric device $S_1$ and the second thermoelectric device $S_2$ are electrically coupled in series. By way of further example, the heat generated by the nuclear reactor 102 may be converted to electrical energy using a first thermoelectric device $S_1$, a second thermoelectric device $S_2$, a third thermoelectric device $S_3$, and up to and including an Nth thermoelectric device $S_N$, where the first thermoelectric device $S_1$, the second thermoelectric device $S_2$, the third thermoelectric device $S_3$, and the Nth thermoelectric device $S_N$ are electrically coupled in series.

In another embodiment, the heat generated by the nuclear reactor 102 may be converted to electrical energy using two or more parallel coupled thermoelectric devices 104. For example, the heat generated by the nuclear reactor 102 may be converted to electrical energy using a first thermoelectric device $P_1$ and a second thermoelectric device $P_2$, where the first thermoelectric device $P_1$ and the second thermoelectric device $P_2$ are electrically coupled in parallel. By way of further example, the heat generated by the nuclear reactor 102 may be converted to electrical energy using a first thermoelectric device $P_1$, a second thermoelectric device $P_2$, a third thermoelectric device $P_3$, and up to and including an Nth thermoelectric device $P_N$, where the first thermoelectric device $P_1$, the second thermoelectric device $P_2$, the third thermoelectric device $P_3$, and the Nth thermoelectric device $P_N$ are electrically coupled in parallel.

In another embodiment, the heat generated by the nuclear reactor 102 may be converted to electrical energy using one or more than one thermoelectric module 148. For example, a thermoelectric module in thermal communication with the nuclear reactor system 100 (e.g., first portion of a thermoelectric module in thermal communication with a heat source 128 and the second portion of a thermoelectric module in thermal communication with an environmental reservoir 140) may convert nuclear reactor generated heat to electrical energy. For example, the thermoelectric module 148 may comprise a prefabricated network of parallel coupled thermoelectric devices, series coupled thermoelectric devices, and combinations of parallel coupled and series coupled thermoelectric devices. By way of further example, a thermoelectric module 148 may include a first set of parallel coupled thermoelectric devices, a second set of parallel coupled thermoelectric devices, and up to and including a Mth set of parallel coupled thermoelectric devices, where the first set of devices, the second set of devices, and the Mth set of devices are electrically coupled in series. By way of further example, a thermoelectric module 148 may include a first set of series coupled thermoelectric devices, a second set of series coupled thermoelectric devices, and up to and including a Mth set of series coupled thermoelectric devices, where the first set of devices, the second set of devices, and the Mth set of devices are electrically coupled in parallel.

In an embodiment, the heat generated by the nuclear reactor 102 may be converted to electrical energy using one or more than one thermoelectric device sized to meet a selected operational requirement 150 of the nuclear reactor system 100. For example, the thermoelectric device may be sized to partially match the heat rejection 151 of the thermoelectric device with a portion of the heat produced by the nuclear reactor system 100. For instance, the thermoelectric device may be sized by adding or subtracting the number of thermoelectric junctions 117 used in the thermoelectric device 104. By way of further example, the thermoelectric device may be sized to match the power requirements 152 of a selected operating system (e.g., control system, safety system, or coolant system). For instance, the thermoelectric device may be sized to match the mechanical pump power requirements 153 of a coolant system 154 of the nuclear reactor system 100.

In certain embodiments, the thermoelectric device 104 used to convert heat produced by the nuclear reactor system 100 to electrical energy may be protected via regulation circuitry 170, such as voltage regulation circuitry (e.g., voltage regulator), current limiting circuitry (e.g., blocking diode or fuse), or bypass circuitry 172 (e.g., bypass diode or active bypass circuitry). For example, the regulation circuitry used to protect the thermoelectric device 104 may include a fuse, wherein the fuse is used to limit current from passing through a short-circuited portion of a set of two or more thermoelectric devices 104. In a further embodiment, bypass circuitry configured to actively electrically bypass 174 one or more than one thermoelectric device 104 may be used to protect one or more than one thermoelectric device 104. For example, the bypass circuitry configured to actively electrically bypass 174 a thermoelectric device 104 may include, but is not limited to, an electromagnetic relay system 176, a solid state relay system 178, a transistor 180, or a microprocessor controlled relay system 182. By way of further example, the microprocessor controlled relay system 182 used to electrically bypass a thermoelectric device 104 may be responsive to an external parameter (e.g., signal from an operator) or an internal parameter (e.g., current flowing through a specified thermoelectric device).

In another embodiment, one or more than one thermoelectric device 104 used to convert heat produced by the nuclear reactor system 100 to electrical energy may be augmented by one or more than one reserve thermoelectric device 188 (e.g., a thermoelectric junction or a thermoelectric module) and reserve actuation circuitry 189. For example, the electrical output 108 of one or more than one thermoelectric device 104 may be augmented using the output of a reserve thermoelectric device 188, where the one or more than one reserve thermoelectric device may be selectively coupled to one or more than one thermoelectric device 104 using reserve actuation circuitry 189. For example, in the event a first thermoelectric device 104 of a set of thermoelectric devices fails, a reserve thermoelectric device may be coupled to the set of thermoelectric devices in order to augment the output of the set of thermoelectric devices. By way of further example, the reserve actuation circuitry 189 used to selectively couple the one or more reserve thermoelectric devices 188 with the one or more thermoelectric devices 104 may include, but is not limited to, a relay system 190, an electromagnetic relay system 191, a solid state relay system 192, a transistor 193, a microprocessor controlled relay system, a microprocessor controlled relay system programmed to respond to an external parameter (e.g., required electrical power output of nuclear reactor system 100 or availability of external electric grid power), or a microprocessor controlled relay system programmed to respond to an internal parameter (e.g., output of one or more than one thermoelectric device 104).

In another embodiment, the electrical output 108 of one or more than one thermoelectric device 104 used to convert heat produced by the nuclear reactor system 100 to electrical energy may be modified using power management circuitry. For example, the power management circuitry 197 used to modify the electrical output 108 of a thermoelectric device 104 may include, but is not limited to, a power converter, voltage converter (e.g., a DC-DC converter or a DC-AC inverter), or voltage regulation circuitry 198. By way of further example, the voltage regulation circuitry 198 used to modify the electrical output 108 of a thermoelectric device 104 may include, but is not limited to, a Zener diode, a series voltage regulator, a shunt regulator, a fixed voltage regulator or an adjustable voltage regulator.

In an embodiment, the thermoelectric device 104 may convert heat produced by the nuclear reactor system 100 to electrical energy during initiation of a nuclear reactor shutdown. For example, during initiation of a routine nuclear reactor shutdown (e.g., scheduled shutdown) or an emergency nuclear reactor shutdown (e.g., SCRAM), the thermoelectric device 104 may convert heat produced by the nuclear reactor system to electrical energy.

In another embodiment, preceding initiation of a nuclear reactor shutdown, the thermoelectric device 104 may convert heat produced by the nuclear reactor system 100 to electrical energy. For example, preceding initiation of a routine nuclear reactor shutdown or emergency nuclear reactor shutdown, the thermoelectric device 104 may convert heat produced by the nuclear reactor system 100 to electrical energy.

In an additional embodiment, following initiation of a nuclear reactor shutdown, the thermoelectric device 104 may convert heat produced by the nuclear reactor system 100 to electrical energy. For example, following initiation of a routine nuclear reactor shutdown or emergency nuclear reactor shutdown, the thermoelectric device 104 may convert heat produced by the nuclear reactor system 100 to electrical energy.

In another embodiment, upon a nuclear reactor shutdown event 110, nuclear reactor generated decay heat may be thermoelectrically converted to electrical energy. For example, after the shutdown of a nuclear reactor system 100, a thermoelectric device 104 may convert the persisting radioactive decay heat to electrical energy. Then, the electrical output 108 of the thermoelectric device may be used to power the mechanical pump 106.

In an additional embodiment, upon a nuclear reactor shutdown event 110, nuclear reactor generated residual heat may be thermoelectrically converted to electrical energy. For example, after the shutdown of a nuclear reactor system 100, a thermoelectric device 104 may convert the residual heat of the nuclear reactor to electrical energy. Then, the electrical output 108 of the thermoelectric device may be used to power the mechanical pump 106.

In an embodiment, the electrical output 108 of a thermoelectric device 104 may supply electrical energy to a mechanical pump 106 circulating coolant through a portion of the reactor core or a heat exchanger 162 of the nuclear reactor system 100. For example, the electrical output 108 of a thermoelectric device 104 may supply electrical energy to a mechanical pump 106 circulating coolant through the heat exchanger between the primary coolant loop and an intermediate coolant system of a nuclear reactor system 100.

In another embodiment, the electrical output 108 of a thermoelectric device 104 may supply electrical energy to a mechanical pump 106 circulating a pressurized gas coolant (e.g., helium, nitrogen, supercritical $CO_2$, or steam) of a coolant system 154 of a nuclear reactor system 100. For example, the electrical output 108 of a thermoelectric device 104 may supply electrical energy to a mechanical pump 106 circulating pressurized helium through the primary coolant system of a nuclear reactor system 100.

In another embodiment, the electrical output 108 of a thermoelectric device 104 may supply electrical energy to a mechanical pump 106 circulating a liquid coolant of a coolant system 154 of the nuclear reactor system 100. For example, the liquid coolant circulated by the mechanical pump 106 may include, but is not limited to, a liquid metal coolant (e.g., liquid sodium, liquid lead, or liquid lead bismuth), a liquid salt coolant (e.g., lithium fluoride or other fluoride salts), or a liquid water coolant. Further, the mechanical pump 106 may circulate a liquid coolant through a coolant pool of a pool-type nuclear reactor system 100. For instance, the mechanical pump 106 may circulate liquid sodium in a pool-type breeder nuclear reactor system 100.

In another embodiment, the electrical output 108 of a thermoelectric device 104 may supply electrical energy to a mechanical pump 106 circulating a mixed phase coolant of a coolant system 154 of the nuclear reactor system 100. For example, the mechanical pump 106 may circulate a gas-liquid (e.g., steam-liquid water) mixed phase coolant of a coolant system 154 of a nuclear reactor system 100.

In another embodiment, the electrical output 108 of a thermoelectric device 104 may be used to partially drive a mechanical pump 106 of the nuclear reactor system 100. For example, the electrical output 108 of a thermoelectric device 104 may partially drive a mechanical pump 106 coupled to a coolant system 154 (e.g., primary coolant system or secondary coolant system) of the nuclear reactor system 100.

In an embodiment, the electrical output 108 of a thermoelectric device 104 may be used to partially drive a mechanical pump 106 coupled to a coolant system 154 of a nuclear reactor system 100 and coupled in series 155 with an additional mechanical pump. For example, a first mechanical pump 106 may be driven by the electrical output 108 of a thermoelectric device and may, in combination with a series connected additional mechanical pump 155, circulate a coolant through a coolant system 154 of the nuclear reactor system 100.

In another embodiment, the electrical output 108 of a thermoelectric device 104 may be used to partially drive a mechanical pump 106 coupled to a coolant system 154 of a nuclear reactor system 100 and coupled in parallel 156 with an additional mechanical pump. For example, a first mechanical pump 106 may be driven by the electrical output 108 of a thermoelectric device and may, in combination with a parallel connected additional mechanical pump 156, circulate a coolant through a coolant system of the nuclear reactor system 100.

In another embodiment, the electrical output 108 of a thermoelectric device 104 may be used to partially drive a mechanical pump 106 coupled to a coolant system 154 in order to provide supplemental pumping power 157 to the coolant system 154. For example, the mechanical pump 106 driven by the electrical output 108 of the thermoelectric device 104 may be used to supplement the pumping power of another mechanical pump. For instance, during partial loss of external electric power, in which external grid power to a first mechanical pump partially fails, the electrical output 108 of one or more than one thermoelectric device 104 may be used to drive a second mechanical pump 106 in order to supplement the pumping power 157 of the first mechanical pump. By way of further example, the supplemental pumping power 157 provided by a mechanical pump 106 driven by the electrical output 108 of a thermoelectric device 104 may be used to enhance the mass flow rate 158 of coolant in a coolant system 154.

In another embodiment, the electrical output 108 of a thermoelectric device 104 may be used to partially drive a mechanical pump 106 coupled to a coolant system 154 in order to provide auxiliary pumping power 159 to the coolant system 154. For example, during malfunction of a first mechanical pump, in which the first mechanical pump totally fails, the electrical output 108 of one or more than one thermoelectric device 104 may be used to drive a second mechanical pump 106 in order to provide auxiliary pumping power 159 to the coolant system 154 of the nuclear reactor system 100. By way of further example, the auxiliary pumping power 159 provided by a mechanical pump 106 driven by the electrical output 108 of a thermoelectric device 104 may be used to establish a mass flow rate 160 of coolant in a coolant system 154. By way of further example, a mass flow rate 160 may be established by a mechanical pump 106 driven by the electrical output 108 of the thermoelectric device 104, where the mass flow rate is established in order to maintain coolant circulation in a coolant system 154 of the nuclear reactor system 100. For instance, the established coolant mass flow rate may maintain coolant circulation in a portion of the nuclear reactor system 100, including, but not limited to, a reactor coolant pool, a reactor coolant pressure vessel, a reactor heat exchange loop, or an ambient coolant reservoir. By way of further example, a mechanical pump 106 driven by the electrical output 108 of a thermoelectric device 104 may be used to establish a mass flow rate 160 in a liquid sodium coolant of a primary coolant loop of a nuclear reactor system 100 in order to maintain circulation of the liquid sodium coolant.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
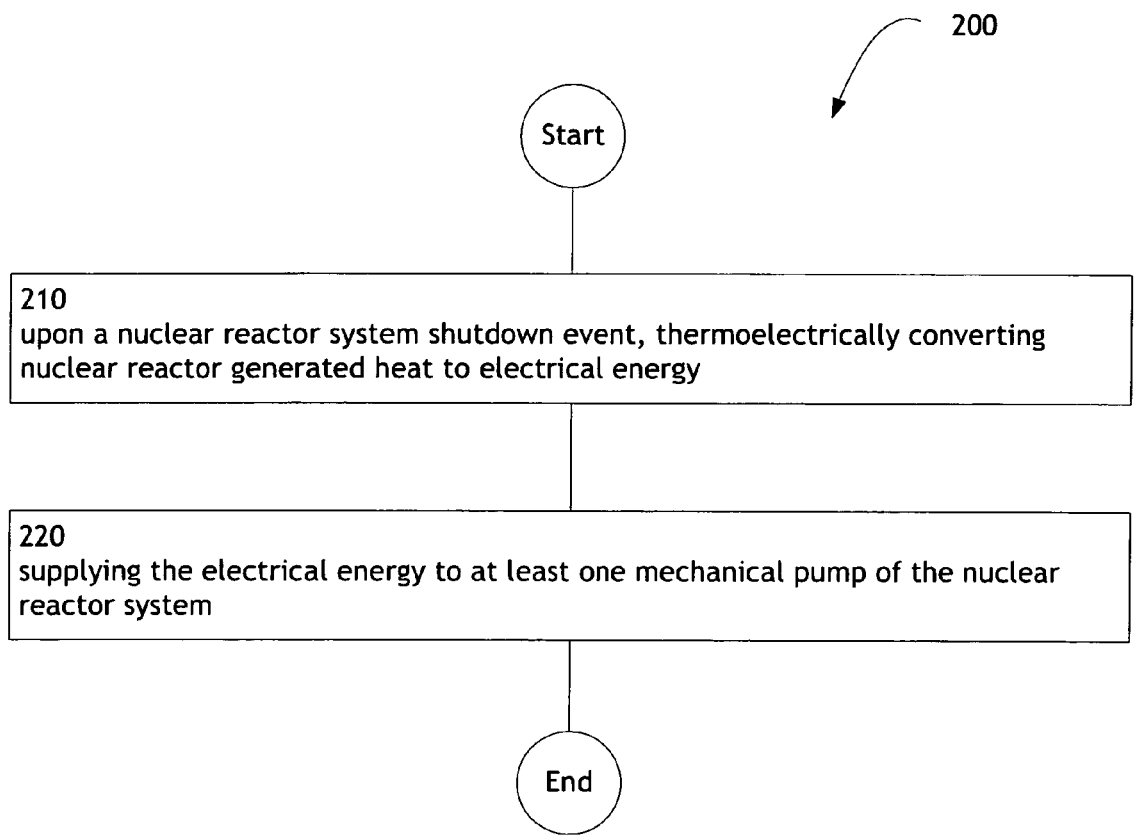
FIG. 2 is a high-level flowchart of a method for thermoelectrically converting nuclear reactor generated heat to electrical energy.

FIG. 2 illustrates an operational flow 200 representing example operations related to the thermoelectric conversion of nuclear reactor generated heat to electrical energy upon a nuclear reactor system shutdown event. In FIG. 2 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those which are illustrated, or may be performed concurrently.

After a start operation, the operational flow 200 moves to a converting operation 210. Operation 210 depicts, upon a nuclear reactor system shutdown event, thermoelectrically converting nuclear reactor generated heat to electrical energy. For example, as shown in FIG. 1, upon a shutdown event 110 of a nuclear reactor system 100, a thermoelectric device 104 may convert heat produced by the nuclear reactor system 100 to electrical energy.

Then, supplying operation 220 depicts supplying the electrical energy to at least one mechanical pump of the nuclear reactor system. For example, as shown in FIG. 1, the electrical output 108 of a thermoelectric device 104 may be used to supply electrical energy to a mechanical pump 106 of the nuclear reactor system 100.

Figure 3:
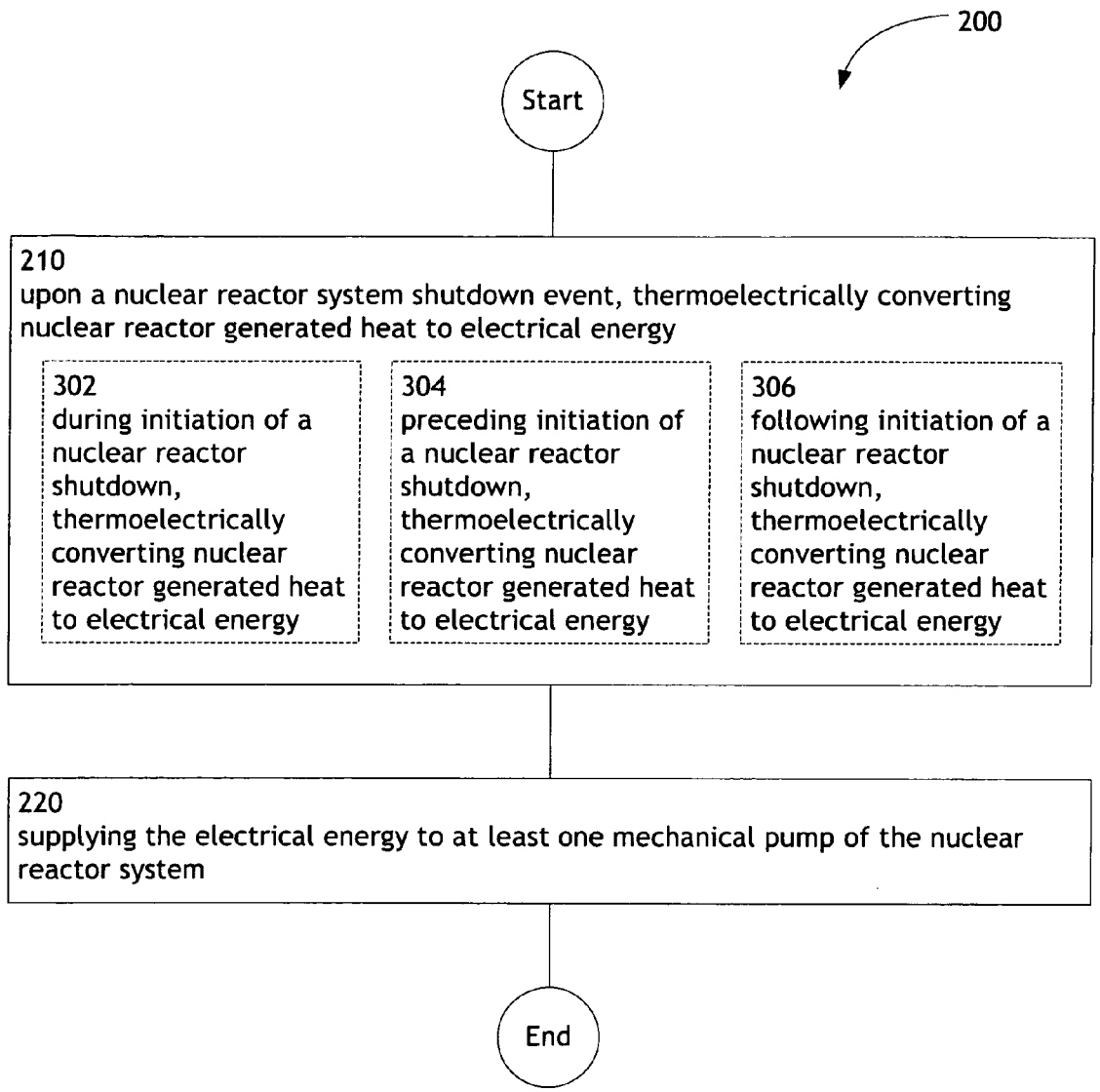
FIGS. 3 through 30 are high-level flowcharts depicting alternate implementations of FIG. 2.

FIG. 3 illustrates alternative embodiments of the example operational flow 200 of FIG. 2. FIG. 3 illustrates example embodiments where the operation 210 may include at least one additional operation. Additional operations may include an operation 302, an operation 304, and/or an operation 306.

At operation 302, nuclear reactor generated heat may be thermoelectrically converted to electrical energy during initiation of a nuclear reactor shutdown. For example, as shown in FIG. 1, during initiation of a nuclear reactor shutdown 102, a thermoelectric device 104 may convert heat produced by the nuclear reactor system 100 to electrical energy.

At operation 304, nuclear reactor generated heat may be thermoelectrically converted to electrical energy preceding initiation of a nuclear reactor shutdown. For example, as shown in FIG. 1, preceding initiation of a nuclear reactor shutdown 102, a thermoelectric device 104 may convert heat produced by the nuclear reactor system 100 to electrical energy.

At operation 306, nuclear reactor generated heat may be thermoelectrically converted to electrical energy following initiation of a nuclear reactor shutdown. For example, as shown in FIG. 1, following initiation of a nuclear reactor shutdown 102, a thermoelectric device 104 may convert heat produced by the nuclear reactor system 100 to electrical energy.

Figure 4:
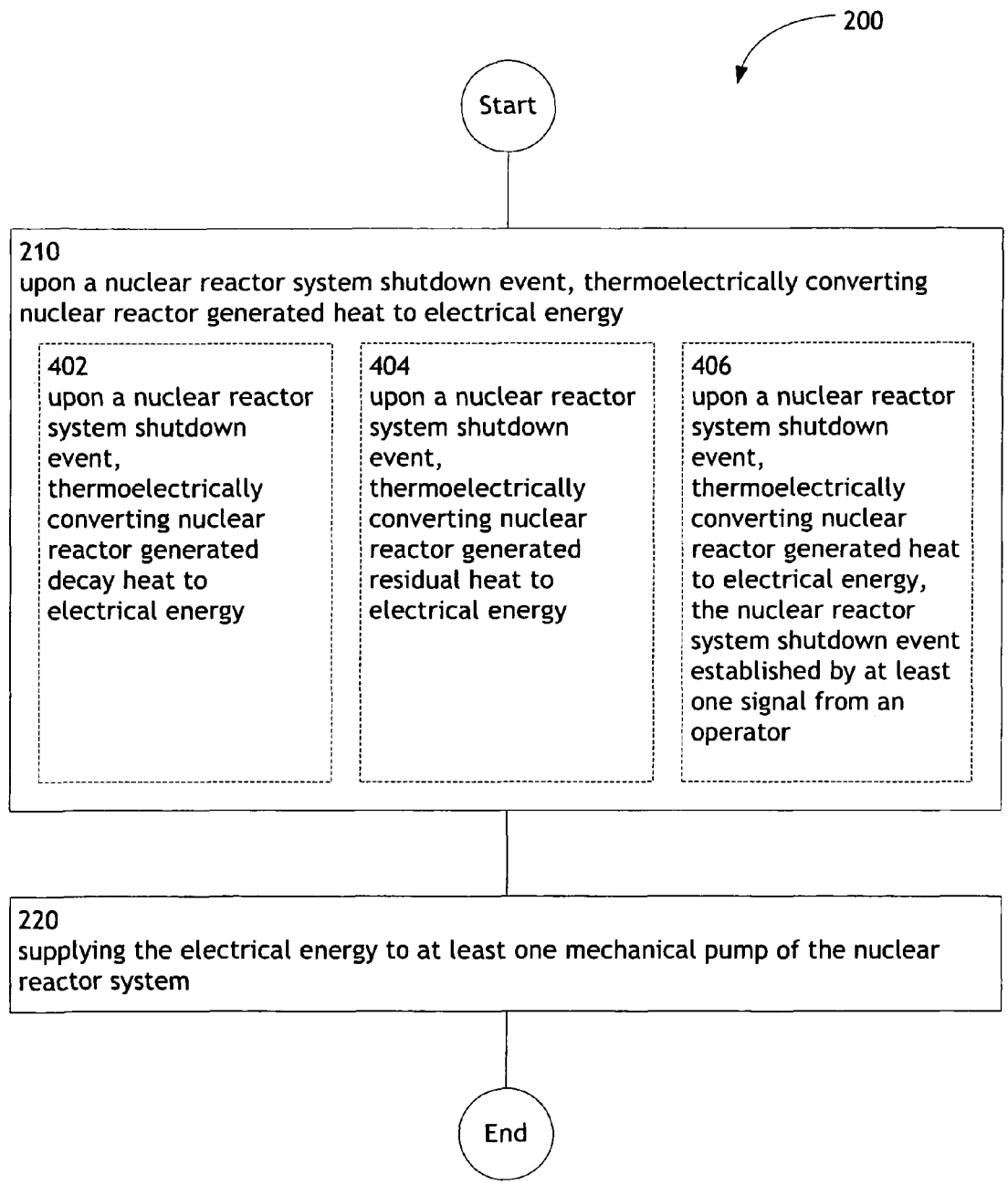

FIG. 4 illustrates alternative embodiments of the example operational flow 200 of FIG. 2. FIG. 4 illustrates example embodiments where the converting operation 210 may include at least one additional operation. Additional operations may include an operation 402, an operation 404, and/or an operation 406.

At operation 402, upon a nuclear reactor system shutdown event, nuclear reactor generated decay heat may be thermoelectrically converted to electrical energy. For example, as shown in FIG. 1, upon a nuclear reactor system shutdown event 110, a thermoelectric device 104 may convert radioactive decay heat produced by the nuclear reactor system 100 to electrical energy.

At operation 404, upon a nuclear reactor system shutdown event, residual nuclear reactor generated heat may be thermoelectrically converted to electrical energy. For example, as shown in FIG. 1, upon a nuclear reactor system shutdown event 110, a thermoelectric device 104 may convert residual heat produced by the nuclear reactor system 100 to electrical energy.

At operation 406, upon a nuclear reactor system shutdown event established by at least one signal from an operator, nuclear reactor generated heat may be thermoelectrically converted to electrical energy. For example, as shown in FIG. 1, a nuclear reactor system shutdown event 110 may be established by at least one signal from an operator 111 (e.g., a human user). Upon establishing the nuclear shutdown event, a thermoelectric device 104 may convert heat produced by the nuclear reactor system 100 to electrical energy.

Figure 5:
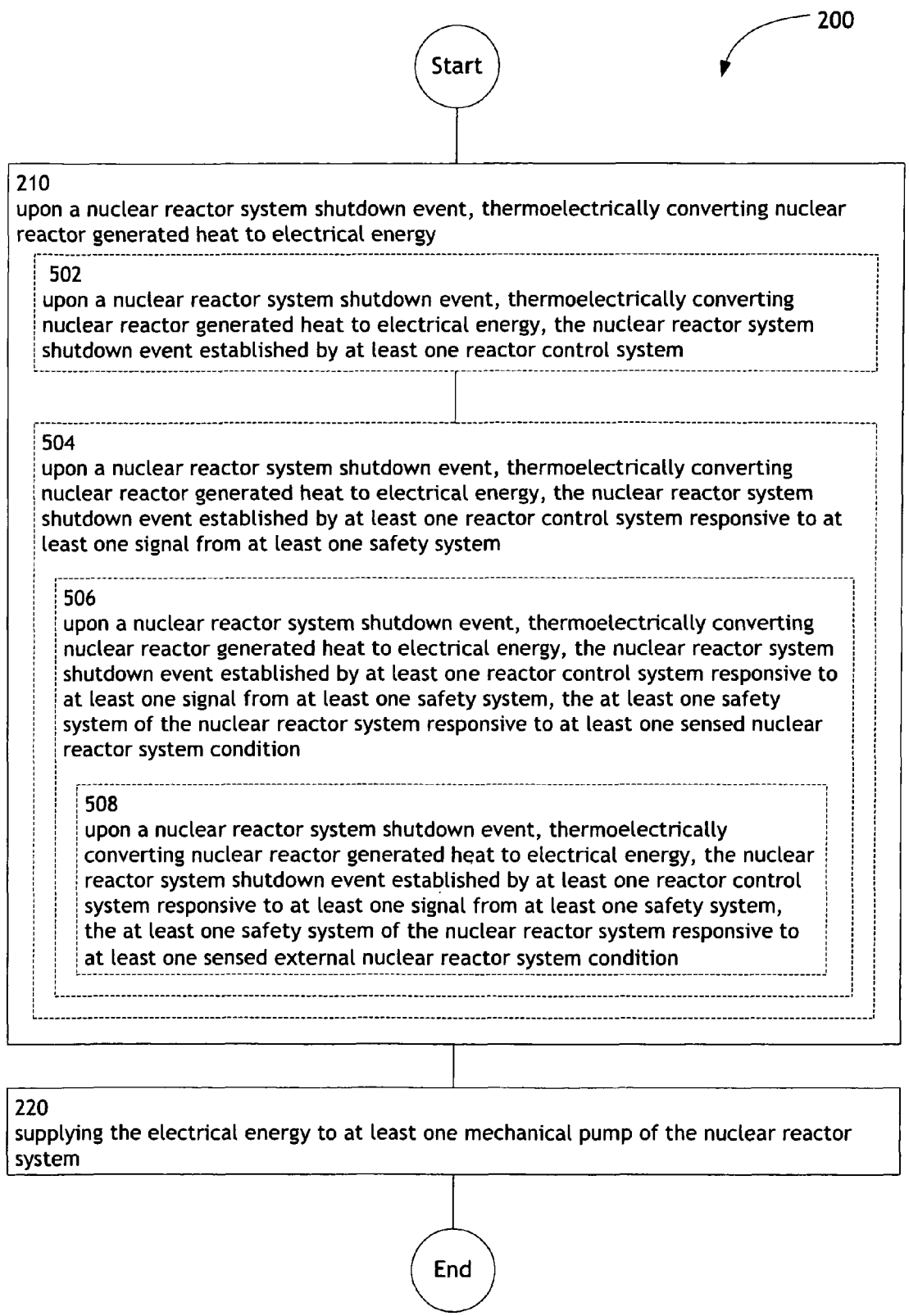

FIG. 5 illustrates alternative embodiments of the example operational flow 200 of FIG. 2. FIG. 5 illustrates example embodiments where the operation 210 may include at least one additional operation. Additional operations may include an operation 502, an operation 504, an operation 506, and/or an operation 508.

At operation 502, upon a nuclear reactor system shutdown event established by at least one reactor control system, nuclear reactor generated heat may be thermoelectrically converted to electrical energy. For example, as shown in FIG. 1, a nuclear reactor system shutdown event 110 may be established by a reactor control system 112. Upon establishing the nuclear shutdown event, a thermoelectric device 104 may then convert heat produced by the nuclear reactor system 100 to electrical energy. Further, at operation 504, upon a nuclear reactor system shutdown event established by a reactor control system responsive to a signal from a safety system, nuclear reactor generated heat may be thermoelectrically converted to electrical energy. For example, as shown in FIG. 1, a nuclear reactor system shutdown event 110 may be established by a reactor control system responsive to a signal (e.g., wireline signal or wireless signal) from a safety system 113 (e.g., security system or temperature monitoring system). Upon establishing the nuclear reactor shutdown event, a thermoelectric device 104 may then convert heat produced by the nuclear reactor system 100 to electrical energy. Further, at operation 506, upon a nuclear reactor system shutdown event established by a reactor control system responsive to a signal from a safety system, where the safety system is responsive to a sensed nuclear reactor system condition, nuclear reactor generated heat may be thermoelectrically converted to electrical energy. For example, as shown in FIG. 1, a nuclear reactor system shutdown event 110 may be established by a reactor control system responsive to a signal from a safety system 113, where the safety system is responsive to a sensed condition 114 of the nuclear reactor system 100. Upon establishing the nuclear reactor system shutdown event, a thermoelectric device 104 may then convert heat produced by the nuclear reactor system 100 to electric energy. Further, at operation 508, upon a nuclear reactor system shutdown event established by a reactor control system responsive to a signal from a safety system, where the safety system is responsive to a sensed external condition of the nuclear reactor system, nuclear reactor generated heat may be thermoelectrically converted to electrical energy. For example, as shown in FIG. 1, a nuclear reactor system shutdown event 110 may be established by a reactor control system responsive to a signal from a safety system 113, where the safety system is responsive to a sensed external condition 115 (e.g., security breach or access to external power supply) of the nuclear reactor system 100. Upon establishing the nuclear reactor system shutdown event, a thermoelectric device 104 may then convert heat produced by the nuclear reactor system 100 to electric energy.

Figure 6:
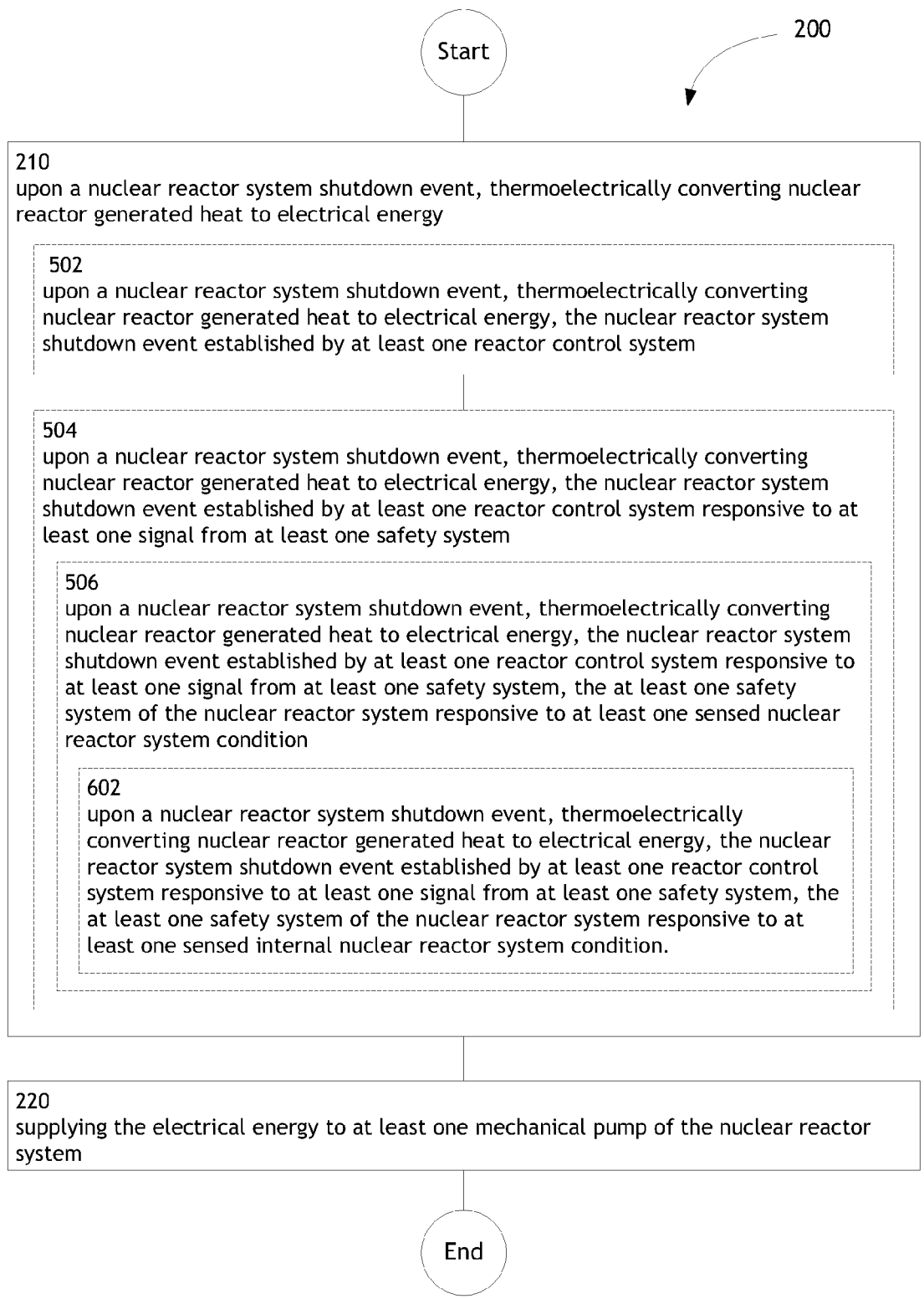

FIG. 6 illustrates alternative embodiments of the example operational flow 200 of FIG. 2. FIG. 6 illustrates example embodiments where the operation 210 may include at least one additional operation. Additional operations may include an operation 602. Further, at operation 602, upon a nuclear reactor system shutdown event established by a reactor control system responsive to a signal from a safety system, where the safety system is responsive to a sensed internal condition of the nuclear reactor system, nuclear reactor generated heat may be thermoelectrically converted to electrical energy. For example, as shown in FIG. 1, a nuclear reactor system shutdown event 110 may be established by a reactor control system responsive to a signal from a safety system 113, where the safety system is responsive to a sensed internal condition 116 (e.g., temperature or radiation levels of reactor) of the nuclear reactor system 100. Upon establishing the nuclear reactor system shutdown event, a thermoelectric device 104 may then convert heat produced by the nuclear reactor system 100 to electrical energy.

Figure 7:
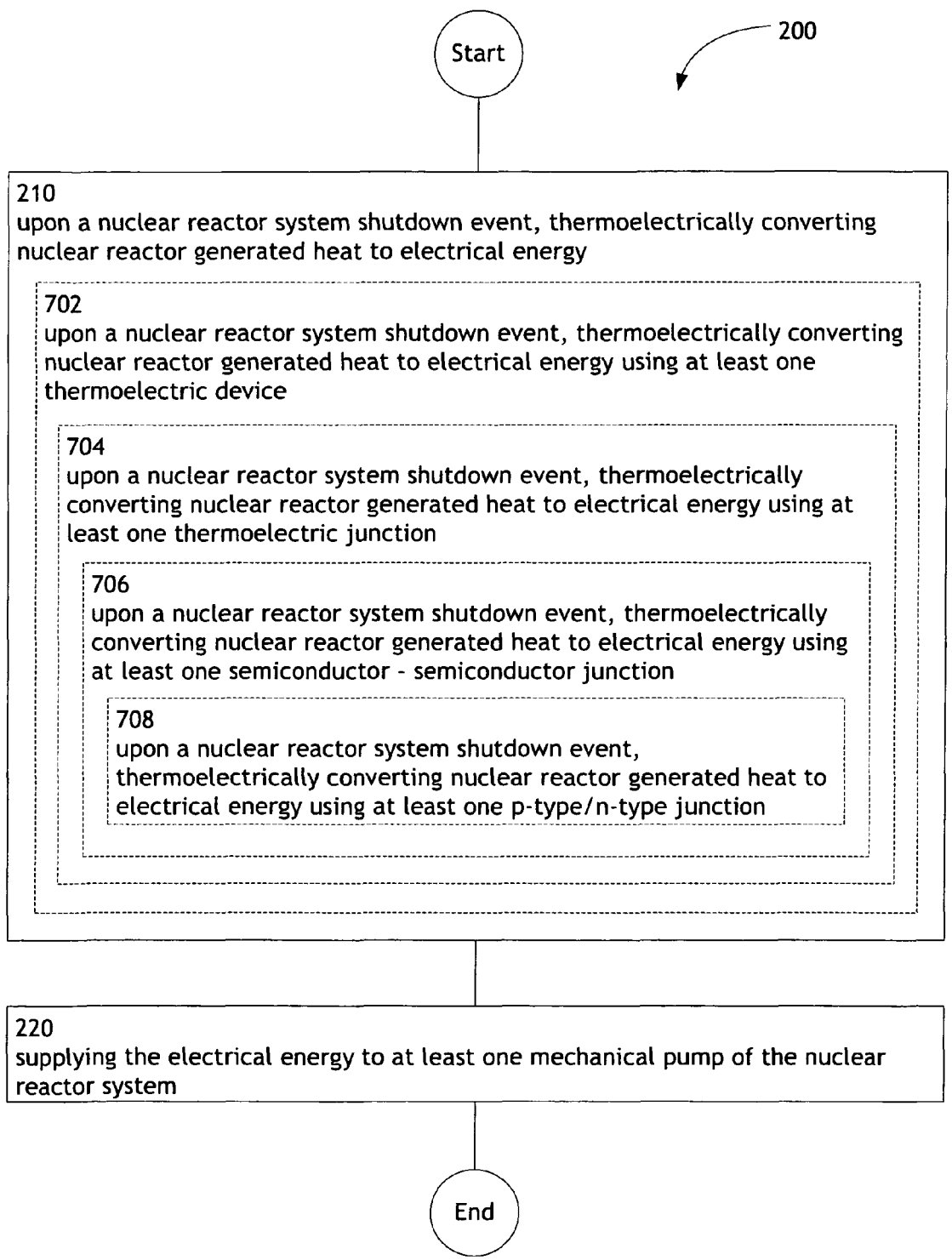

FIG. 7 illustrates alternative embodiments of the example operational flow 200 of FIG. 2. FIG. 7 illustrates example embodiments where the operation 210 may include at least one additional operation. Additional operations may include an operation 702, an operation 704, an operation 706, and/or an operation 708.

At operation 702, upon a nuclear reactor system shutdown event, nuclear reactor generated heat may be converted to electrical energy using at least one thermoelectric device. For example, as shown in FIG. 1, upon a nuclear reactor system shutdown event 110, a thermoelectric device 104 placed in thermal communication with the nuclear reactor system 100 may convert heat produced by the nuclear reactor system 100 to electrical energy.

At operation 704, upon a nuclear reactor system shutdown event, nuclear reactor generated heat may be converted to electrical energy using at least one thermoelectric junction. For instance, upon a nuclear reactor system shutdown event 110, a thermoelectric junction 117 (e.g., thermocouple) placed in thermal communication with the nuclear reactor system 100 may convert heat produced by the nuclear reactor system 100 to electrical energy.

Further, at operation 706, upon a nuclear reactor system shutdown event, nuclear reactor generated heat may be converted to electrical energy using at least one semiconductor-semiconductor junction. For example, as shown in FIG. 1, the thermoelectric device 104 may comprise a semiconductor-semiconductor thermoelectric junction 118 (e.g., p-type/p-type junction of different semiconductor materials). For instance, upon a nuclear reactor system shutdown event 110, a semiconductor-semiconductor junction 118 placed in thermal communication with the nuclear reactor system 100 may convert heat produced by the nuclear reactor system 100 to electrical energy.

Further, at operation 708, upon a nuclear reactor system shutdown event, nuclear reactor generated heat may be converted to electrical energy using at least one p-type/n-type semiconductor junction (e.g., p-doped lead telluride/n-doped lead telluride junction). For example, as shown in FIG. 1, the thermoelectric device may comprise a p-type/n-type semiconductor junction 119. For instance, upon a nuclear reactor system shutdown event 110, a p-type/n-type semiconductor junction placed in thermal communication with the nuclear reactor system 100 may convert heat produced by the nuclear reactor system 100 to electrical energy.

Figure 8:
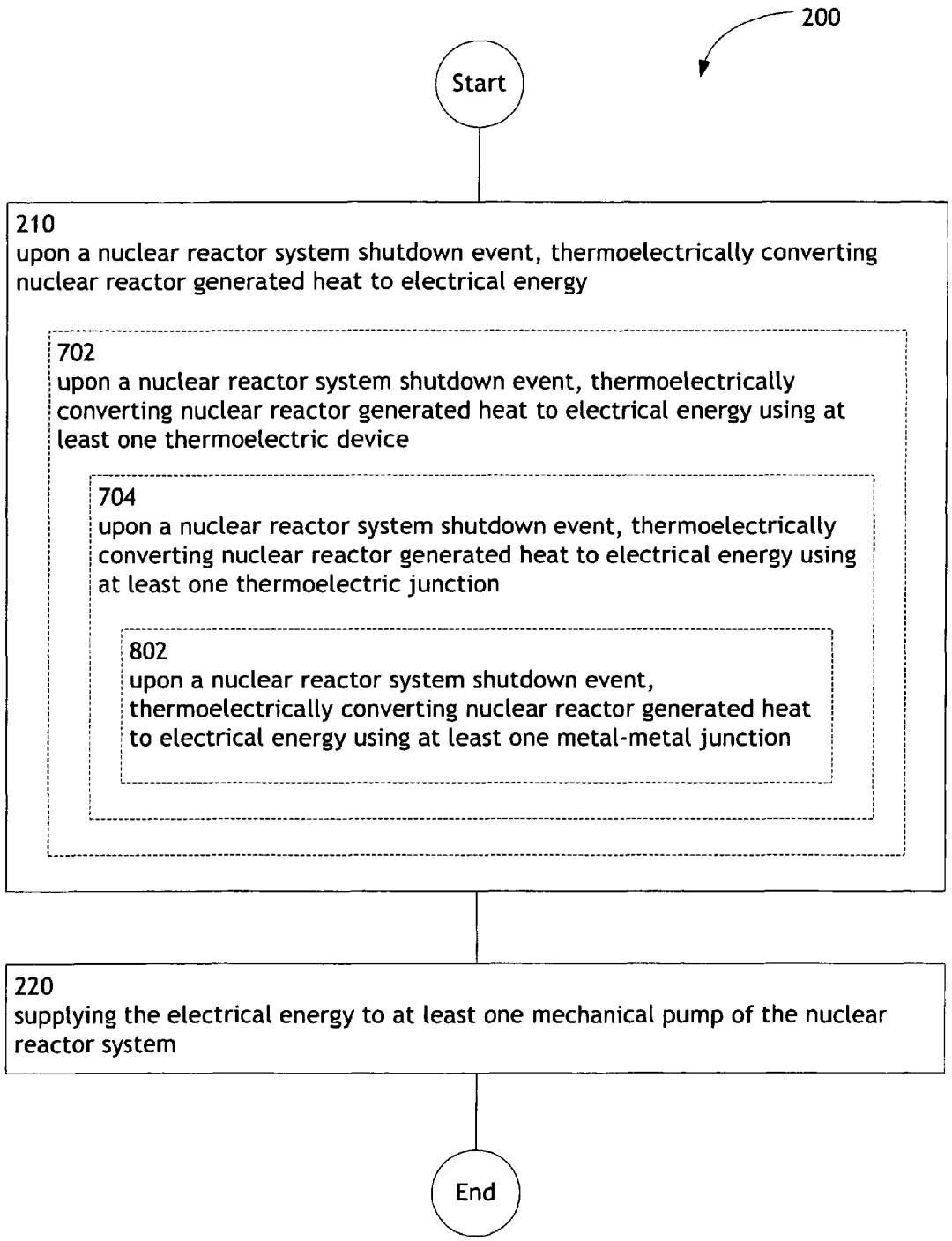

FIG. 8 illustrates alternative embodiments of the example operational flow 200 of FIG. 2. FIG. 8 illustrates example embodiments where the operation 210 may include at least one additional operation. Additional operations may include an operation 802.

Further, at operation 802, upon a nuclear reactor system shutdown event, nuclear reactor generated heat may be converted to electrical energy using at least one metal-metal thermoelectric junction. For example, as shown in FIG. 1, the thermoelectric device 104 may comprise a metal-metal thermoelectric junction 120 (e.g., copper-constantan junction). For instance, upon a nuclear reactor system shutdown event 110, a metal-metal thermoelectric junction 120 placed in thermal communication with the nuclear reactor system 100 may convert heat produced by the nuclear reactor system 100 to electrical energy.

Figure 9:
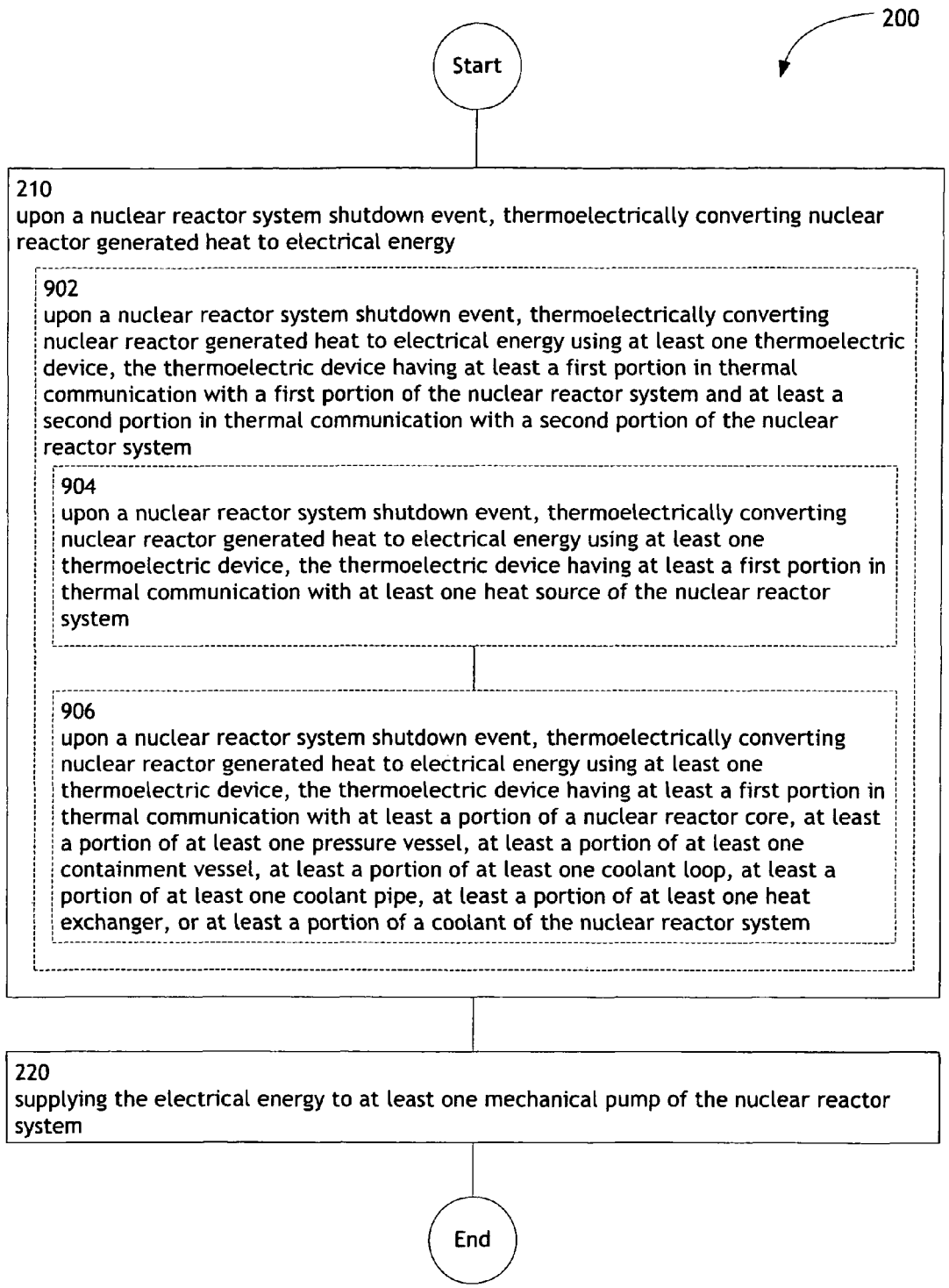

FIG. 9 illustrates alternative embodiments of the example operational flow 200 of FIG. 2. FIG. 9 illustrates example embodiments where the operation 210 may include at least one additional operation. Additional operations may include an operation 902, an operation 904, and/or an operation 906.

The operation 902 illustrates upon a nuclear reactor system shutdown event, thermoelectrically converting nuclear reactor generated heat to electrical energy using at least one thermoelectric device, the thermoelectric device having at least a first portion in thermal communication with a first portion of the nuclear reactor system and at least a second portion in thermal communication with a second portion of the nuclear reactor system. For example, as shown in FIG. 1, a first portion 124 of a thermoelectric device 104 may be in thermal communication with a first portion 125 of a nuclear reactor system 100, while a second portion 126 of the thermoelectric device 104 may be in thermal communication with a second portion 127 of the nuclear reactor system. Then, upon a nuclear reactor system shutdown event 110, the thermoelectric device 104 may convert heat produced by the nuclear reactor system 100 to electrical energy.

Further, the operation 904 illustrates upon a nuclear reactor system shutdown event, thermoelectrically converting nuclear reactor generated heat to electrical energy using at least one thermoelectric device, the thermoelectric device having at least a first portion in thermal communication with at least one heat source of the nuclear reactor system. For example, as shown in FIG. 1, the first portion 125 of the nuclear reactor system may comprise a heat source 128 of the nuclear reactor system 100. Therefore, a first portion of a thermoelectric device 124 may be in thermal communication with a heat source 128 of the nuclear reactor system 100. Then, upon a nuclear reactor system shutdown event 110, the thermoelectric device 104 may convert heat produced by the nuclear reactor system 100 to electrical energy.

Further, the operation 906 illustrates upon a nuclear reactor system shutdown event, thermoelectrically converting nuclear reactor generated heat to electrical energy using at least one thermoelectric device, the thermoelectric device having at least a first portion in thermal communication with at least a portion of a nuclear reactor core, at least a portion of at least one pressure vessel, at least a portion of at least one containment vessel, at least a portion of at least one coolant loop, at least a portion of at least one coolant pipe, at least a portion of at least one heat exchanger, or at least a portion of the coolant of the nuclear reactor system. For example, as shown in FIG. 1, the first portion 125 of the nuclear reactor system 100 may include, but is not limited to, a nuclear reactor core 129, a pressure vessel 130 of the nuclear reactor system 100, a containment vessel 131 of the nuclear reactor system 100, a coolant loop 132 of the nuclear reactor system 100, a coolant pipe 133 of the nuclear reactor system, a heat exchanger 134 of the nuclear reactor system 100 or the coolant 135 of the nuclear reactor system 100. By way of further example, a first portion of a thermoelectric device 124 may be in thermal communication with a coolant loop 132 of the nuclear reactor system 100. Then, upon a nuclear reactor system shutdown event 110, the thermoelectric device 104 may convert heat produced by the nuclear reactor system 100 to electrical energy.

Figure 10:
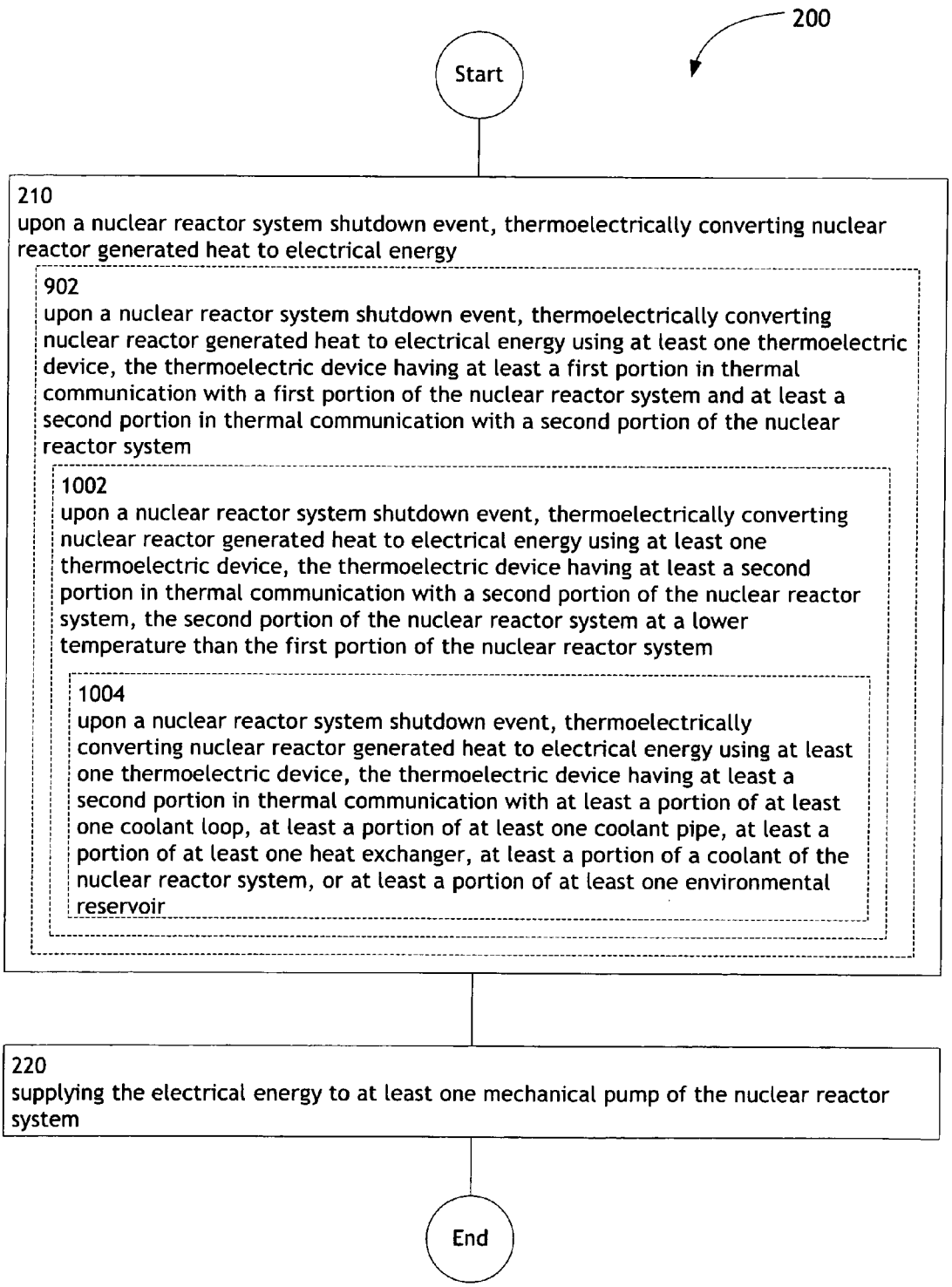

FIG. 10 illustrates alternative embodiments of the example operational flow 200 of FIG. 2. FIG. 10 illustrates example embodiments where the operation 210 may include at least one additional operation. Additional operations may include an operation 1002, and/or an operation 1004.

Further, the operation 1002 illustrates upon a nuclear reactor system shutdown event, thermoelectrically converting nuclear reactor generated heat to electrical energy using at least one thermoelectric device, the thermoelectric device having at least a second portion in thermal communication with a second portion of the nuclear reactor system, the second portion of the nuclear reactor system at a lower temperature than the first portion of the nuclear reactor system. For example, as shown in FIG. 1, a second portion 126 of a thermoelectric device 104 may be in thermal communication with a second portion 127 of a nuclear reactor system 100, where the second portion 127 of the nuclear reactor system 100 is at a lower temperature than the first portion 124 of the nuclear reactor system 100. Then, upon a nuclear reactor system shutdown event 110, the thermoelectric device 104 may convert heat produced by the nuclear reactor system 100 to electrical energy.

Further, the operation 1004 illustrates upon a nuclear reactor system shutdown event, thermoelectrically converting nuclear reactor generated heat to electrical energy using at least one thermoelectric device, the thermoelectric device having at least a second portion in thermal communication with at least a portion of at least one coolant loop, at least a portion of at least one coolant pipe, at least a portion of at least one heat exchanger, at least a portion of the coolant of the nuclear reactor system, or at least a portion of at least one environmental reservoir. For example, as shown in FIG. 1, the second portion 127 of the nuclear reactor system 100, which is at a temperature lower than the first portion 124 of the nuclear reactor system, may include, but is not limited to, a coolant loop 136 of the nuclear reactor system 100, a coolant loop 137 of the nuclear reactor system 100, a heat exchanger 138 of the nuclear reactor system 100, coolant 139 of the nuclear reactor system 100, or an environmental reservoir 140, such as a body of water. By way of further example, the second portion 126 of a thermoelectric device 104 may be in thermal communication with a coolant pipe 137 of the nuclear reactor system 100, where the coolant pipe 137 is at a temperature lower than the first portion of the nuclear reactor system 124. Then, upon a nuclear reactor system shutdown event 110, the thermoelectric device 104 may convert heat produced by the nuclear reactor system 100 to electrical energy.

Figure 11:
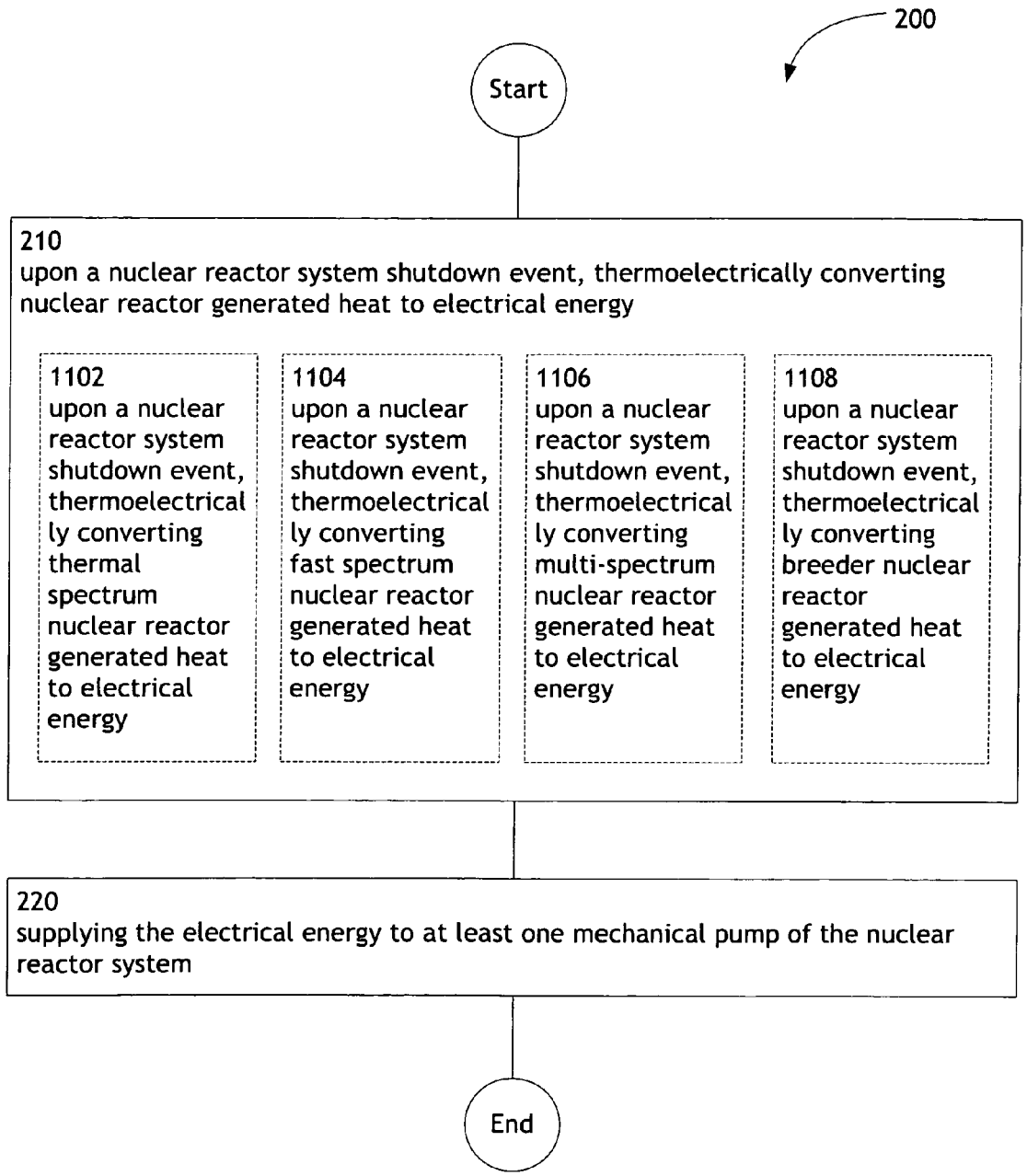

FIG. 11 illustrates alternative embodiments of the example operational flow 200 of FIG. 2. FIG. 11 illustrates example embodiments where the operation 210 may include at least one additional operation. Additional operations may include an operation 1102, an operation 1104, an operation 1106, and/or an operation 1108.

At operation 1102, upon a nuclear reactor system shutdown event, thermal spectrum nuclear reactor generated heat may be thermoelectrically converted to electrical energy. For example, as shown in FIG. 1, upon a nuclear reactor system shutdown event 110, a thermoelectric device 104 may convert heat generated by a thermal spectrum nuclear reactor 141 of a nuclear reactor system 100 to electrical energy.

At operation 1104, upon a nuclear reactor system shutdown event, fast spectrum nuclear reactor generated heat may be thermoelectrically converted to electrical energy. For example, as shown in FIG. 1, upon a nuclear reactor system shutdown event 110, a thermoelectric device 104 may convert heat generated by a fast spectrum nuclear reactor 142 of a nuclear reactor system 100 to electrical energy.

At operation 1106, upon a nuclear reactor system shutdown event, multi-spectrum nuclear reactor generated heat may be thermoelectrically converted to electrical energy. For example, as shown in FIG. 1, upon a nuclear reactor system shutdown event 110, a thermoelectric device 104 may convert heat generated by a multi-spectrum nuclear reactor 143 of a nuclear reactor system 100 to electrical energy.

At operation 1108, upon a nuclear reactor system shutdown event, breeder nuclear reactor generated heat may be thermoelectrically converted to electrical energy. For example, as shown in FIG. 1, upon a nuclear reactor system shutdown event 110, a thermoelectric device 104 may convert heat generated by a breeder nuclear reactor 144 of a nuclear reactor system 100 to electrical energy.

Figure 12:
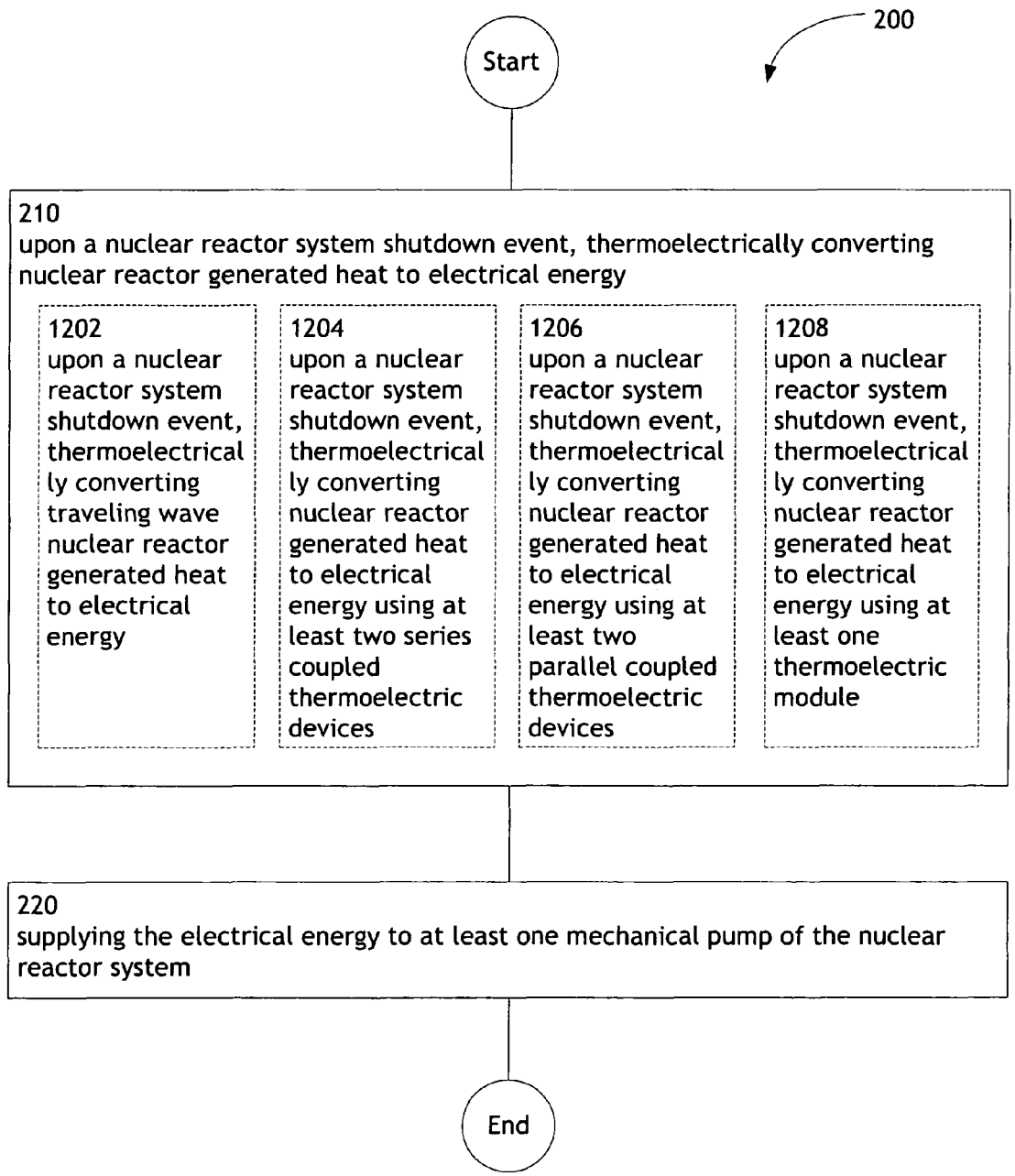

FIG. 12 illustrates alternative embodiments of the example operational flow 200 of FIG. 2. FIG. 12 illustrates example embodiments where the operation 210 may include at least one additional operation. Additional operations may include an operation 1202, an operation 1204, an operation 1206, and/or an operation 1208.

At operation 1202, upon a nuclear reactor system shutdown event, traveling wave nuclear reactor generated heat may be thermoelectrically converted to electrical energy. For example, as shown in FIG. 1, upon a nuclear reactor system shutdown event 110, a thermoelectric device 104 may convert heat generated by a traveling wave nuclear reactor 145 of a nuclear reactor system 100 to electrical energy.

At operation 1204, upon a nuclear reactor system shutdown event, nuclear reactor generated heat may be converted to electrical energy using at least two series coupled thermoelectric devices. For example, as shown in FIG. 1, upon a nuclear reactor system shutdown event 110, a first thermoelectric device $S_1$ electrically coupled in series to a second thermoelectric device $S_2$ may convert heat produced by the nuclear reactor system 100 to electrical energy. Further, a first thermoelectric device $S_1$, a second thermoelectric device $S_2$, a third thermoelectric device $S_3$, and up to and including a Nth thermoelectric device $S_N$ may be used to convert nuclear reactor generated heat to electric energy, where the first thermoelectric device $S_1$, the second thermoelectric device $S_2$, the third thermoelectric device $S_3$, and up to and including the Nth thermoelectric device SN are series coupled.

At operation 1206, upon a nuclear reactor system shutdown event, nuclear reactor generated heat may be converted to electrical energy using at least two parallel coupled thermoelectric devices. For example, as shown in FIG. 1, upon a nuclear reactor system shutdown event 110, a first thermoelectric device $P_1$ electrically coupled in parallel to a second thermoelectric device $P_2$ may convert heat produced by the nuclear reactor system 100 to electrical energy. Further, a first thermoelectric device $P_1$, a second thermoelectric device $P_2$, a third thermoelectric device $P_3$, and up to and including a Nth thermoelectric device $P_N$ may be used to convert nuclear reactor generated heat to electric energy, where the first thermoelectric device $P_1$, the second thermoelectric device $P_2$, the third thermoelectric device $P_3$, and up to and including the Nth thermoelectric device $P_N$ are parallel coupled.

At operation 1208, upon a nuclear reactor system shutdown event, nuclear reactor generated heat may be converted to electrical energy using at least one thermoelectric module. For example, as shown in FIG. 1, upon a nuclear reactor system shutdown event 110, a thermoelectric module 148 placed in thermal communication with the nuclear reactor system 100 may convert heat produced by the nuclear reactor system 100 to electrical energy. For example, a thermoelectric module may comprise a prefabricated network of a number of series coupled thermoelectric devices, a number of parallel coupled thermoelectric devices, or combinations of parallel coupled thermoelectric devices and series coupled thermoelectric devices.

Figure 13:
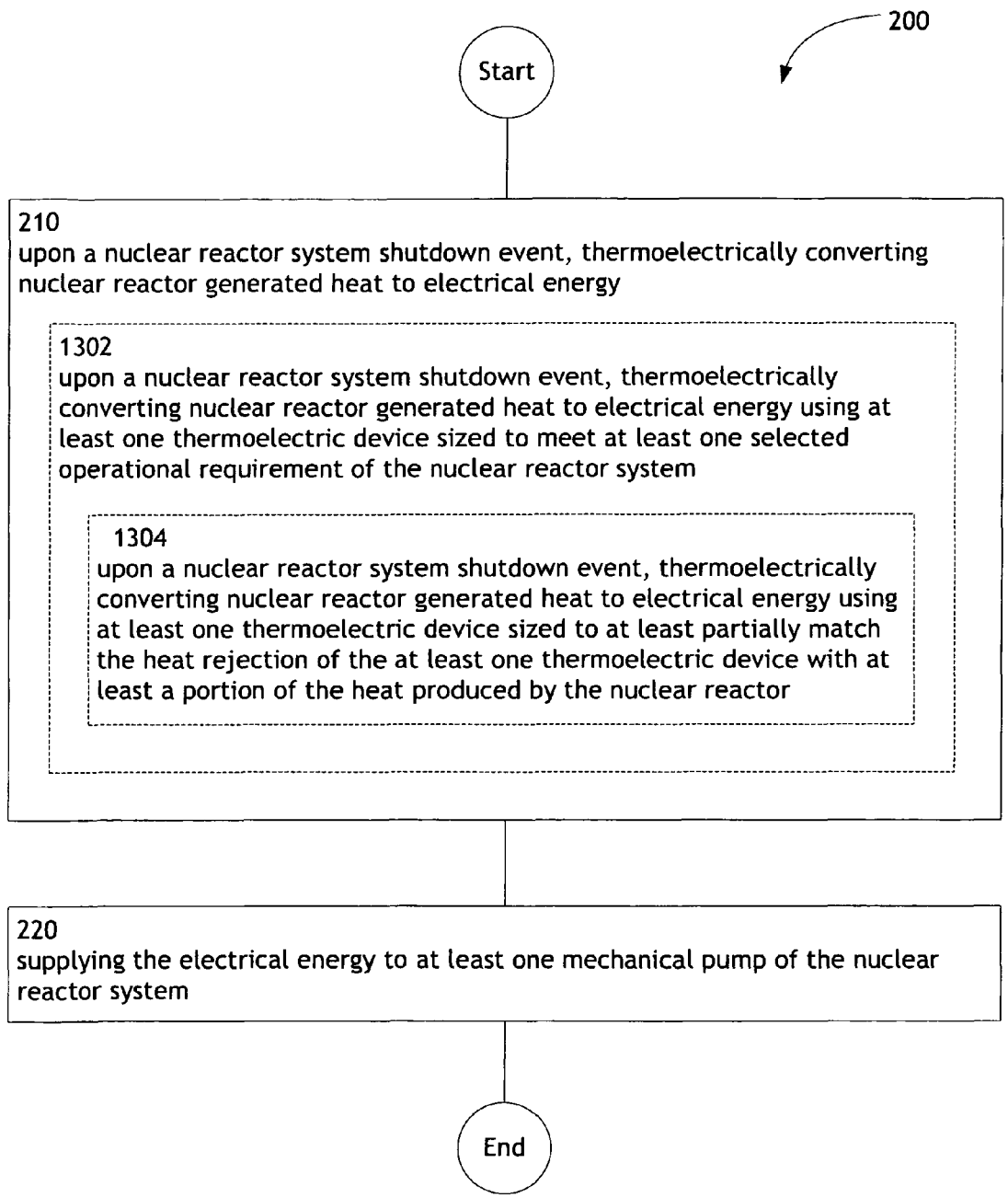

FIG. 13 illustrates alternative embodiments of the example operational flow 200 of FIG. 2. FIG. 13 illustrates example embodiments where the operation 210 may include at least one additional operation. Additional operations may include an operation 1302, and/or an operation 1304.

The operation 1302 illustrates, upon a nuclear reactor system shutdown event, thermoelectrically converting nuclear reactor generated heat to electrical energy using at least one thermoelectric device sized to meet at least one selected operational requirement of the nuclear reactor system. For example, as shown in FIG. 1, upon a nuclear reactor system shutdown event 110, a thermoelectric device 104 sized to meet an operational requirement 150 (e.g., electric power demand) of the nuclear reactor system 100 may convert heat produced by the nuclear reactor system 100 to electrical energy. The operation 1304 illustrates, upon a nuclear reactor system shutdown event, thermoelectrically converting nuclear reactor generated heat to electrical energy using at least one thermoelectric device sized to at least partially match the heat rejection of the at least one thermoelectric device with at least a portion of the heat produced by the nuclear reactor. For example, as shown in FIG. 1, upon a nuclear reactor system shutdown event 110, a thermoelectric device 104 sized to match the heat rejection 151 of the thermoelectric device with the heat produced by the nuclear reactor 102 of the nuclear reactor system 100 may convert heat produced by the nuclear reactor system 100 to electrical energy.

Figure 14:
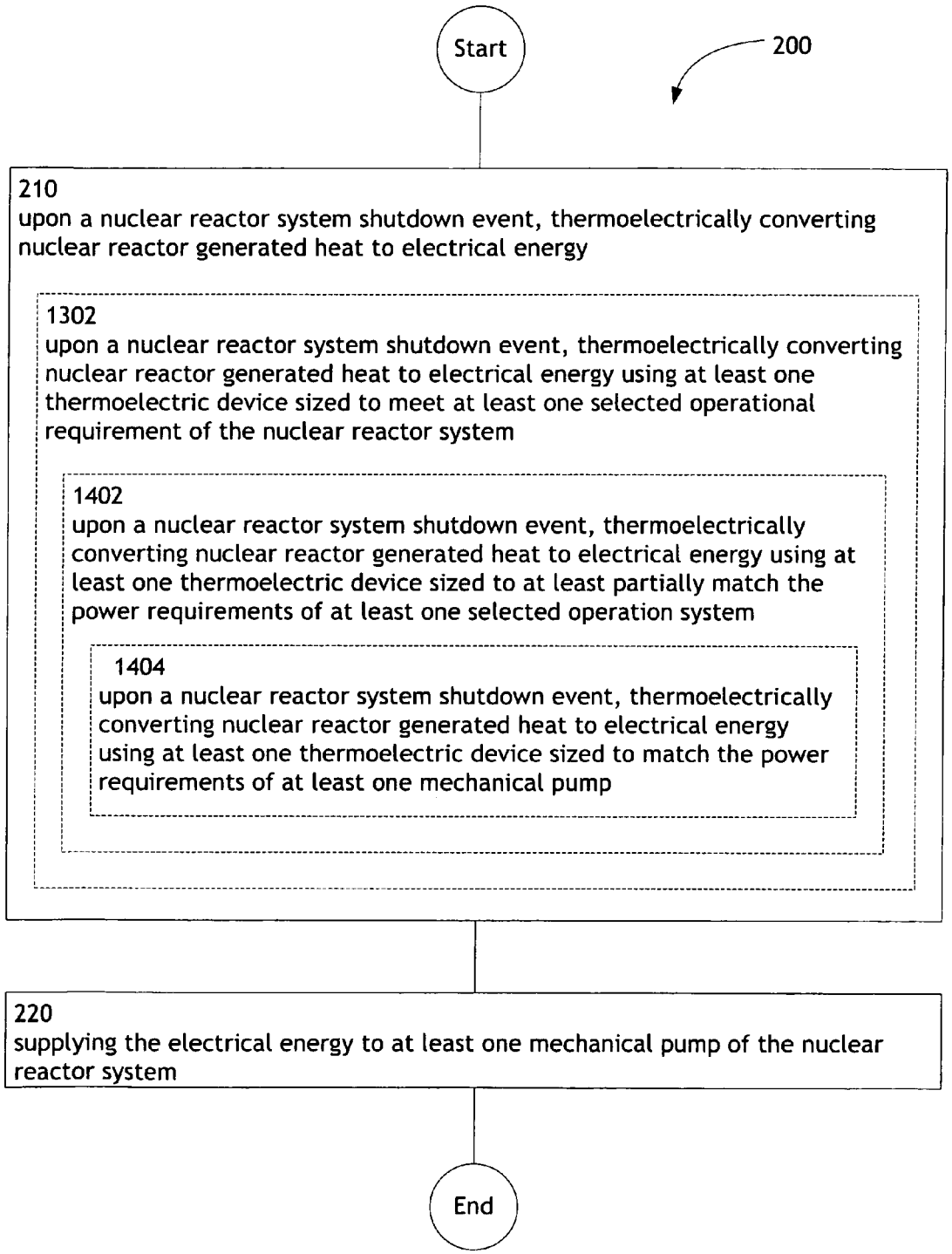

FIG. 14 illustrates alternative embodiments of the example operational flow 200 of FIG. 2. FIG. 14 illustrates example embodiments where the operation 210 may include at least one additional operation. Additional operations may include an operation 1402, and/or an operation 1404.

Further, the operation 1402 illustrates, upon a nuclear reactor system shutdown event, thermoelectrically converting nuclear reactor generated heat to electrical energy using at least one thermoelectric device sized to at least partially match the power requirements of at least one selected operation system. For example, as shown in FIG. 1, upon a nuclear reactor system shutdown event 110, a thermoelectric device 104 sized to match the power requirements of a selected operation system 152 (e.g., coolant system, control system, or security system) of the nuclear reactor system 100 may convert heat produced by the nuclear reactor system 100 to electrical energy.

Further, the operation 1404 illustrates, upon a nuclear reactor system shutdown event, thermoelectrically converting nuclear reactor generated heat to electrical energy using at least one thermoelectric device sized to match the power requirements of at least one mechanical pump. For example, as shown in FIG. 1, upon a nuclear reactor system shutdown event 110, a thermoelectric device 104 sized to match the power requirements of a mechanical pump 153 (e.g., mechanical pump used to circulate coolant in the primary coolant system) of the nuclear reactor system 100 may convert heat produced by the nuclear reactor system 100 to electrical energy.

Figure 15:
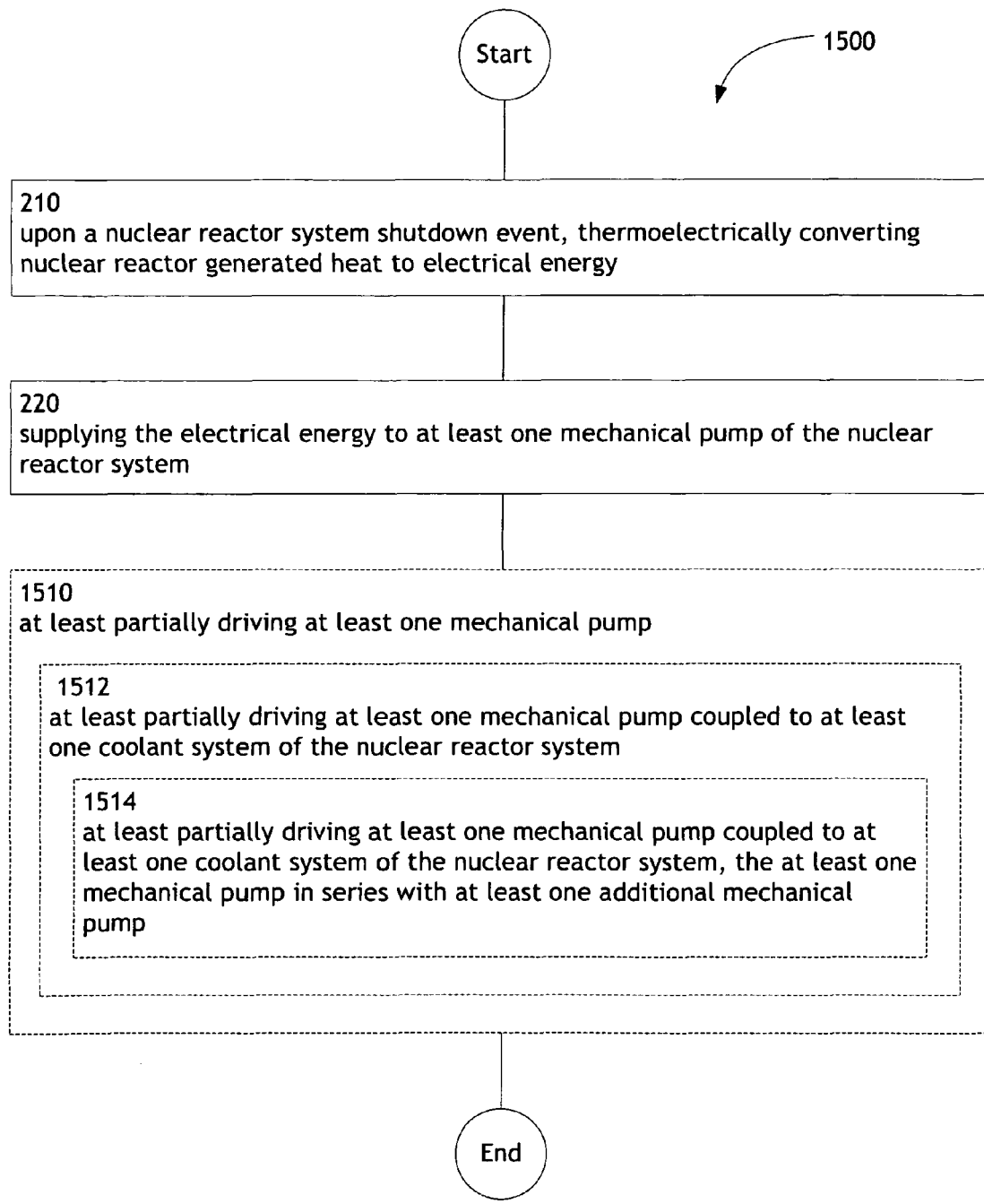

FIG. 15 illustrates an operational flow 1500 representing example operations related to the thermoelectric conversion of nuclear reactor generated heat to electrical energy upon a nuclear reactor system shutdown event. FIG. 15 illustrates an example embodiment where the example operational flow 200 of FIG. 2 may include at least one additional operation. Additional operations may include an operation 1510, an operation 1512, and/or an operation 1514.

After a start operation, a converting operation 210, and a supplying operation 220, the operational flow 1500 moves to a driving operation 1510. Operation 1510 illustrates at least partially driving at least one mechanical pump. For example, as shown in FIG. 1, the electrical output 108 of the thermoelectric device 104 may be used to partially drive a mechanical pump 106 of the nuclear reactor system 100.

The operation 1512 illustrates at least partially driving at least one mechanical pump coupled to at least one coolant system of the nuclear reactor system. For example, as shown in FIG. 1, the electrical output 108 of the thermoelectric device 104 may be used to partially drive a mechanical pump 106 coupled to a coolant system 154 of the nuclear reactor system 100.

Further, the operation 1514 illustrates at least partially driving at least one mechanical pump coupled to at least one coolant system of the nuclear reactor system, the at least one mechanical pump in series with at least one additional mechanical pump. For example, as shown in FIG. 1, the electrical output 108 of the thermoelectric device 104 may be used to partially drive a first mechanical pump 106 coupled to a coolant system 154 of the nuclear reactor system 100, where the first mechanical pump 106 is coupled in series 155 with a second mechanical pump.

Figure 16:
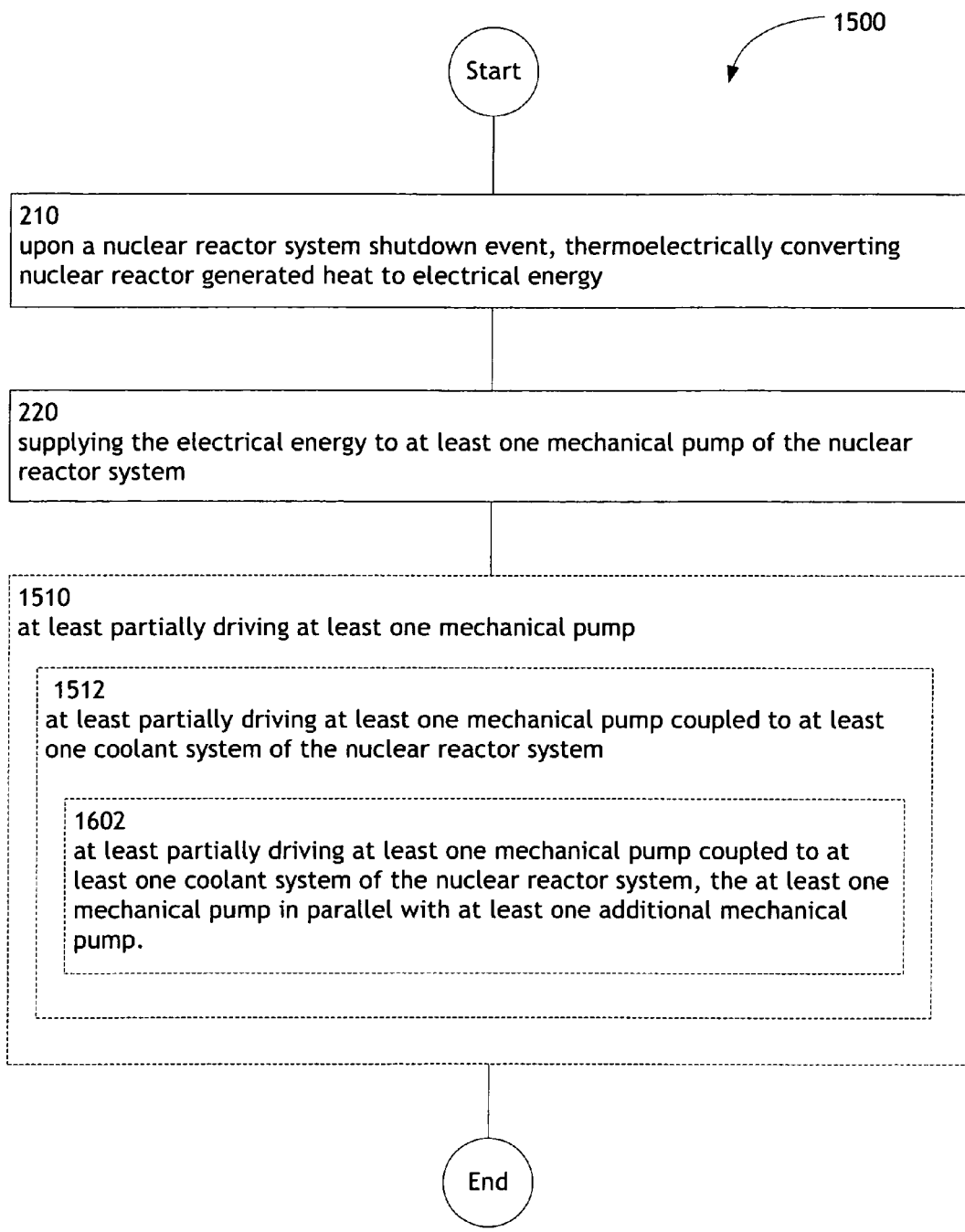

FIG. 16 illustrates alternative embodiments of the example operational flow 1500 of FIG. 15. FIG. 16 illustrates example embodiments where the operation 1510 may include at least one additional operation. Additional operations may include an operation 1602. Further, the operation 1602 illustrates at least partially driving at least one mechanical pump coupled to at least one coolant system of the nuclear reactor system, the at least one mechanical pump in parallel with at least one additional mechanical pump. For example, as shown in FIG. 1, the electrical output 108 of the thermoelectric device 104 may be used to partially drive a first mechanical pump 106 coupled to a coolant system 154 of the nuclear reactor system 100, where the first mechanical pump 106 is coupled in parallel 156 with a second mechanical pump.

Figure 17:
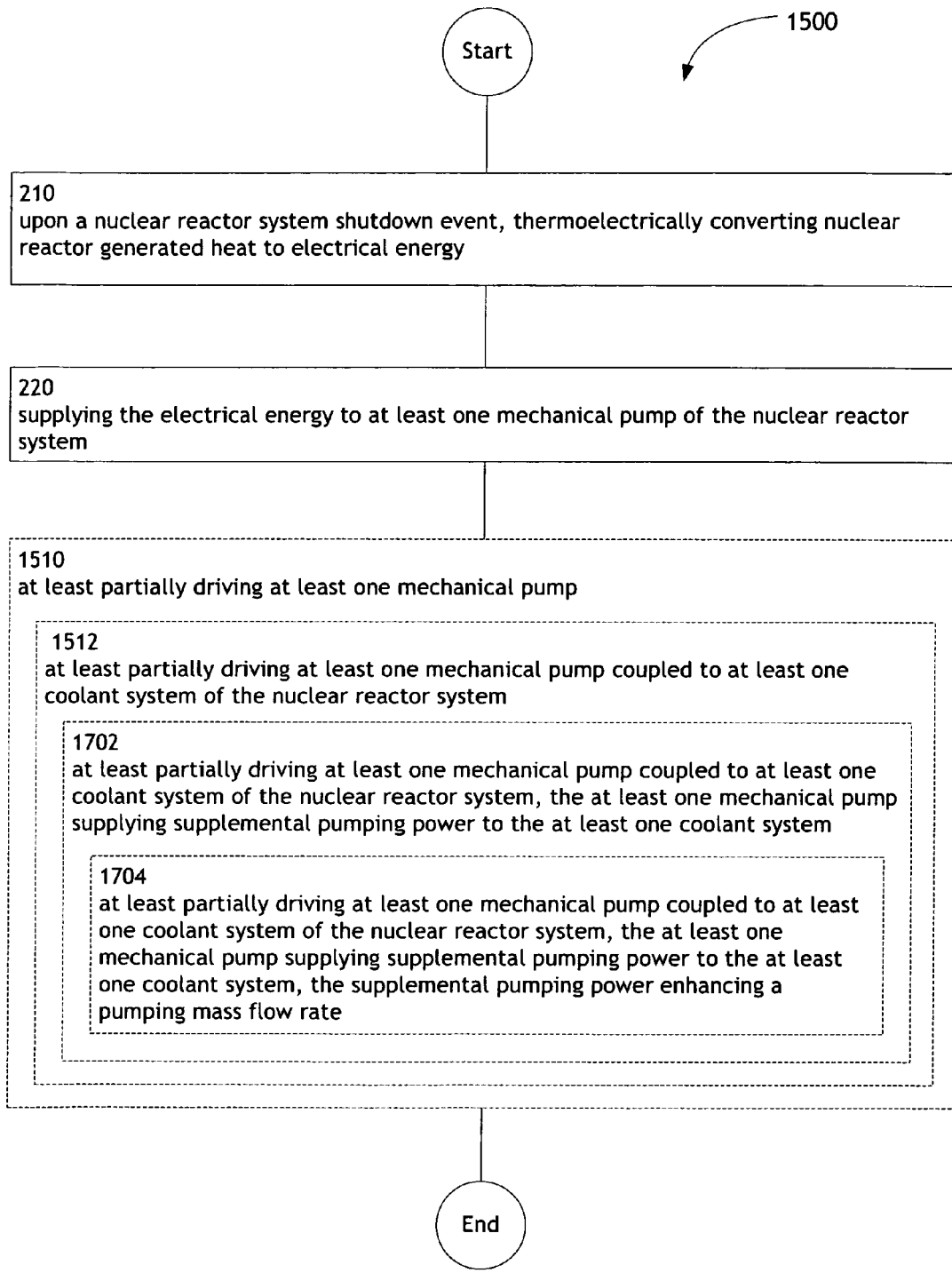

FIG. 17 illustrates alternative embodiments of the example operational flow 1500 of FIG. 15. FIG. 17 illustrates example embodiments where the operation 1510 may include at least one additional operation. Additional operations may include an operation 1702, and/or an operation 1704.

Further, the operation 1702 illustrates at least partially driving at least one mechanical pump coupled to at least one coolant system of the nuclear reactor system, the at least one mechanical pump supplying supplemental pumping power to the at least one coolant system. For example, as shown in FIG. 1, the electrical output 108 of the thermoelectric device 104 may be used to partially drive a mechanical pump 106 coupled to a coolant system 154 of the nuclear reactor system 100, where the mechanical pump 106 provides supplemental pumping power 157 to the coolant system 154.

Further, the operation 1704 illustrates at least partially driving at least one mechanical pump coupled to at least one coolant system of the nuclear reactor system, the at least one mechanical pump supplying supplemental pumping power to the at least one coolant system, the supplemental pumping power enhancing a pumping mass flow rate. For example, as shown in FIG. 1, the electrical output 108 of the thermoelectric device 104 may be used to partially drive a mechanical pump 106 coupled to a coolant system 154 of the nuclear reactor system 100, where the mechanical pump 106 provides supplemental pumping power 157 to the coolant system 154 in order to enhance the pumping mass flow rate 158 of the coolant.

Figure 18:
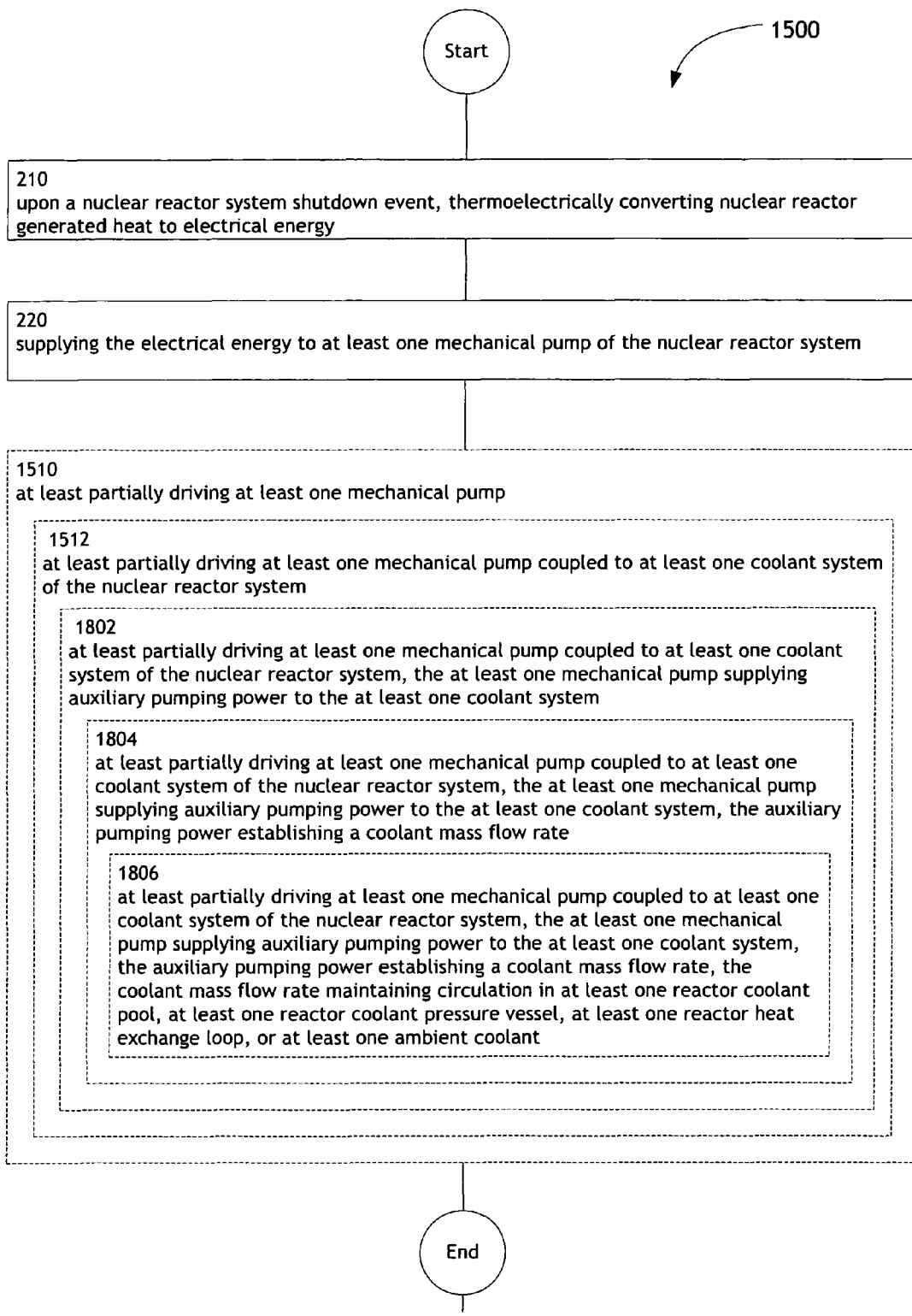

FIG. 18 illustrates alternative embodiments of the example operational flow 1500 of FIG. 15. FIG. 18 illustrates example embodiments where the operation 1510 may include at least one additional operation. Additional operations may include an operation 1802, an operation 1804, and/or an operation 1806.

Further, the operation 1802 illustrates at least partially driving at least one mechanical pump coupled to at least one coolant system of the nuclear reactor system, the at least one mechanical pump supplying auxiliary pumping power to the at least one coolant system. For example, as shown in FIG. 1, the electrical output 108 of the thermoelectric device 104 may be used to partially drive a mechanical pump 106 coupled to a coolant system 154 of the nuclear reactor system 100, where the mechanical pump 106 provides auxiliary pumping power 159 to the coolant system 154.

Further, the operation 1804 illustrates at least partially driving at least one mechanical pump coupled to at least one coolant system of the nuclear reactor system, the at least one mechanical pump supplying auxiliary pumping power to the at least one coolant system, the auxiliary pumping power establishing a coolant mass flow rate. For example, as shown in FIG. 1, the electrical output 108 of the thermoelectric device 104 may be used to partially drive a mechanical pump 106 coupled to a coolant system 154 of the nuclear reactor system 100, where the mechanical pump 106 provides auxiliary pumping power 159 to the coolant system 154 in order to establish a mass flow rate 160 of the coolant.

Further, the operation 1806 illustrates at least partially driving at least one mechanical pump coupled to at least one coolant system of the nuclear reactor system, the at least one mechanical pump supplying auxiliary pumping power to the at least one coolant system, the auxiliary pumping power establishing a coolant mass flow rate, the coolant mass flow rate maintaining circulation in at least one reactor coolant pool, at least one reactor coolant pressure vessel, at least one reactor heat exchanger, or at least one ambient coolant. For example, as shown in FIG. 1, the electrical output 108 of the thermoelectric device 104 may be used to partially drive a mechanical pump 106 coupled to a coolant system 154 of the nuclear reactor system 100, where the mechanical pump 106 provides auxiliary pumping power 159 to the coolant system 154 in order to establish a coolant mass flow rate 160 for maintaining circulation 161 in a reactor coolant pool, a reactor coolant pressure vessel, a reactor heat exchange loop, or an ambient coolant.

Figure 19:
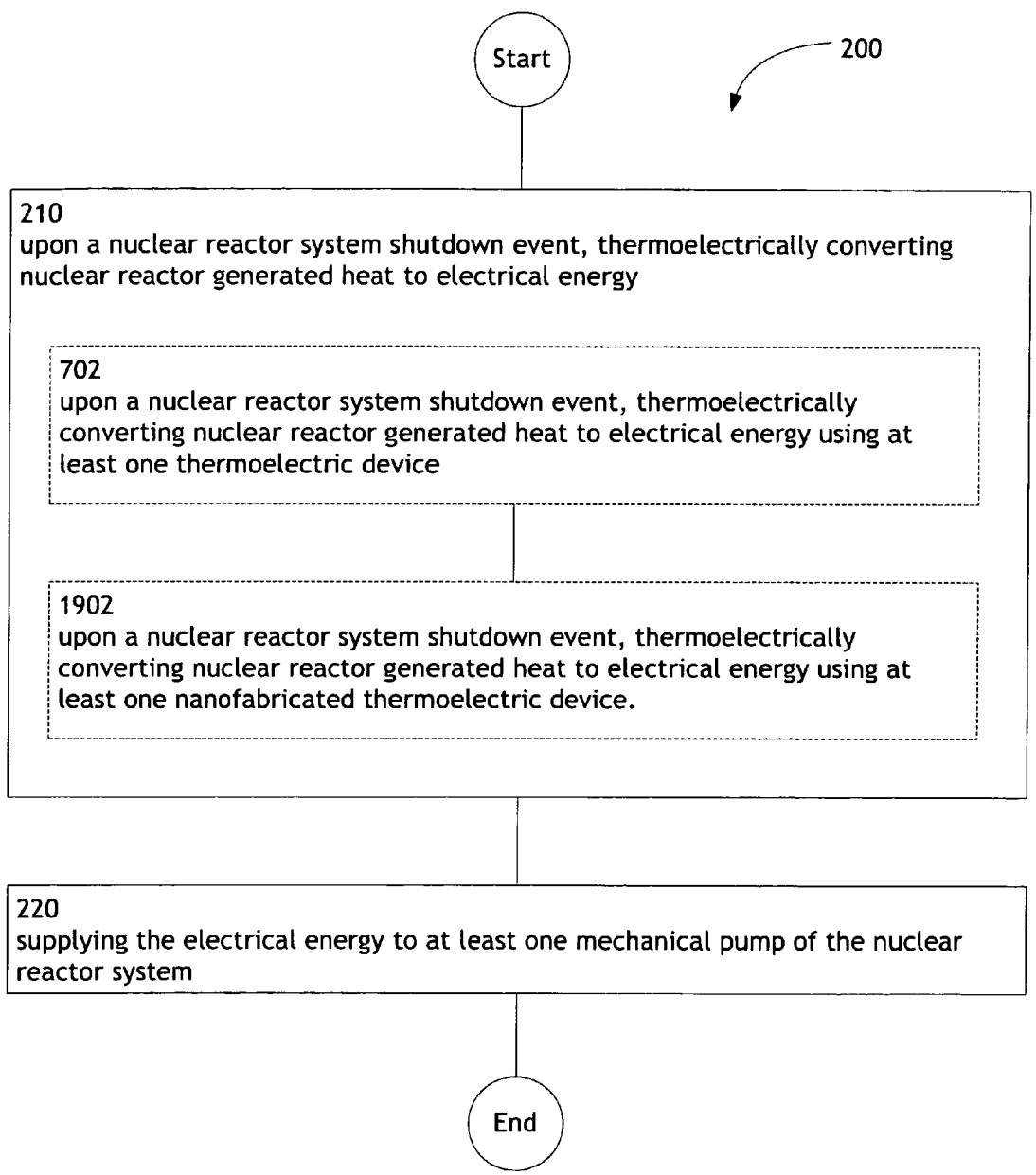

FIG. 19 illustrates alternative embodiments of the example operational flow 200 of FIG. 2. FIG. 19 illustrates example embodiments where the operation 210 may include at least one additional operation. Additional operations may include an operation 1902.

Further, the operation 1902 illustrates, upon a nuclear reactor system shutdown event, thermoelectrically converting nuclear reactor generated heat to electrical energy using at least one nanofabricated thermoelectric device. For example, as shown in FIG. 1, the thermoelectric device 104 may comprise a nanofabricated thermoelectric device 121 (e.g., device constructed using a quantum well material, a nanowire material, or superlattice material). For instance, upon a nuclear reactor system shutdown event 110, a nanofabricated thermoelectric device 121 in thermal communication with the nuclear reactor system 100 may convert heat produced by the nuclear reactor system 100 to electrical energy.

Figure 20:
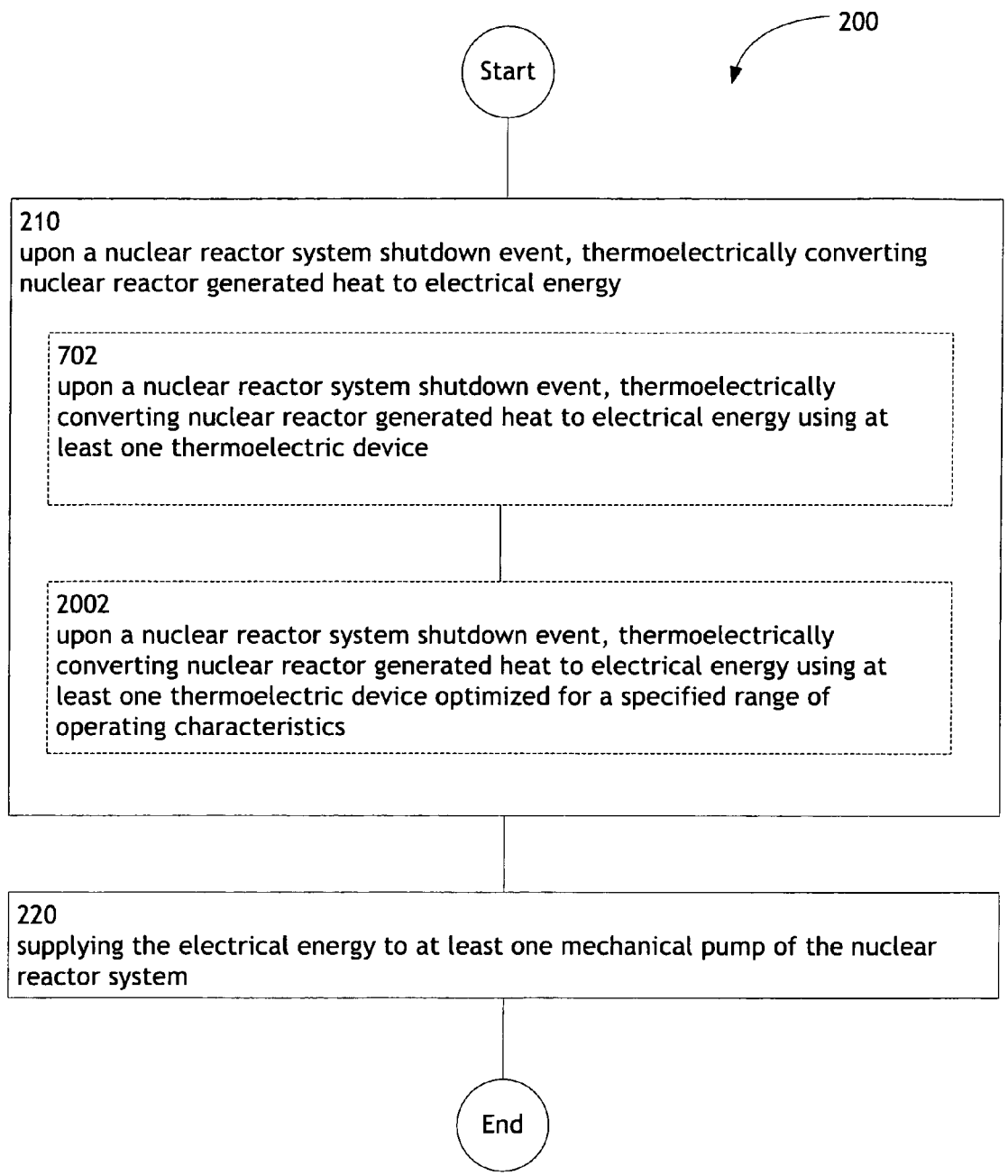

FIG. 20 illustrates alternative embodiments of the example operational flow 200 of FIG. 2. FIG. 20 illustrates example embodiments where the operation 210 may include at least one additional operation. Additional operations may include an operation 2002.

Further, the operation 2002 illustrates, upon a nuclear reactor system shutdown event, thermoelectrically converting nuclear reactor generated heat to electrical energy using at least one thermoelectric device optimized for a specified range of operating characteristics. For example, as shown in FIG. 1, the thermoelectric device 104 may comprise a thermoelectric device optimized for a specified range of operating characteristics 122 (e.g., temperature or pressure). For instance, upon a nuclear reactor system shutdown event 110, a thermoelectric device optimized for a specified range of operating characteristics 122 in thermal communication with the nuclear reactor system 100 may convert heat produced by the nuclear reactor system 100 to electrical energy.

Figure 21:
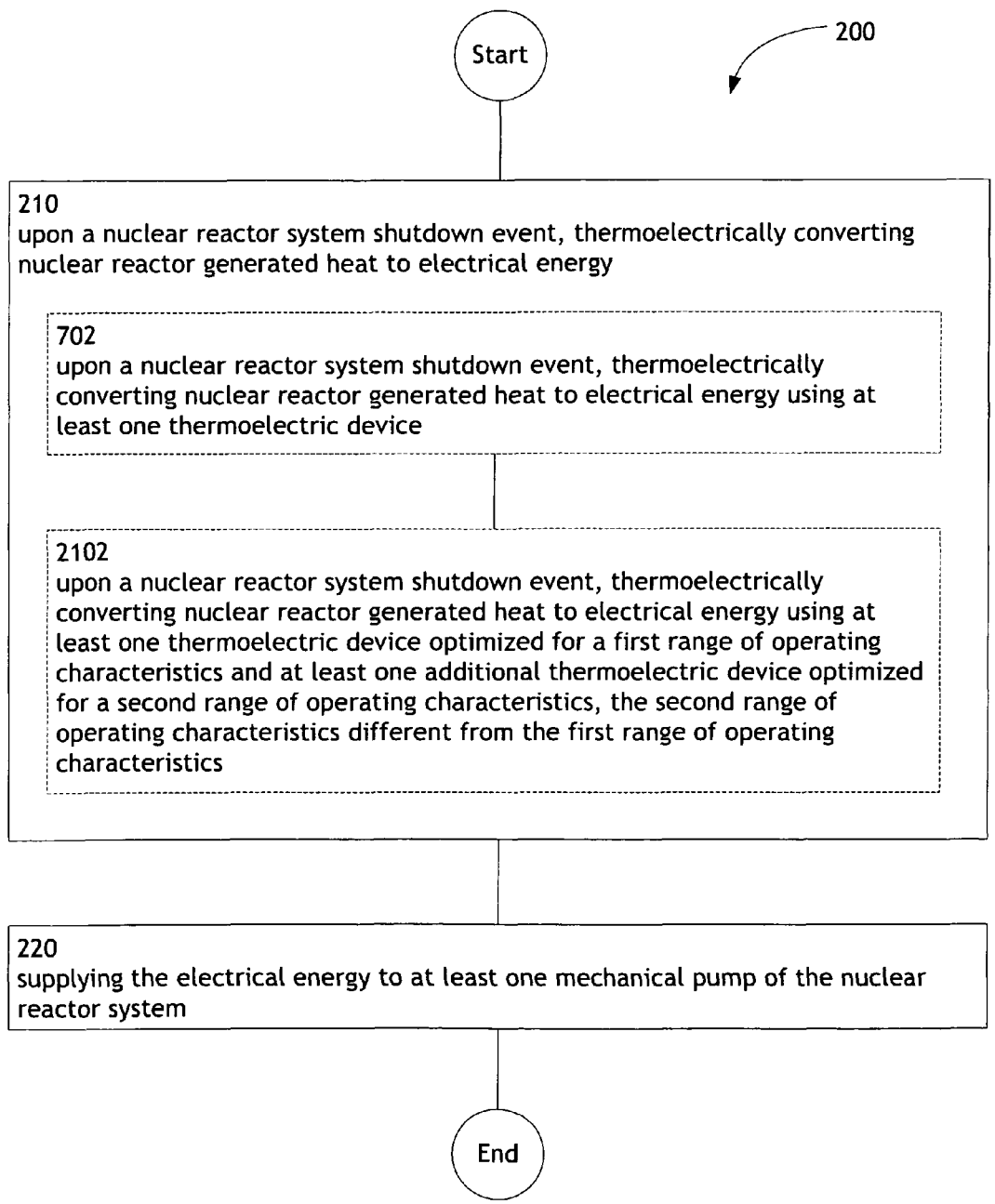

FIG. 21 illustrates alternative embodiments of the example operational flow 200 of FIG. 2. FIG. 21 illustrates example embodiments where the operation 210 may include at least one additional operation. Additional operations may include an operation 2102.

Further, the operation 2102 illustrates, upon a nuclear reactor system shutdown event, thermoelectrically converting nuclear reactor generated heat to electrical energy using at least one thermoelectric device optimized for a first range of operating characteristics and at least one additional thermoelectric device optimized for a second range of operating characteristics, the second range of operating characteristics different from the first range of operating characteristics. For example, as shown in FIG. 1, a first thermoelectric device optimized for a first range of operating characteristics and a second thermoelectric device optimized for a second range of operating characteristics 123, wherein the first range of operating characteristics is different from the second range of operating characteristics, may be placed in thermal communication with the nuclear reactor system 100. For instance, upon a nuclear reactor system shutdown event 110, the first thermoelectric device and the second thermoelectric device 123 may convert heat produced by the nuclear reactor system 100 to electrical energy.

Figure 22:
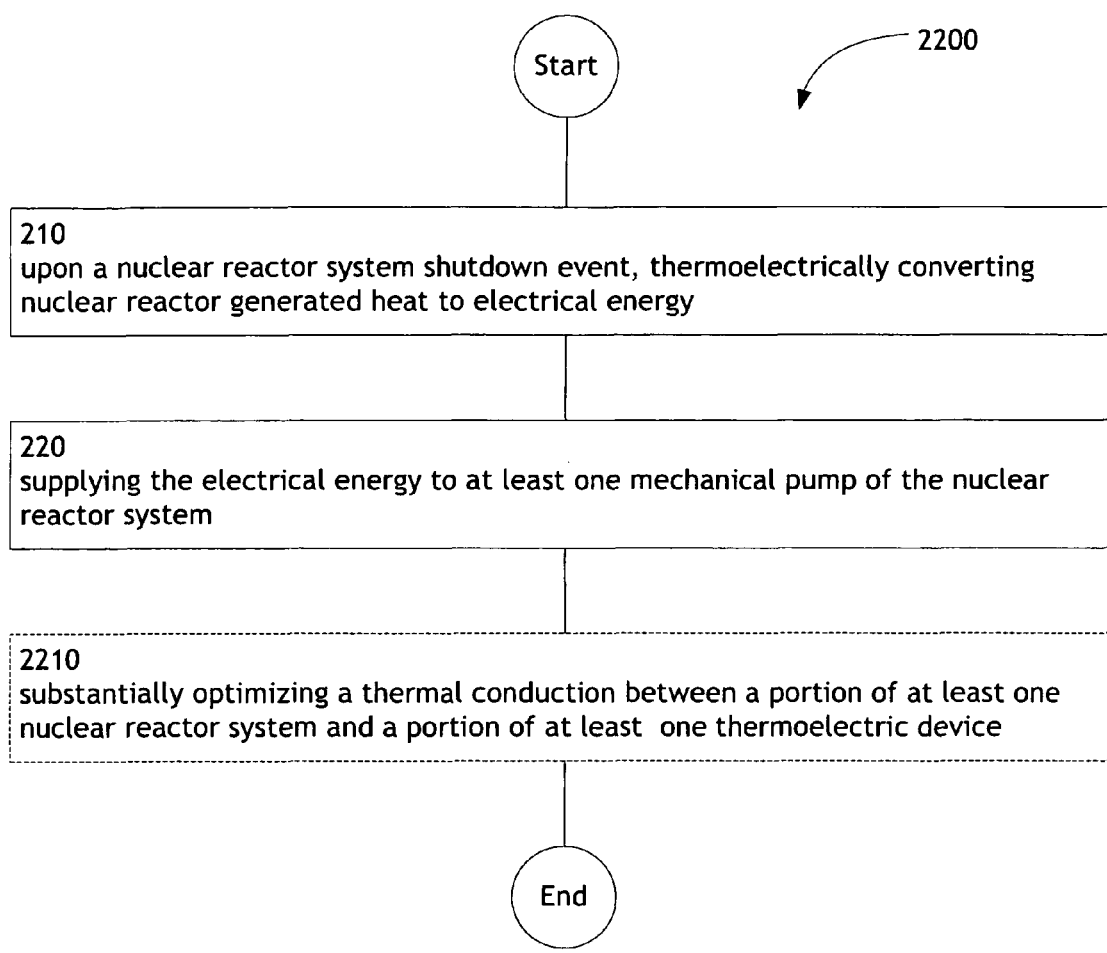

FIG. 22 illustrates an operational flow 2200 representing example operations related to the thermoelectric conversion of nuclear reactor generated heat to electrical energy upon a nuclear reactor system shutdown event. FIG. 22 illustrates an example embodiment where the example operational flow 200 of FIG. 2 may include at least one additional operation. Additional operations may include an operation 2210.

After a start operation, a converting operation 210, and a supplying operation 220, the operational flow 2200 moves to an optimizing operation 2210. Operation 2210 illustrates substantially optimizing the thermal conduction between a portion of at least one nuclear reactor system and a portion of at least one thermoelectric device. For example, as shown in FIG. 1, at the position of thermal communication between the thermoelectric device 104 and the nuclear reactor system 100, the thermal conduction between the thermoelectric device 104 and the nuclear reactor system 100 may be optimized. For example, the thermal conduction optimization 162 may include, but is not limited to, placing thermal paste, thermal glue, or a highly thermal conductive material between the thermoelectric device 104 and the nuclear reactor system 100.

Figure 23:
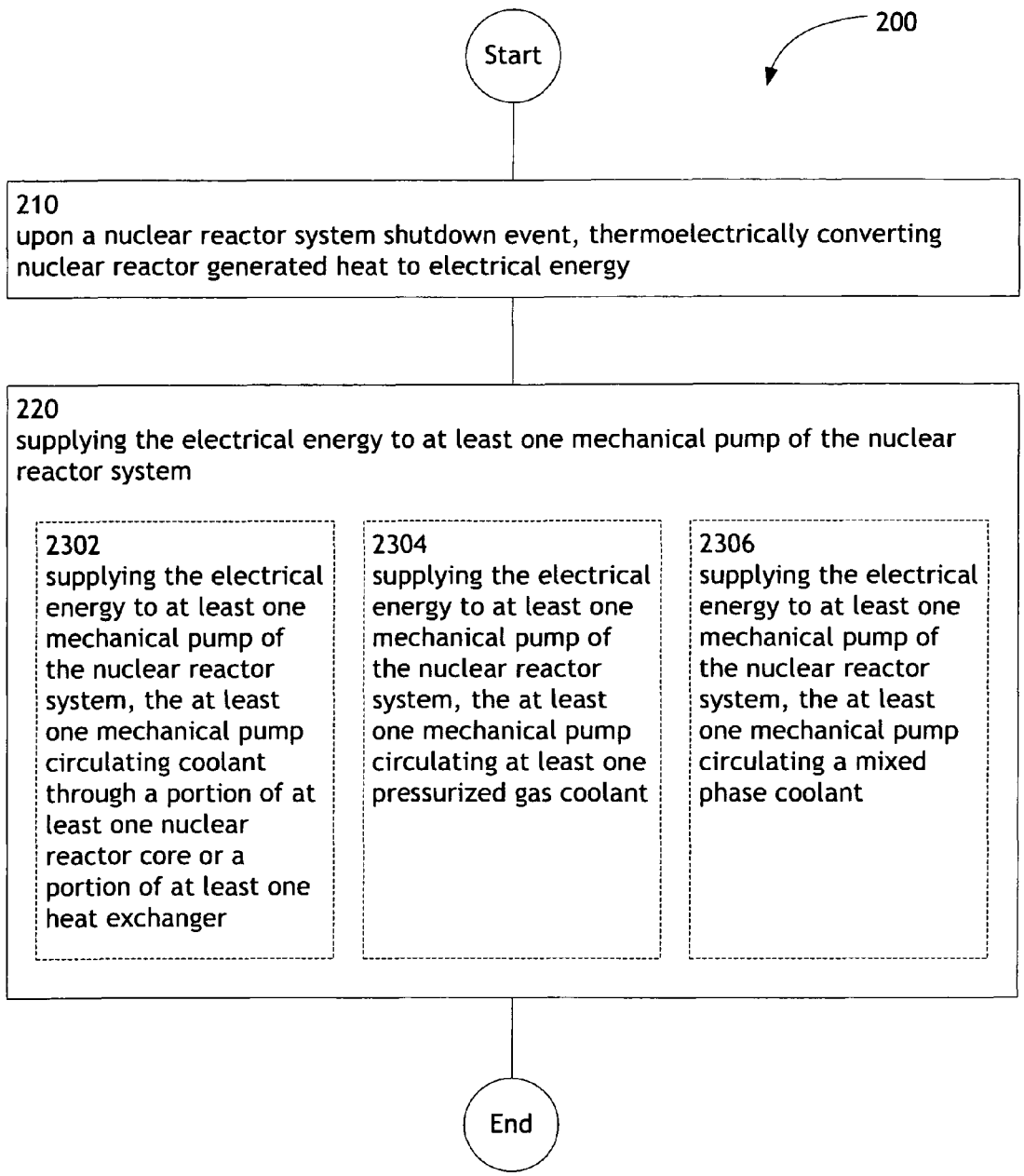

FIG. 23 illustrates alternative embodiments of the example operational flow 200 of FIG. 2. FIG. 23 illustrates example embodiments where the operation 220 may include at least one additional operation. Additional operations may include an operation 2302, an operation 2304, and/or an operation 2306.

The operation 2302 illustrates supplying the electrical energy to at least one mechanical pump of the nuclear reactor system, the at least one mechanical pump circulating coolant through a portion of at least one nuclear reactor core or a portion of at least one heat exchanger. For example, as shown in FIG. 1, the electrical output 108 of a thermoelectric device 104 may be used to supply electrical energy to a mechanical pump 106 of a nuclear reactor system 100, wherein the mechanical pump 106 circulates coolant through a nuclear reactor core or a heat exchanger 162.

The operation 2304 illustrates supplying the electrical energy to at least one mechanical pump of the nuclear reactor system, the at least one mechanical pump circulating at least one pressurized gas coolant. For example, as shown in FIG. 1, the electrical output 108 of a thermoelectric device 104 may be used to supply electrical energy to a mechanical pump 106 of a nuclear reactor system 100, wherein the mechanical pump 106 circulates a pressurized gas coolant 163 (e.g., helium) through a portion of the nuclear reactor system 100.

The operation 2306 illustrates supplying the electrical energy to at least one mechanical pump of the nuclear reactor system, the at least one mechanical pump circulating a mixed phase coolant. For example, as shown in FIG. 1, the electrical output 108 of a thermoelectric device 104 may be used to supply electrical energy to a mechanical pump 106 of a nuclear reactor system 100, wherein the mechanical pump 106 circulates a mixed phase coolant 164 (e.g., mixture of gas and liquid coolant) through a portion of the nuclear reactor system 100.

Figure 24:
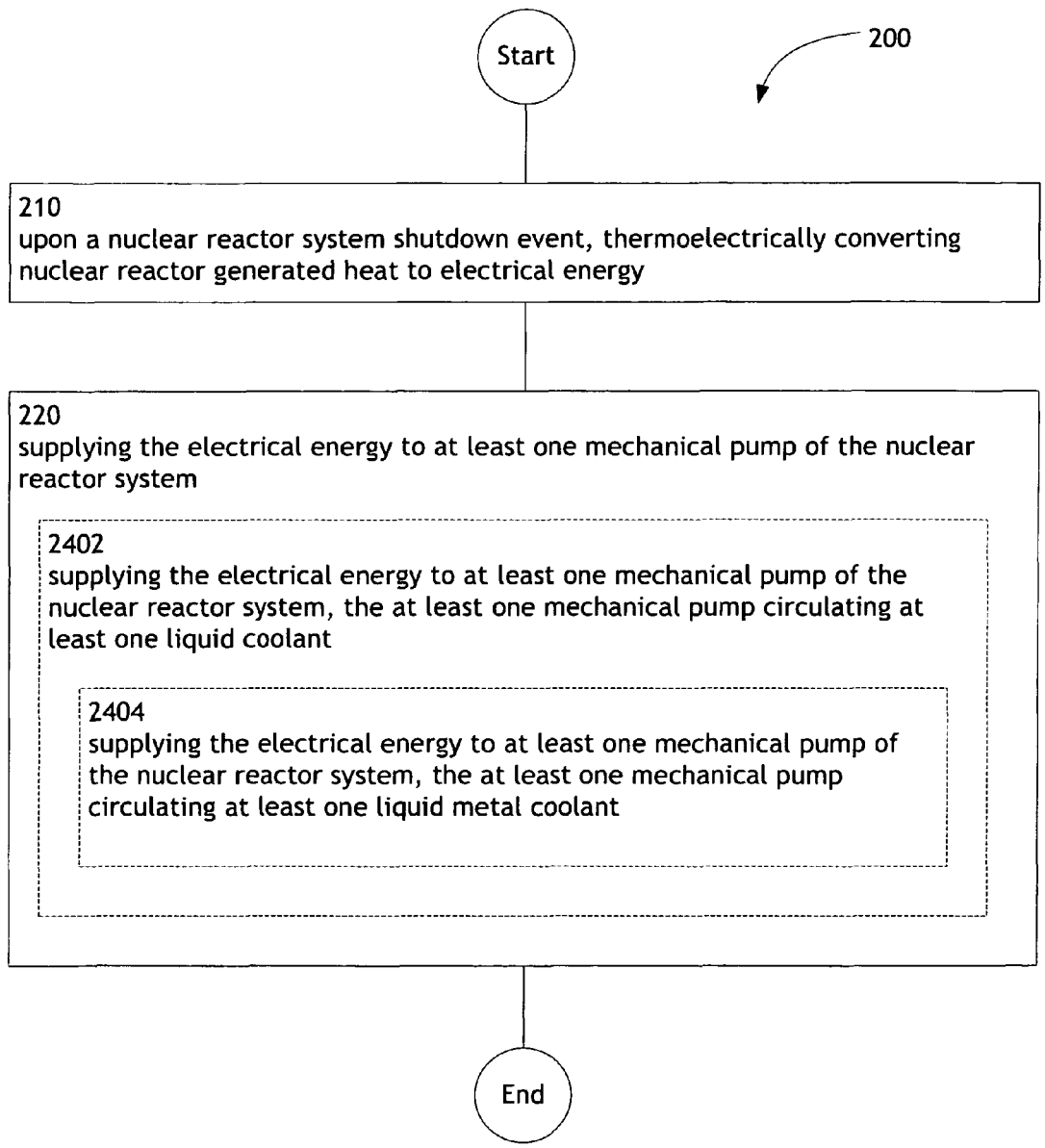

FIG. 24 illustrates alternative embodiments of the example operational flow 200 of FIG. 2. FIG. 24 illustrates example embodiments where the operation 220 may include at least one additional operation. Additional operations may include an operation 2402, and/or an operation 2404.

The operation 2402 illustrates supplying the electrical energy to at least one mechanical pump of the nuclear reactor system, the at least one mechanical pump circulating at least one liquid coolant. For example, as shown in FIG. 1, the electrical output 108 of a thermoelectric device 104 may be used to supply electrical energy to a mechanical pump 106 of a nuclear reactor system 100, wherein the mechanical pump 106 circulates a liquid coolant 165 (e.g., liquid water) through a portion of the nuclear reactor system 100.

Further, the operation 2404 illustrates supplying the electrical energy to at least one mechanical pump of the nuclear reactor system, the at least one mechanical pump circulating at least one liquid metal coolant. For example, as shown in FIG. 1, the electrical output 108 of a thermoelectric device 104 may be used to supply electrical energy to a mechanical pump 106 of a nuclear reactor system 100, wherein the mechanical pump 106 circulates a liquid metal coolant 166 (e.g., liquid sodium) through a portion of the nuclear reactor system 100.

Figure 25:
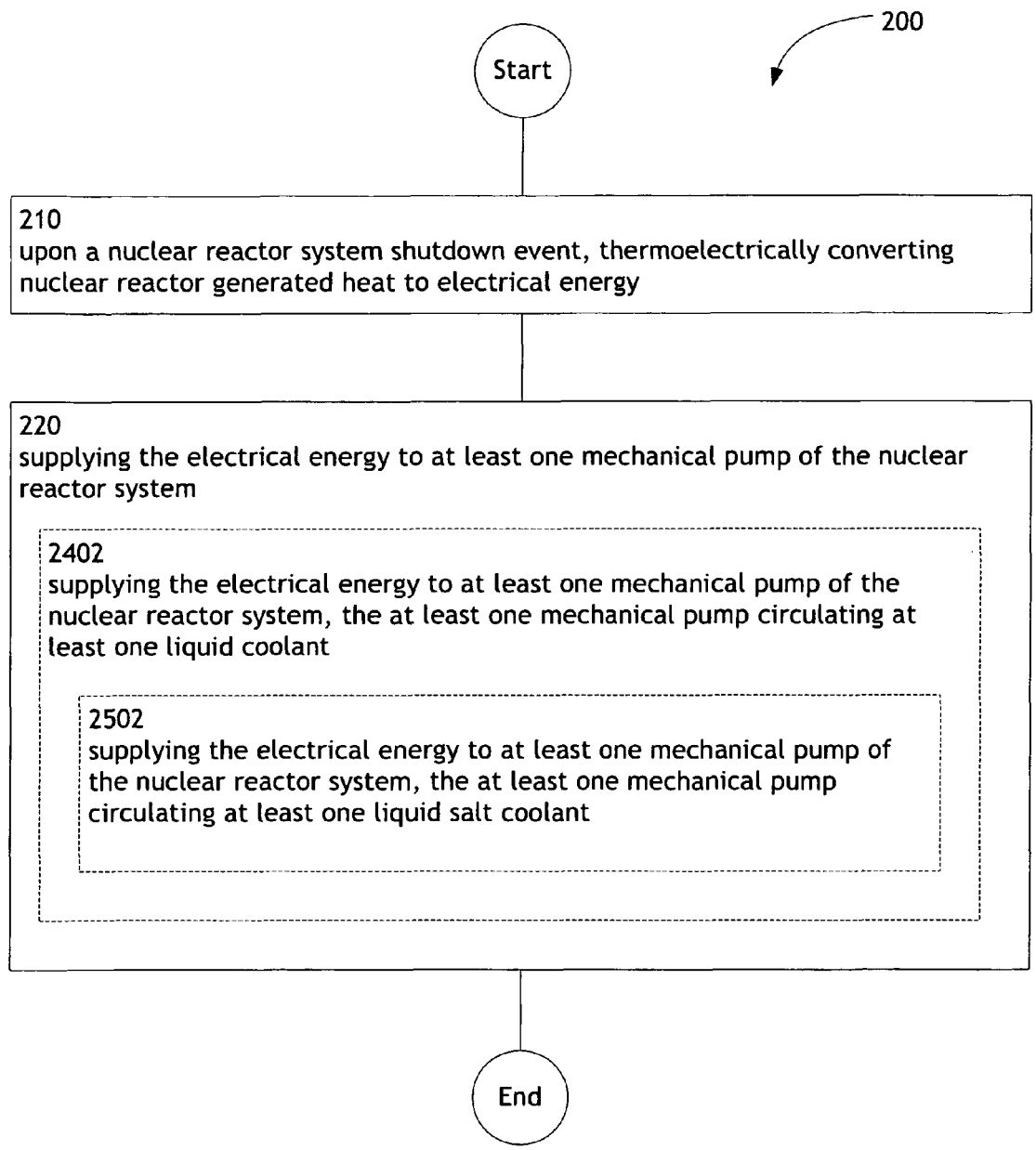

FIG. 25 illustrates alternative embodiments of the example operational flow 200 of FIG. 2. FIG. 25 illustrates example embodiments where the operation 220 may include at least one additional operation. Additional operations may include an operation 2502.

Further, the operation 2502 illustrates supplying the electrical energy to at least one mechanical pump of the nuclear reactor system, the at least one mechanical pump circulating at least one liquid salt coolant. For example, as shown in FIG. 1, the electrical output 108 of a thermoelectric device 104 may be used to supply electrical energy to a mechanical pump 106 of a nuclear reactor system 100, wherein the mechanical pump 106 circulates a liquid salt coolant 167 (e.g., fluoride salts) through a portion of the nuclear reactor system 100.

Figure 26:
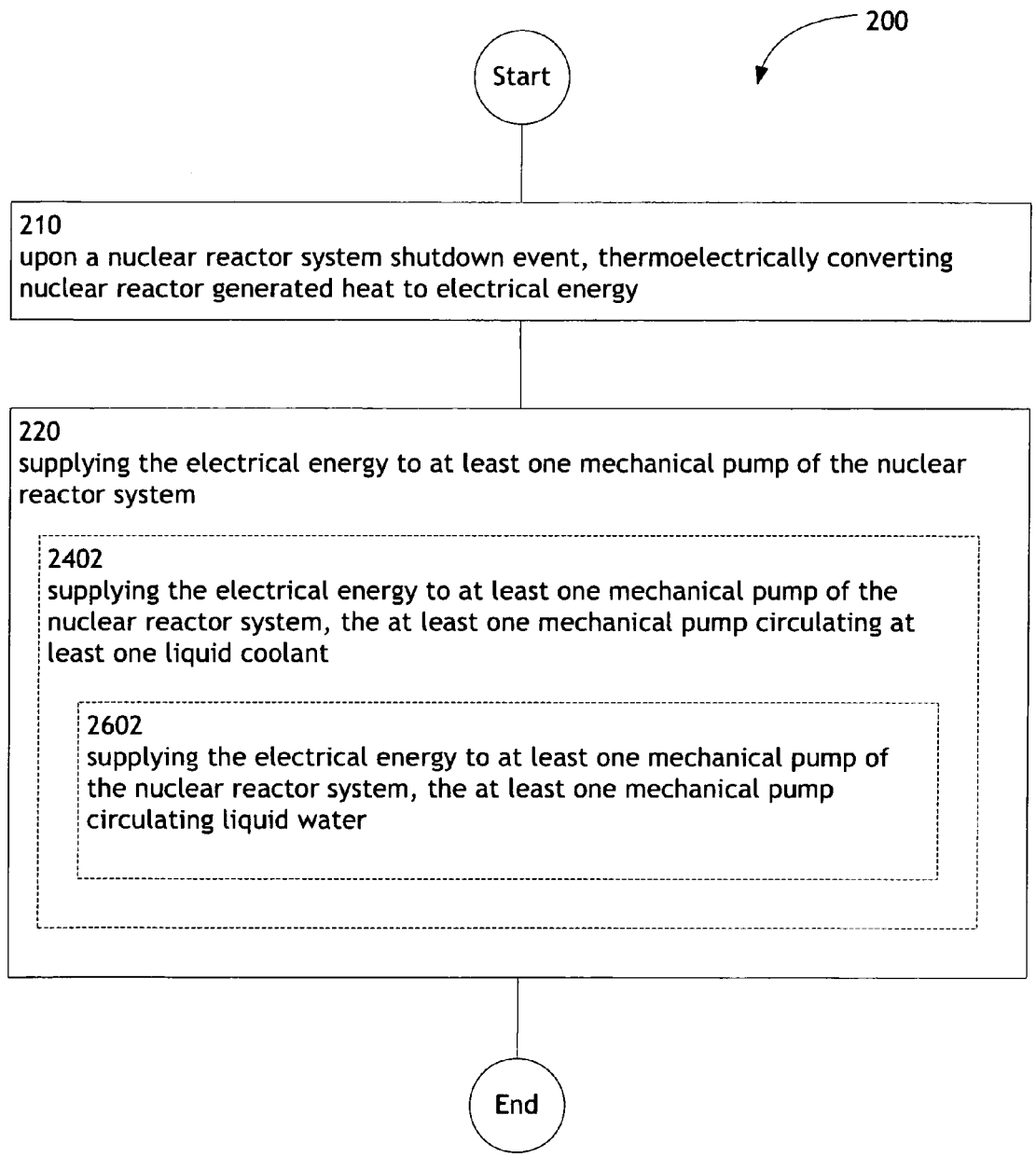

FIG. 26 illustrates alternative embodiments of the example operational flow 200 of FIG. 2. FIG. 26 illustrates example embodiments where the operation 220 may include at least one additional operation. Additional operations may include an operation 2602.

Further, the operation 2602 illustrates supplying the electrical energy to at least one mechanical pump of the nuclear reactor system, the at least one mechanical pump circulating liquid water. For example, as shown in FIG. 1, the electrical output 108 of a thermoelectric device 104 may be used to supply electrical energy to a mechanical pump 106 of a nuclear reactor system 100, wherein the mechanical pump 106 circulates a liquid water coolant 168 through a portion of the nuclear reactor system 100.

Figure 27:
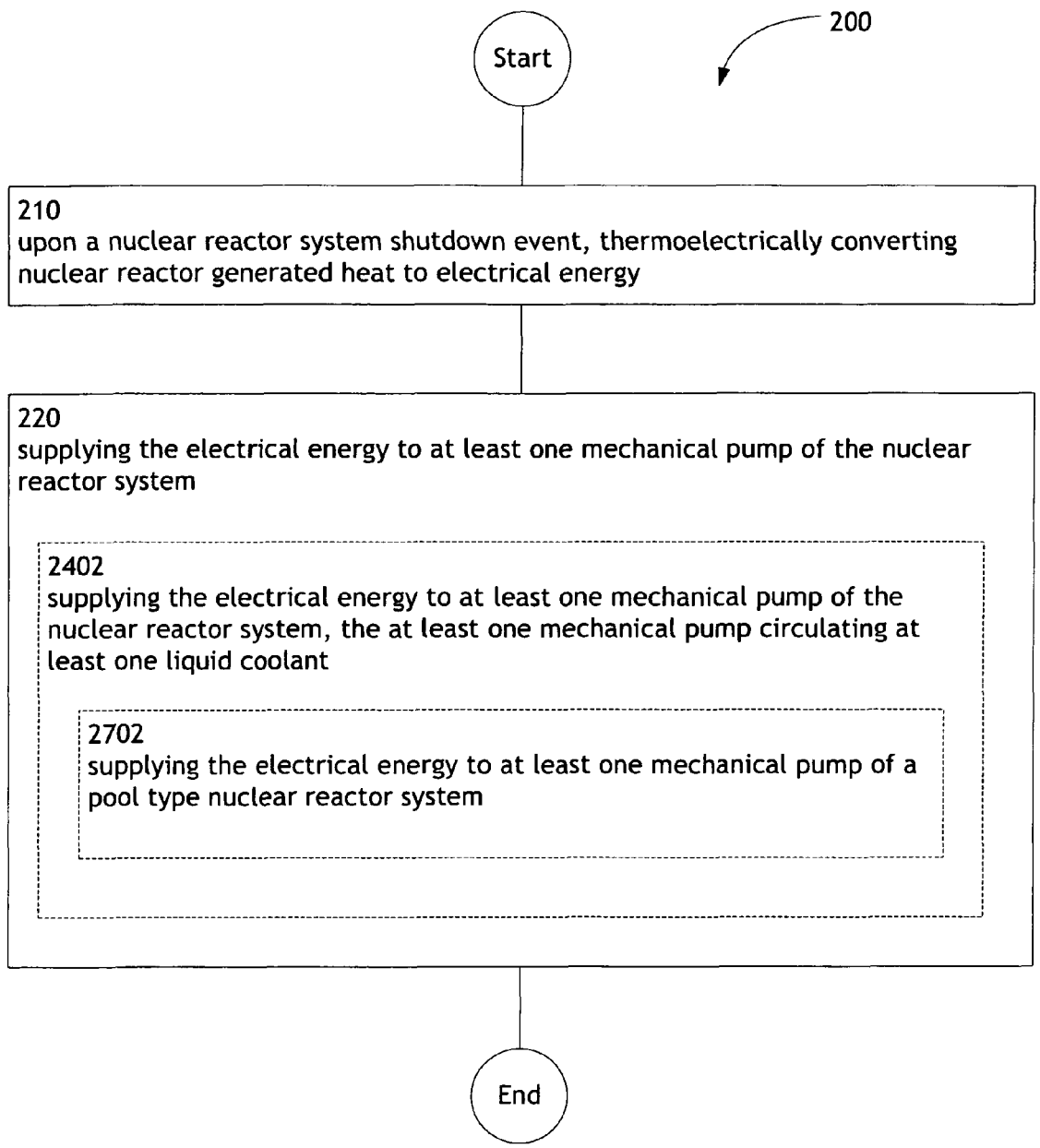

FIG. 27 illustrates alternative embodiments of the example operational flow 200 of FIG. 2. FIG. 27 illustrates example embodiments where the operation 220 may include at least one additional operation. Additional operations may include an operation 2702.

Further, the operation 2702 illustrates supplying the electrical energy to at least one mechanical pump of a pool type nuclear reactor system. For example, as shown in FIG. 1, the electrical output 108 of a thermoelectric device 104 may be used to supply electrical energy to a mechanical pump 106 of a pool cooled 169 nuclear reactor system 100.

Figure 28:
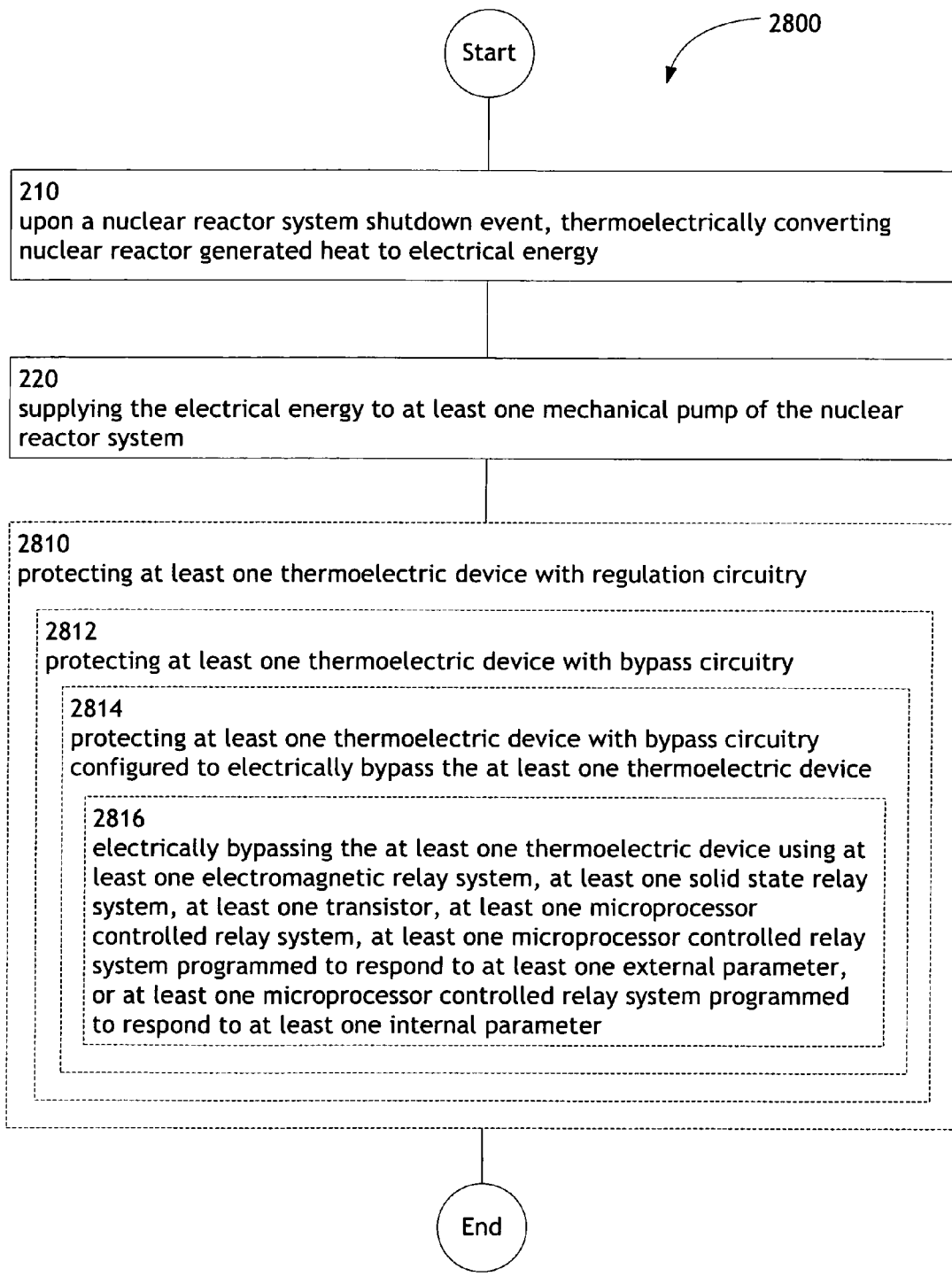

FIG. 28 illustrates an operational flow 2800 representing example operations related to the thermoelectric conversion of nuclear reactor generated heat to electrical energy upon a nuclear reactor system shutdown event. FIG. 28 illustrates an example embodiment where the example operational flow 200 of FIG. 2 may include at least one additional operation. Additional operations may include an operation 2810, an operation 2812, an operation 2814, and/or an operation 2816.

After a start operation, a converting operation 210, and a supplying operation 220, the operational flow 2800 moves to a protecting operation 2810. Operation 2810 illustrates protecting at least one thermoelectric device with regulation circuitry. For example, as shown in FIG. 1, one or more than one thermoelectric device 104 may be protected using regulation circuitry 170, such as voltage regulation circuitry (e.g., voltage regulator) or current limiting circuitry (e.g., blocking diode or fuse).

The protecting operation 2812 illustrates protecting at least one thermoelectric device with bypass circuitry. For example, as shown in FIG. 1, one or more than one thermoelectric device 104 may be protected using bypass circuitry 172, such as a bypass diode.

Further, the operation 2814 illustrates protecting at least one thermoelectric device with bypass circuitry configured to electrically bypass the at least one thermoelectric device. For example, as shown in FIG. 1, one or more than one thermoelectric device 104 may be protected using bypass circuitry configured to electrically bypass 174 one or more than one thermoelectric device 104.

Further, the operation 2816 illustrates electrically bypassing the at least one thermoelectric device using at least one electromagnetic relay system, at least one solid state relay system, at least one transistor, at least one microprocessor controlled relay system, at least one microprocessor controlled relay system programmed to respond to at least one external parameter, or at least one microprocessor controlled relay system programmed to respond to at least one internal parameter. For example, as shown in FIG. 1, one or more than one thermoelectric device 104 may be electrically bypassed using an electromagnetic relay system 176, a solid state relay system 178, a transistor 180, a microprocessor controlled relay system 182, a microprocessor controlled relay system programmed to respond to one or more than one external parameters 184, or a microprocessor controlled relay system programmed to respond to one or more than one internal parameters 186.

Figure 29:
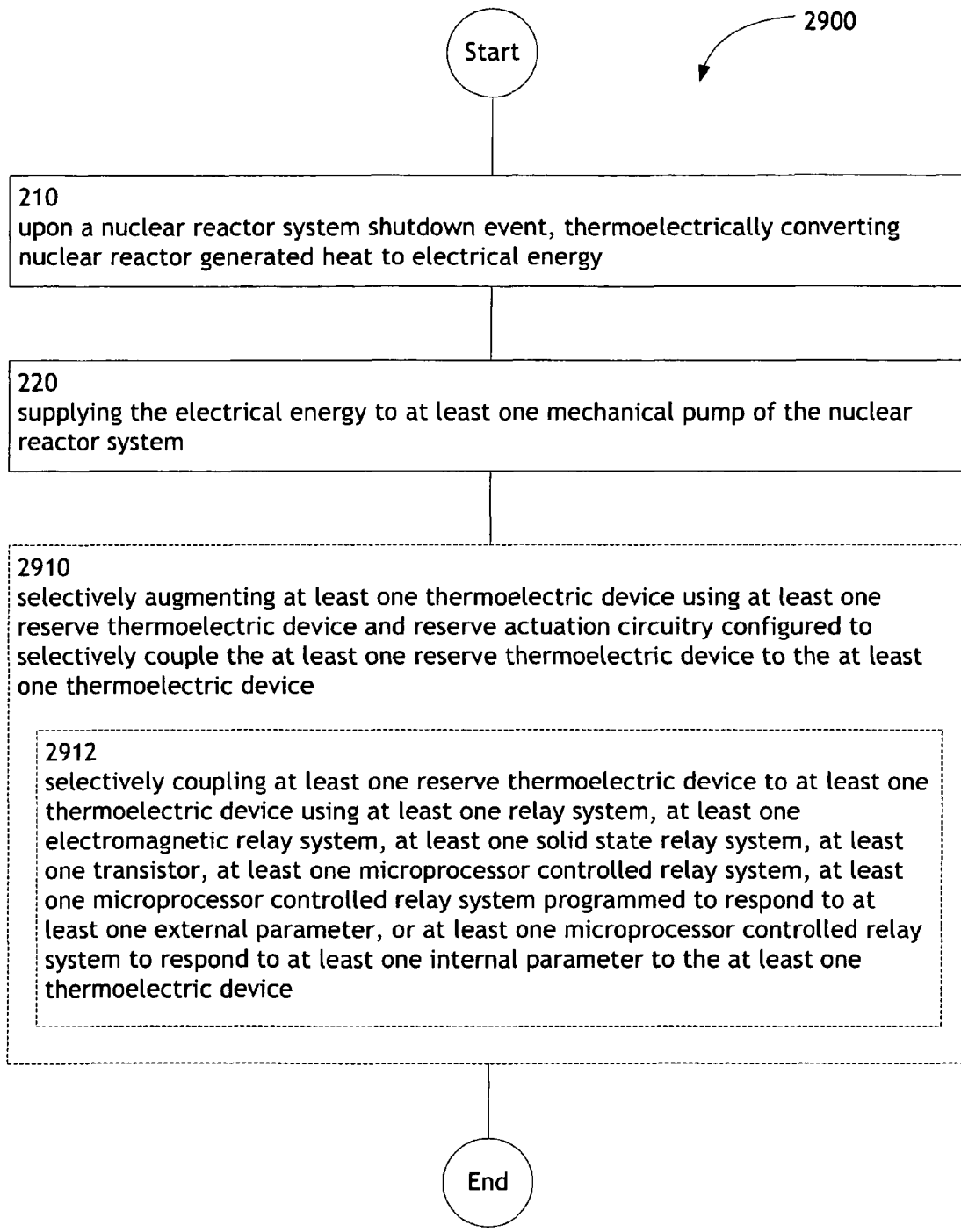

FIG. 29 illustrates an operational flow 2900 representing example operations related to the thermoelectric conversion of nuclear reactor generated heat to electrical energy upon a nuclear reactor system shutdown event. FIG. 29 illustrates an example embodiment where the example operational flow 200 of FIG. 2 may include at least one additional operation. Additional operations may include an operation 2910, and/or an operation 2912.

After a start operation, a converting operation 210, and a supplying operation 220, the operational flow 2900 moves to an augmenting operation 2910. Operation 2910 illustrates selectively augmenting at least one thermoelectric device using at least one reserve thermoelectric device and reserve actuation circuitry configured to selectively couple the at least one reserve thermoelectric device to the at least one thermoelectric device. For example, as shown in FIG. 1, the electrical output from one or more than one thermoelectric device 104 may be augmented using one or more than one reserve thermoelectric device 188, where the one or more than one reserve thermoelectric device 188 may be selectively coupled to the thermoelectric device 104 using reserve actuation circuitry 189.

The augmenting operation 2912 illustrates selectively coupling at least one reserve thermoelectric device to the at least one thermoelectric device using at least one relay system, at least one electromagnetic relay system, at least one solid state relay system, at least one transistor, at least one microprocessor controlled relay system, at least one microprocessor controlled relay system programmed to respond to at least one external parameter, or at least one microprocessor controlled relay system to respond to at least one internal parameter to the at least one thermoelectric device. For example, as shown in FIG. 1, the electrical output from one or more than one thermoelectric device 104 may be augmented using one or more than one reserve thermoelectric device 188, where the one or more than one reserve thermoelectric device 188 may be selectively coupled to the thermoelectric device 104 using a relay system 190, an electromagnetic relay system 191, a solid state relay system 192, a transistor 193, a microprocessor controlled relay system 194, a microprocessor controlled relay system programmed to respond to at least one external parameter 195, or a microprocessor controlled relay system programmed to respond to at least one internal parameter 196.

Figure 30:
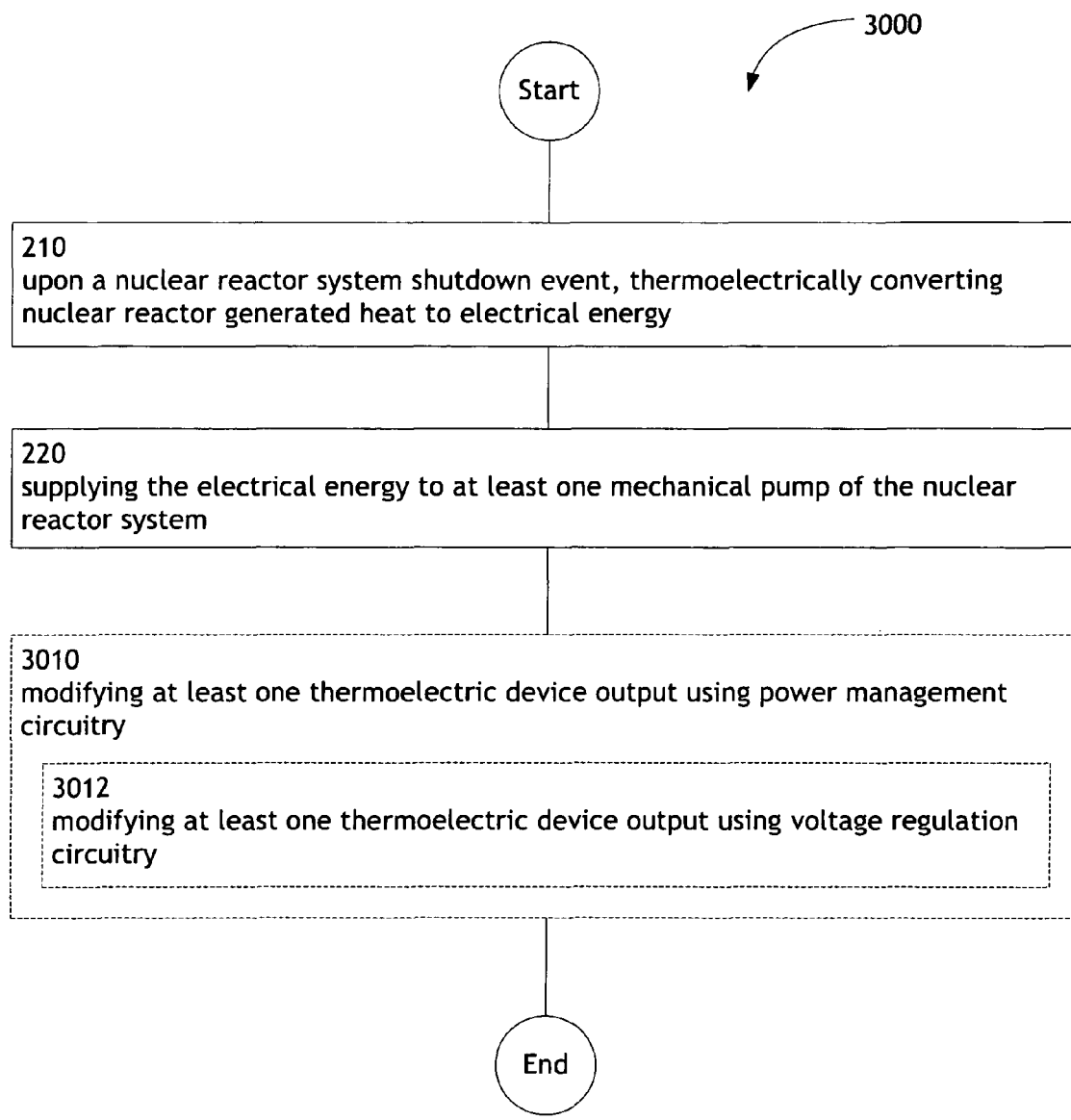

FIG. 30 illustrates an operational flow 3000 representing example operations related to the thermoelectric conversion of nuclear reactor generated heat to electrical energy upon a nuclear reactor system shutdown event. FIG. 30 illustrates an example embodiment where the example operational flow 200 of FIG. 2 may include at least one additional operation. Additional operations may include an operation 3010, and/or an operation 3012.

After a start operation, a converting operation 210, and a supplying operation 220, the operational flow 3000 moves to an output modifying operation 3010. Operation 3010 illustrates modifying the at least one thermoelectric device output using power management circuitry. For example, as shown in FIG. 1, the electrical output of a thermoelectric device 104 may be modified using power management circuitry, such as a voltage converter (e.g., DC-DC converter or DC-AC inverter).

The operation 3012 illustrates modifying the at least one thermoelectric device output using voltage regulation circuitry. For example, as shown in FIG. 1, the electrical output of a thermoelectric device 104 may be modified using voltage regulation circuitry, such as a voltage regulator (e.g., Zener diode, an adjustable voltage regulator or a fixed voltage regulator).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electromechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electromechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electromechanical systems include but are not limited to a variety of consumer electronics systems, medical devices, as well as other systems such as motorized transport systems, factory automation systems, security systems, and/or communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method, comprising:
   upon a nuclear reactor shutdown event, thermoelectrically converting heat generated with a nuclear reactor to electrical energy; and
   supplying the electrical energy to at least one mechanical pump of the nuclear reactor.

2. The method of claim 1, wherein the upon a nuclear reactor shutdown event, thermoelectrically converting heat generated with a nuclear reactor to electrical energy comprises:
   following initiation of a nuclear reactor shutdown, thermoelectrically converting nuclear reactor generated heat to electrical energy.

3. The method of claim 1, wherein the upon a nuclear reactor shutdown event, thermoelectrically converting heat generated with a nuclear reactor to electrical energy comprises:
   upon a nuclear reactor shutdown event, thermoelectrically converting residual heat generated with a nuclear reactor to electrical energy.

4. The method of claim 1, wherein the upon a nuclear reactor shutdown event, thermoelectrically converting heat generated with a nuclear reactor to electrical energy comprises:
  upon a nuclear reactor shutdown event, thermoelectrically converting heat generated with a nuclear reactor to electrical energy using at least one thermoelectric device.

5. The method of claim 4, wherein the upon a nuclear reactor shutdown event, thermoelectrically converting heat generated with a nuclear reactor to electrical energy using at least one thermoelectric device comprises:
  upon a nuclear reactor shutdown event, thermoelectrically converting heat generated with a nuclear reactor to electrical energy using at least one thermoelectric junction.

6. The method of claim 5, wherein the upon a nuclear reactor shutdown event, thermoelectrically converting heat generated with a nuclear reactor to electrical energy using at least one thermoelectric junction comprises:
  upon a nuclear reactor shutdown event, thermoelectrically converting heat generated with a nuclear reactor to electrical energy using at least one semiconductor-semiconductor junction.

7. The method of claim 6, wherein the upon a nuclear reactor shutdown event, thermoelectrically converting heat generated with a nuclear reactor to electrical energy using at least one semiconductor-semiconductor junction comprises:
  upon a nuclear reactor shutdown event, thermoelectrically converting heat generated with a nuclear reactor to electrical energy using at least one p-type/n-type junction.

8. The method of claim 1, wherein the upon a nuclear reactor shutdown event, thermoelectrically converting heat generated with a nuclear reactor to electrical energy comprises:
  upon a nuclear reactor shutdown event, thermoelectrically converting heat generated with a nuclear reactor to electrical energy using at least one nanofabricated thermoelectric device.

9. The method of claim 1, wherein the upon a nuclear reactor shutdown event, thermoelectrically converting heat generated with a nuclear reactor to electrical energy comprises:
  upon a nuclear reactor shutdown event, thermoelectrically converting heat generated with a nuclear reactor to electrical energy using at least one thermoelectric device, the thermoelectric device having at least a first portion in thermal communication with a first portion of the nuclear reactor and at least a second portion in thermal communication with a second portion of the nuclear reactor.

10. The method of claim 9, wherein the upon a nuclear reactor shutdown event, thermoelectrically converting heat generated with a nuclear reactor to electrical energy using at least one thermoelectric device, the thermoelectric device having at least a first portion in thermal communication with a first portion of the nuclear reactor and at least a second portion in thermal communication with a second portion of the nuclear reactor comprises:
  upon a nuclear reactor shutdown event, thermoelectrically converting heat generated with a nuclear reactor to electrical energy using at least one thermoelectric device, the thermoelectric device having at least a first portion in thermal communication with at least one heat source of the nuclear reactor.

11. The method of claim 10, wherein the upon a nuclear reactor shutdown event, thermoelectrically converting heat generated with a nuclear reactor to electrical energy using at least one thermoelectric device, the thermoelectric device having at least a first portion in thermal communication with at least one heat source of the nuclear reactor comprises:
  upon a nuclear reactor shutdown event, thermoelectrically converting heat generated with a nuclear reactor to electrical energy using at least one thermoelectric device, the thermoelectric device having at least a first portion in thermal communication with at least a portion of a nuclear reactor core, at least a portion of at least one pressure vessel, at least a portion of at least one containment vessel, at least a portion of at least one coolant loop, at least a portion of at least one coolant pipe, at least a portion of at least one heat exchanger, or at least a portion of a coolant of the nuclear reactor.

12. The method of claim 9, wherein the upon a nuclear reactor shutdown event, thermoelectrically converting heat generated with a nuclear reactor to electrical energy using at least one thermoelectric device, the thermoelectric device having at least a first portion in thermal communication with a first portion of the nuclear reactor and at least a second portion in thermal communication with a second portion of the nuclear reactor comprises:
  upon a nuclear reactor shutdown event, thermoelectrically converting heat generated with a nuclear reactor to electrical energy using at least one thermoelectric device, the thermoelectric device having at least a second portion in thermal communication with a second portion of the nuclear reactor system, the second portion of the nuclear reactor system at a lower temperature than the first portion of the nuclear reactor.

13. The method of claim 12, wherein the upon a nuclear reactor shutdown event, thermoelectrically converting heat generated with a nuclear reactor to electrical energy using at least one thermoelectric device, the thermoelectric device having at least a second portion in thermal communication with a second portion of the nuclear reactor system, the second portion of the nuclear reactor system at a lower temperature than the first portion of the nuclear reactor comprises:
  upon a nuclear reactor shutdown event, thermoelectrically converting heat generated with a nuclear reactor to electrical energy using at least one thermoelectric device, the thermoelectric device having at least a second portion in thermal communication with at least a portion of at least one coolant loop, at least a portion of at least one coolant pipe, at least a portion of at least one heat exchanger, at least a portion of a coolant of the nuclear reactor, or at least a portion of at least one environmental reservoir.

14. The method of claim 1, wherein the supplying the electrical energy to at least one mechanical pump of the nuclear reactor comprises:
  supplying the electrical energy to at least one mechanical pump of the nuclear reactor, the at least one mechanical pump circulating coolant through a portion of at least one nuclear reactor core or a portion of at least one heat exchanger.

15. The method of claim 1, wherein the supplying the electrical energy to at least one mechanical pump of the nuclear reactor comprises:
  supplying the electrical energy to at least one mechanical pump of the nuclear reactor, the at least one mechanical pump circulating at least one liquid coolant.

16. The method of claim 15, wherein the supplying the electrical energy to at least one mechanical pump of the nuclear reactor, the at least one mechanical pump circulating at least one liquid coolant comprises:
supplying the electrical energy to at least one mechanical pump of the nuclear reactor, the at least one mechanical pump circulating at least one liquid metal coolant.

17. The method of claim 1, wherein the upon a nuclear reactor shutdown event, thermoelectrically converting heat generated with a nuclear reactor to electrical energy comprises:
upon a nuclear reactor shutdown event, thermoelectrically converting heat generated with a thermal spectrum nuclear reactor to electrical energy.

18. The method of claim 1, wherein the upon a nuclear reactor shutdown event, thermoelectrically converting heat generated with a nuclear reactor to electrical energy comprises:
upon a nuclear reactor shutdown event, thermoelectrically converting heat generated with a nuclear reactor to electrical energy using at least two series coupled thermoelectric devices.

19. The method of claim 1, wherein the upon a nuclear reactor shutdown event, thermoelectrically converting heat generated with a nuclear reactor to electrical energy comprises:
upon a nuclear reactor shutdown event, thermoelectrically converting heat generated with a nuclear reactor to electrical energy using at least two parallel coupled thermoelectric devices.

20. The method of claim 1, wherein the upon a nuclear reactor shutdown event, thermoelectrically converting heat generated with a nuclear reactor to electrical energy comprises:
upon a nuclear reactor shutdown event, thermoelectrically converting heat generated with a nuclear reactor to electrical energy using at least one thermoelectric module.

21. The method of claim 1, further comprising:
protecting at least one thermoelectric device with regulation circuitry.

22. The method of claim 21, wherein the protecting at least one thermoelectric device with regulation circuitry comprises:
protecting at least one thermoelectric device with bypass circuitry.

23. The method of claim 22, wherein the protecting at least one thermoelectric device with bypass circuitry comprises:
protecting at least one thermoelectric device with bypass circuitry configured to electrically bypass the at least one thermoelectric device.

24. The method of claim 23, wherein the protecting at least one thermoelectric device with bypass circuitry configured to electrically bypass the at least one thermoelectric device comprises:
electrically bypassing the at least one thermoelectric device using at least one electromagnetic relay system, at least one solid state relay system, at least one transistor, at least one microprocessor controlled relay system, at least one microprocessor controlled relay system programmed to respond to at least one external parameter, or at least one microprocessor controlled relay system programmed to respond to at least one internal parameter.

25. The method of claim 1, further comprising:
selectively augmenting at least one thermoelectric device using at least one reserve thermoelectric device and reserve actuation circuitry configured to selectively couple the at least one reserve thermoelectric device to the at least one thermoelectric device.

26. The method of claim 25, wherein the selectively augmenting at least one thermoelectric device using at least one reserve thermoelectric device and reserve actuation circuitry configured to selectively couple the at least one reserve thermoelectric device to the at least one thermoelectric device comprises:
selectively coupling at least one reserve thermoelectric device to at least one thermoelectric device using at least one relay system, at least one electromagnetic relay system, at least one solid state relay system, at least one transistor, at least one microprocessor controlled relay system, at least one microprocessor controlled relay system programmed to respond to at least one external parameter, or at least one microprocessor controlled relay system to respond to at least one internal parameter to the at least one thermoelectric device.

27. The method of claim 1, wherein the upon a nuclear reactor shutdown event, thermoelectrically converting heat generated with a nuclear reactor to electrical energy comprises:
upon a nuclear reactor shutdown event, thermoelectrically converting heat generated with a nuclear reactor to electrical energy using at least one thermoelectric device sized to meet at least one selected operational requirement of the nuclear reactor.

28. The method of claim 27, wherein the upon a nuclear reactor shutdown event, thermoelectrically converting heat generated with a nuclear reactor to electrical energy using at least one thermoelectric device sized to meet at least one selected operational requirement of the nuclear reactor comprises:
upon a nuclear reactor shutdown event, thermoelectrically converting heat generated with a nuclear reactor to electrical energy using at least one thermoelectric device sized to at least partially match the heat rejection of the at least one thermoelectric device with at least a portion of the heat produced by the nuclear reactor.

29. The method of claim 27, wherein the upon a nuclear reactor shutdown event, thermoelectrically converting heat generated with a nuclear reactor to electrical energy using at least one thermoelectric device sized to meet at least one selected operational requirement of the nuclear reactor comprises:
upon a nuclear reactor shutdown event, thermoelectrically converting heat generated with a nuclear reactor to electrical energy using at least one thermoelectric device sized to at least partially match the power requirements of at least one selected operation system.

30. The method of claim 29, wherein the upon a nuclear reactor shutdown event, thermoelectrically converting heat generated with a nuclear reactor to electrical energy using at least one thermoelectric device sized to at least partially match the power requirements of at least one selected operation system comprises:
upon a nuclear reactor shutdown event, thermoelectrically converting heat generated with a nuclear reactor to electrical energy using at least one thermoelectric device sized to match the power requirements of at least one mechanical pump.

31. The method of claim 1, further comprising:
  modifying at least one thermoelectric device output using power management circuitry.

32. The method of claim 31, wherein the modifying at least one thermoelectric device output using power management circuitry comprises:
  modifying at least one thermoelectric device output using voltage regulation circuitry.

* * * * *